United States Patent
Sasabe et al.

(10) Patent No.: US 6,191,229 B1
(45) Date of Patent: Feb. 20, 2001

(54) (METH)ACRYL SYRUP, METHOD OF MANUFACTURING THE SAME, AND METHOD OF MANUFACTURING MOLDING MATERIAL INCLUDING THE SAME

(75) Inventors: Masazumi Sasabe, Kakogawa; Akihiko Fukada, Suita; Keiichiro Mizuta, Takatsuki, all of (JP)

(73) Assignee: Nippon Shokubai Co., Ltd., Osaka (JP)

(*) Notice: Under 35 U.S.C. 154(b), the term of this patent shall be extended for 0 days.

(21) Appl. No.: 08/849,612

(22) PCT Filed: Oct. 2, 1996

(86) PCT No.: PCT/JP96/02860

§ 371 Date: Jun. 4, 1997

§ 102(e) Date: Jun. 4, 1997

(87) PCT Pub. No.: WO97/12918

PCT Pub. Date: Apr. 10, 1997

(30) Foreign Application Priority Data

| Oct. 6, 1995 | (JP) | 7-260530 |
| Mar. 21, 1996 | (JP) | 8-065001 |
| Apr. 23, 1996 | (JP) | 8-101603 |
| Jul. 18, 1996 | (JP) | 8-189704 |

(51) Int. Cl.$^7$ ............. C08F 265/04; C08L 33/06; C08L 9/06; C08J 5/10

(52) U.S. Cl. ............. 525/262; 525/71; 525/74; 525/93; 525/261; 525/286; 524/321; 524/433

(58) Field of Search ............. 526/224; 525/262, 525/261, 286, 71, 93, 74; 524/321, 433

(56) References Cited

U.S. PATENT DOCUMENTS

| 3,730,930 | * | 5/1973 | Labana et al. | 525/286 |
| 4,524,190 | | 6/1985 | Glasgow et al. | 525/370 |
| 4,617,367 | * | 10/1986 | Watanabe et al. | 525/286 |
| 4,806,600 | | 2/1989 | Kano et al. | 525/206 |
| 4,950,716 | * | 8/1990 | Fischer et al. | 525/148 |
| 5,484,850 | * | 1/1996 | Kempter et al. | 525/286 |
| 5,530,041 | * | 6/1996 | Minghetti et al. | 525/228 |
| 5,847,036 | * | 12/1998 | Takabatake et al. | 525/285 |

FOREIGN PATENT DOCUMENTS

| 1 154 943 | 9/1963 | (DE) . |
| 26 35 122 | 2/1977 | (DE) . |
| 44 05 041 A1 | 8/1995 | (DE) . |
| 0 124 782 A2 | 11/1984 | (EP) . |
| 0 200 530 A2 | 11/1986 | (EP) . |
| 0 246 918 A1 | 11/1987 | (EP) . |
| 273795 | * 7/1988 | (EP) . |
| 0 273 795 A2 | 7/1988 | (EP) . |
| 2 528 858 | 12/1983 | (FR) . |
| 1 211469 | 11/1970 | (GB) . |
| 2 219 591 | 12/1989 | (GB) . |
| 48-20834 | 3/1973 | (JP) . |
| 50-035278 | * 4/1975 | (JP) . |
| 50-35278 | 4/1975 | (JP) . |
| 53-2189 | 1/1978 | (JP) . |
| 61-24357 B2 | 6/1986 | (JP) . |
| 63-37101 | 2/1988 | (JP) . |
| 63-179912 | 7/1988 | (JP) . |
| 64-11652 B2 | 2/1989 | (JP) . |
| 2-62127 B2 | 12/1990 | (JP) . |
| 5-171022 | * 7/1993 | (JP) . |
| 6-298883 | 10/1994 | (JP) . |
| 7-188505 | * 7/1995 | (JP) . |
| WO 93/25596 | 12/1993 | (WO) . |

OTHER PUBLICATIONS

Database WPI, Section Ch, Week 7529, XP–002114808, JP 50 035278, *Derwent Publications Ltd.,* Apr.3, 1975.
English abstract of N.*
English abstract of O.*

* cited by examiner

*Primary Examiner*—Donald R. Wilson
(74) *Attorney, Agent, or Firm*—Kubovcik & Kubovcik

(57) ABSTRACT

The present invention provides (meth)acryl syrup which shows excellent storage stability as a molding material, and also provides a method of manufacturing the (meth)acryl syrup in a shorter period of time compared with the conventional method, and a molding material which permits a molded article having excellent heat-resistance, solvent-resistance, weathering resistance, and water-resistance, etc., to be manufactured. The (meth)acryl syrup is manufactured, for example, by polymerizing a monomer component including (meth)acrylic ester and a vinyl monomer having a carboxyl group in a presence of a thiol compound, and subsequently processing the reaction mixture with maleic anhydride and a basic compound. The molding material includes the (meth)acryl syrup, and may also include a thickening agent, derivatives of succinic acid, a reinforcing material, etc.

11 Claims, No Drawings

(METH)ACRYL SYRUP, METHOD OF MANUFACTURING THE SAME, AND METHOD OF MANUFACTURING MOLDING MATERIAL INCLUDING THE SAME

FIELD OF THE INVENTION

The present invention generally relates to (meth)acryl syrup, a method of manufacturing the same, and a method of manufacturing molding materials including the same.

BACKGROUND OF THE INVENTION

Conventionally, molding materials including acryl syrup have been used in a variety of fields. For example, Japanese Examined Patent Application No. 11652/1989 (Tokukosho 64-11652) discloses crosslinkable acryl syrup including a polymer having a carboxyl group, and a crosslinkable monomer having a plurality of functional groups. Japanese Examined Patent Application No. 24357/1986 (Tokukosho 61-24357) discloses acryl syrup having a carboxyl group. Further, Japanese Examined Patent Application No. 2189/1978 (Tokukosho 53-2189) discloses syrup obtained by processing a thiol compound remaining in the syrup using maleic anhydride and a basic compound.

The thiol compound is typically used as a chain transfer agent for use in the polymerization reaction, and a stabilizer of the syrup. Therefore, the syrup obtained by a polymerization reaction in a presence of thiol compound contains unreacted thiol compound. Such residual thiol compound in the syrup may cause odor to be generated. The residual thiol compound also causes the viscosity to be gradually increased on storage, and may cause the syrup to be gelled. Furthermore, molded articles prepared from the molding materials including syrup are inferior in their solvent-resistance, water-resistance, and weathering resistance.

The described conventional acryl syrup is inferior in its storage stability (a so-called shelf life) as molding materials. Besides, a long time is required for curing such molding materials including acryl syrup, and the molded article prepared from the molding materials is inferior in its heat-resistance and solvent-resistance. On the other hand, when adopting the acryl syrup having no carboxyl group, a long time is required for manufacturing acryl syrup. The described deficiencies of the conventional acryl syrup have led to the need for development of a desirable (meth)acryl syrup and a manufacturing method of the same, and molding materials including the same.

Additionally, the method disclosed in Japanese Examined Patent Application No. 2189/1978 (Tokukosho 53-2189) is only applicable to the specific syrup. Thus, the method does not offer the solution of eliminating the described problems associated with the conventional (meth)acryl syrup.

The present invention is achieved in the hope of finding the solution to the above-mentioned problems. Accordingly, the first object of the present invention is to provide (meth)acryl syrup which shows an excellent storage stability as a molding material. The second object is to provide a manufacturing method of the (meth)acryl syrup which permits (meth)acryl syrup to be manufactured in a shorter time compared with the conventional method. The third object of the present invention is to provide molding materials which can be cured in shorter period of time compared with the conventional method, while having excellent properties in their heat-resistance, solvent-resistance, weathering resistance and water-resistance, etc.

DISCLOSURE OF THE INVENTION

Extensive studies have been made by the inventors of the present invention on (meth)acryl syrup, the manufacturing method of the same, and a molding material including the same. As a result, they have found that (meth)acryl syrup prepared, for example, by the following methods shows excellent storage stability (a so-called shelf life) as a molding material.

a) After polymerizing a monomer component including (meth)acrylic ester with a vinyl monomer having a carboxyl group in a presence of a thiol compound, the reaction mixture is processed with maleic anhydride and a basic compound; and b) After polymerizing a monomer component including the (meth)acrylic ester in a presence of a thiol compound, the reaction mixture is processed with the maleic anhydride and a basic compound, and a vinyl monomer having a carboxyl group is added to the reaction mixture. They have also found that the molded article manufactured from the molding materials including (meth)acryl syrup prepared in the described methods shows excellent heat-resistance, solvent-resistance, weathering resistance and water-resistance to complete the present invention.

Namely, in order to solve the above problem, the method of manufacturing (meth)acryl syrup in accordance with the present invention is characterized by including the steps of:

(a) polymerizing a monomer component including (meth)acrylic ester with a vinyl monomer having a carboxyl group in a presence of a thiol compound; and (b) processing a reaction mixture using maleic anhydride and a basic compound after the step (a).

In order to solve the above problem, another method of manufacturing (meth)acryl syrup in accordance with the present invention is characterized by including the steps of:

(a) polymerizing a monomer component including (meth)acrylic ester in a presence of a thiol compound; and (b) processing a reaction mixture using maleic anhydride and a basic compound and adding a vinyl monomer having a carboxyl group to the reaction mixture after the step (a).

According to the described methods, by adopting the vinyl monomer having a carboxyl group and processing the reaction mixture with maleic anhydride and the basic compound, the (meth)acryl syrup which shows excellent storage stability as a molding material can be manufactured in a shorter period of time compared with the conventional method. The described method offers (meth)acryl syrup which shows excellent storage stability as a molding material can be achieved.

In order to solve the above problem, the molding material in accordance with the present invention is characterized by including (meth)acryl syrup prepared by any of the described methods of the present invention. In order to solve the described problem, a molding material in accordance with the present invention is characterized by including (meth)acryl syrup obtained by polymerizing a monomer component including (meth)acrylic ester in a presence of a thiol compound, and subsequently processing the resulting reaction mixture with maleic anhydride and the basic compound, and a vinyl monomer having a carboxyl group.

The described structure permits the molding material to be cured in a shorter period of time compared with the conventional (meth)acryl syrup, and offers the molding material which shows excellent properties in its heat-resistance, solvent-resistance, weathering resistance and water-resistance.

The present invention will now be described in further detail.

(i) A (meth)acryl syrup in accordance with the present invention is manufactured by polymerizing a monomer component including (meth)acrylic ester with a vinyl monomer having a carboxyl group in a presence of a thiol compound, and subsequently processing the reaction mixture with maleic anhydride and a basic compound;

(ii) Another (meth)acryl syrup in accordance with the present invention is manufactured by polymerizing a monomer component including (meth)acrylic ester in a presence of a thiol compound, and subsequently processing the reaction mixture with maleic anhydride and a basic compound and adding a vinyl monomer having a carboxyl group to the reaction mixture;

(iii) Still another (meth)acryl syrup in accordance with the present invention is manufactured by polymerizing a monomer component including (meth)acrylic ester in a presence of a thiol compound, and subsequently adding a vinyl ether compound and/or a vinyl thioether compound to the reaction mixture;

(iv) Still another (meth)acryl syrup in accordance with the present invention is manufactured by polymerizing a monomer component including (meth)acrylic ester with a vinyl monomer having a carboxyl group in a presence of a thiol compound, and subsequently adding a vinyl ether compound and/or a vinyl thioether compound to the reaction mixture;

(v) Still another (meth)acryl syrup in accordance with the present invention is manufactured by polymerizing a monomer component including (meth)acrylic ester in a presence of a thiol compound and subsequently adding a vinyl ether compound and/or a vinyl thioether compound to the reaction mixture and adding a vinyl monomer having a carboxyl group to the reaction mixture;

(vi) Still another (meth)acryl syrup in accordance with the present invention includes a (meth)acrylic ester polymer obtained by polymerizing a monomer component including (meth)acrylic ester and a vinyl monomer having a carboxyl group in a presence of a thiol compound, subsequently adding glycidyl (meth)acrylate and/or methyl glycidyl (meth)acrylate to the reaction mixture before or after adding a vinyl ether compound and/or a vinyl thioether compound to the reaction mixture, and esterifying the carboxyl group in the polymer so that a side chain having a polymerizable double bond is bonded to a main chain; and (vii) Still another (meth)acryl syrup in accordance with the present invention includes a (meth)acrylic ester polymer obtained by polymerizing a monomer component including (meth)acrylic ester with a vinyl monomer having a carboxyl group in a presence of a thiol compound, and subsequently esterifying the reaction mixture and an unsaturated epoxy compound in a presence of a metal compound of at least one element selected from the group consisting of Zn, Sn, and Zr so that a side chain having a polymerizable double bound is bonded to a main chain.

The polymer may include an oligomer having a polymerization degree of 2–20, a prepolymer obtained by terminating the polymerization reaction of a monomer before completion, etc.

The monomer component includes (meth)acrylic ester and may also include a vinyl compound (monomer) if necessary. The (meth)acrylic ester of the present invention is limited but may be:

(1) alkyl (meth)acrylate such as methyl(meth)acrylate, ethyl(meth)acrylate, n-propyl(meth)acrylate, isopropyl (meth)acrylate, n-butyl(meth)acrylate, isobutyl(meth)acrylate, s-butyl(meth)acrylate, t-butyl(meth)acrylate, 2-ethylhexyl(meth)acrylate, lauryl (meth)acrylate, etc.;

(2) cycloalkyl(meth)acrylate such as cyclohexyl (meth)acrylate, etc.;

(3) glycidyl(meth)acrylate; and (4) basic (meth)acrylate such as dimethyl aminoethyl (meth)acrylate, diethylaminoethyl (meth)acrylate, etc.

Examples of the (meth)acrylate of the present invention also include (meth)acrylamide; N-alcoxy substituted (meth)acrylamide such as N-methoxy methylacrylamide, N-ethoxymethylacrylamide. Only one kind of the above-listed (meth)acrylate may be adopted, or two or more kinds thereof may be suitably mixed and adopted.

Of all the above-listed compounds, methyl methacrylate and (meth)acrylate including methyl methacrylate as a main component are especially preferable. Namely, by adopting (meth)acryl syrup having methyl methacrylate as a main component as a molding material, a molded article (cured product) which has still improved properties in weathering resistance, transparency, gloss on the surface, and appearance that is safer to use can be achieved.

When adopting basic (meth)acrylate as (meth)acrylate, it is preferable to use it with not less than 100 percent by weight of neutral (meth)acrylate with respect to the basic (meth)acrylate. Such neutral (meth)acrylate may be the above-listed alkyl (meth)acrylate, cycloalkyl (meth)acrylate, etc.

The vinyl compound of the present invention is not particularly limited as long as the carboxyl group is not contained. Examples of such vinyl compound include:

(1) α-olefin, dienes, acetylenes;

(2) styrene compounds such as styrene, α-methylstyrene, vinyltoluene, chlorostyrene, etc.;

(3) vinyl ester such as vinyl acetate, etc.;

(4) aryl alcohols such as aryl alcohol, ethylene glycol monoaryl ether, propylene glycol monoaryl ether, etc.;

(5) (meth)acrylonitrile;

(6) unsaturated basic compounds;

(7) N-substituted maleimide such as N-methyl maleimide, N-ethylmaleimide, N-n-propylmaleimide, N-isopropylmaleimide, N- butylmaleimide, N-phenyl maleimide, N-m-tolylmaleimide, N-p-tolylmaleimide, N-α-naphthylmaleimide, N-benzylmaleimide, N-cyclohexylmaleimide, N,N'-ethylene-bis-maleimide, N,N'-trimethylene-bis-maleimide, N,N'-m-phenylene-bis-maleimide, N,N'-p-phenylene-bis-maleimide, etc., and (8) (meth)acrylate having a hydroxyl group, etc.

For the (meth)acrylate having a hydroxyl group, glycol (meth)acryate obtained by esterifying at least one hydroxyl group contained in glycol is especially preferable. Examples of (meth)acrylate having a hydroxy alkyl group include:

(1) (meth)acrylic ester having a hydroxyl alkyl group such as 2-hydroxylethyl(meth)acrylate, 2-hydroxylpropyl (meth)acrylate, etc.;

(2) (meth)acrylate of polyvalent alcohol such as glycerinemono(meth)acrylate, glycerinedi(meth)acrylate, pentaerythritolmono(meth)acrylate, pentaerythritol di(meth)acrylate, etc.; and (3) (meth)acrylate of high molecular weight glycol such as polyethyleneglycol mono(meth)acrylate, etc.

Only one kind of the above-listed vinyl compound may be adopted, or two or more kinds thereof may be suitably mixed and adopted. It is preferable that the ratio of mixing a vinyl compound in (meth)acrylic ester, i.e., the content of the vinyl compound in the monomer component, etc., is not more than 50 percent by weight although it differs depending on the kind of the vinyl compound and the combination with (meth)acrylic ester. In the case of adopting N-substituted maleimide as the vinyl compound, ratio ranging from 5 to 40 percent by weight is especially preferable with a still preferable range being from 10 to 30 percent by weight, and the most preferable range being from 15 to 25 percent by weight.

Furthermore, when adopting the (meth)acrylate having a hydroxyl group as the vinyl compound, it is especially preferable that the ratio of the vinyl compound is in a range of from 0.5 to 20 percent by weight with a still more preferable range being from 1 to 15 percent by weight, and the most preferable range being from 3 to 10 percent by weight.

Further, when adopting the (meth)acrylate having a hydroxyl group as the vinyl compound, it is not preferable that the vinyl compound content is less than 0.5 percent by weight for the following reason: That is, the number of polymerizable double bonds to be added in the (meth)acryl syrup by reacting a polymer (hereinafter referred to as a polymer having a hydroxyl group) obtained by polymerizing the monomer compound with the unsaturated isocyanate compound or an unsaturated acid anhydride (to be described later) would be limited, and the molded article having an excellent thermal strength cannot be obtained.

The vinyl monomer having a carboxyl group (hereinafter simply referred to as a vinyl monomer) is not particularly limited, as long as the compounds have a polymerizable double bond and a carboxyl group in one molecule. Examples of such vinyl monomer include:

(1) unsaturated monocarboxylic acid such as acrylic acid, methacrylic acid, crotonic acid, vinyl benzoic acid, etc.;

(2) unsaturated dicarboxylic acid such as maleic acid, fumaric acid, itaconic acid, citraconic acid, and (3) monoesters thereof. Examples of the monoesters of the unsaturated dicarboxylic acid include: monomethyl maleate, monoethyl maleate, monobutyl maleate, monooctyl maleate, monomethyl maleate, monoethyl fumarate, monobutyl maleate, monooctyl fumarate, monoethyl citraconate, etc.

Other than the above, a compound obtained by the monoesterification of (meth)acrylic acid having a hydroxyl group, i.e., a half-ester of acid anhydride may be used as a vinyl monomer. Examples of the acid anhydride include: succinic anhydride, phthalic anhydride, hexahydrophthalic anhydride, etc.

Examples of the (meth)acrylic ester having a hydroxyl group include: 2-hydroxyethyl(meth)acrylate, ε-caprolactone ring-opening additives of 2-hydroxyethyl (meth)acrylate, γ-butylolactone ring-opening additives of 2-hydroxyethyl(meth)acrylate, etc. Examples of the half ester of the acid anhydride include: a monoester of succinic acid, a monoester of phthalic acid, a monoester of hexaphthalic acid, etc.

Only one kind of the above-listed vinyl monomer may be adopted, or two or more kinds thereof may be suitably mixed and adopted. The ratio of the monomer component to the vinyl monomer of the total content of 100 percent by weight is preferably set in a range of from 80 to 99.5 percent by weight. On the other hand, the vinyl monomer content is preferably set in a range of from 0.5 to 20 percent by weight with more preferable range being from 1.0 to 15 percent by weight.

In the respective (meth)acryl syrups manufactured by the described methods (i), (ii), (iv) and (v), it is still more preferable that the content of the vinyl monomer is in a range of from 1.5 to 10 percent by weight. On the other hand, in the respective (meth)acryl syrup manufactured by the described methods (vi) and (vii), it is still more preferable that the vinyl monomer content is in a range of from 3 to 10 percent by weight.

By adopting the vinyl monomer in the described range, the (meth)acryl syrup can be manufactured in a shorter period of time compared with the conventional method, and the molded article prepared from the molding material including the (meth)acryl syrup has improved properties in its heat-resistance, solvent-resistance, weathering resistance, water-resistance, etc. Furthermore, such molding material can be cured in a shorter period of time, and the cured product (molded article) has a larger average molecular weight compared with a conventional molding material. Furthermore, such cured product has an excellent thermal strength, and offers molded article which is hardly colored.

When the content of the vinyl monomer is less than 0.5 percent by weight, not much function and effect can be expected by adopting the vinyl monomer. Namely, such condition is not preferable because it would be difficult to reduce the time required for manufacturing (meth)acryl syrup, and the various properties of the resulting molded article such as heat-resistance, etc., would be lowered. Besides, the molecular weight of the cured product cannot be increased.

Furthermore, in the case of manufacturing molding materials by reacting (meth)acryl syrup obtained by a polymerizing a monomer component with a vinyl monomer with an unsaturated epoxy compound (to be described later), a number of polymerizable double bounds to be introduced in the (meth)acryl syrup by the reaction is limited, and a molded article having excellent thermal strength cannot be achieved. On the other hand, it is not preferable that the vinyl monomer content exceeds 20 percent by weight, because the weathering resistance and water-resistance of the resulting molded article would be lowered.

Such vinyl monomer may be mixed with the monomer component prior to carrying out a polymerization or may be added to the reaction mixture after the polymerization. Furthermore, the vinyl monomer may be added after processing the thiol compound. Alternatively, the (meth)acryl syrup and the vinyl monomer may be mixed when manufacturing the molding material after manufacturing the (meth)acryl syrup by processing the thiol compound.

The thiol compound is a chain transfer agent having a mercapt group in a molecule, and has a function of adjusting a molecular weight of a polymer in the reaction mixture. Examples of thiol compound include:

(1) alkyl mercaptan such as t-butylmercaptan, n-octyl mercaptan, n-dodecylmercaptan, etc.;

(2) aromatic mercaptan such as thiophenol, thionaphtol, etc.;

(3) thioglycocolic acid;

(4) alkyl ester thioglycolate such as octylthioglycolate, ethylene glycol dithioglycolate, trimethylol propane-tris-(thioglycolate), pentaerythritol tetrakis-(thioglycolate) etc.;

(5) β-melcaptopropionate (3-mercaptopropionate); and (6) alkyl ester β-melcaptpropionate such as octyl β-mercaptopropionate, 1,4-butanedioldi(β-thiopropionate), trimethylolpropanetris-(β-thiopropionate), pentaerythritol tetrakis-(β- thiopropionate), etc. Only one kind of the above-listed thiol compound may be adopted, or two or more kinds thereof may be suitably mixed and adopted. Other than the above, a-methylstyrene dimer, carbon tetrachloride may be adopted for the chain transfer agent.

The amount of the thiol compound to be added with respect to a mixture (hereinafter referred to as a monomer composition) of a monomer component and a vinyl monomer, or an amount of the thiol compound to be added with respect to the monomer component are not particularly limited, and should be suitably adjusted depending on the kind of the thiol compound and the combination with the monomer component, etc. However, it is generally preferable to add the thiol compound in an amount range of from 0.01 to 15 percent by weight with the most preferable range being from 0.01 to 2 percent by weight. By adding the thiol compound, the polymerization reaction can be controlled in a very simple manner.

For the method of polymerization, for example, a bulk polymerization, a polymerization in a solvent, a suspension polymerization, emulsion polymerization, etc., may be adopted. Of all of the above-listed polymerization methods, the bulk polymerization is especially preferable. In the case of suspension polymerization, the polymerization may be performed by suspending a monomer composition (or a monomer component) in a dispersion medium such as water using a dispersion stabilizer such as polyvinyl alcohol, etc.

When carrying out the polymerization of the monomer composition in the presence of the thiol compound, or the polymerization of the monomer component in a presence of the thiol compound, it is preferable to use a polymerization initiator. Examples of such polymerization initiator include:

(1) organic peroxide such as benzoyl peroxide, lauroyl peroxide, methyl ethyl ketone peroxide, t-butylperoxy-2-ethylhexanoate, t-butylperoxyoctoate, t-butylperoxybenzoate, cumenehydroperoxide, cyclohexanone peroxide, dicumuyl peroxide, bis(4-t-butylcyclohexyl)peroxydicarbonate, 1,1-bis(t-hexylperoxy)-3,3,5-trimethylcyclohexane, etc.; and (2) azo compound such as 2,2'-azobisisobutylonitrile, 2-phenylazo-2,4-dimethyl-4-methoxyvaleronitrile, etc. Only one kind of the above-listed polymerization initiator may be adopted, or two or more kinds thereof may be suitably mixed and adopted. The respective amounts of the polymerization initiator to be added with respect to the monomer composition or the monomer component are not particularly limited.

The reaction conditions such as the reaction temperature, reaction time, etc., for the polymerization are not particularly limited, and, for example, a known reaction condition may be adopted. Here, the method in which the polymerization of the monomer composition is terminated before completion is more preferable as the (meth)acryl syrup can be applied in one step. As a result, a reaction mixture containing a polymer having a carboxyl group can be obtained. Furthermore, by carrying out the polymerization of the monomer component (partial polymerization), a reaction mixture including a polymer which does not have a carboxyl group can be obtained.

Although not particularly limited, the weight-average molecular weight (Mw) of the polymer is preferably in a range of from 6,000 to 1,000,000 with a more preferable range being from 30,000 to 1,000,000, and the number-average molecular weight (Mn) is preferably in a range of from 3,000 to 500,000, with a more preferable range being from 10,000 to 200,000.

It is preferable to carry out the polymerization reaction in a nitrogen gas atmosphere. Further, upon completing the reaction, the ratio of the polymer to unreacted monomer composition (or monomer component) in the reaction mixture of the total amount of 100 percent by weight is preferably in a range of from 7–80 percent by weight to 93–20 percent by weight.

Upon completing the reaction, it is permitted to mix the monomer composition (or monomer component) in the reaction mixture, or after separating the polymer from the reaction mixture, the monomer composition (monomer component) may be mixed in the polymer. In this case, the monomer composition (monomer component) to be additionally mixed may be the same or different monomer composition (monomer component) as or from that used in preparing the reaction mixture. However, alkyl ester methacrylate and a styrene compound are especially preferable. For alkyl ester methacrylate, methyl methacrylate, ethyl methacrylate, n-propyl methacrylate, n-butyl methacrylate, s-butyl methacrylate, t-butyl methacrylate are especially preferable. For the styrene compound, styrene is especially preferable. The molded article prepared from the described (meth)acryl syrup as a molding compound offer still improved properties in its weathering resistance, transparency, the gloss on the surface etc., with improved appearance, safe use, etc.

Further, upon completing the reaction, the maleimide compound may be further added to the reaction mixture. The maleimide compound specifically indicate: N-substituted maleimide; an oligomer and a polymer obtained by carrying out a polymerization of a monomer composition including N-substituted maleimide. Only one kind of the above-listed maleimide compounds may be adopted, or two or more kinds thereof may be suitably mixed and adopted. Of all maleimide compounds, N-cyclohexylmaleimide is especially preferable as the coloring of the molded article prepared by molding a molding material with the application of heat and pressure can be suppressed with a desirable appearance. As to the maleimide compounds, those commercially available or obtained by synthesizing by the known method may be adopted. For example, N-cyclohexylmaleimide can be synthesized by carrying out a ring-closure reaction after obtaining N-cyclohexylmaleic monoamide by reacting maleic anhydride and cyclohexyl amine. The monomer composition for use in obtaining the oligomer and the polymer may include the above-exemplified vinyl compounds other than N-substituted maleimide.

When mixing the maleimide compound with the reaction mixture, the amount of use of the maleimide compound with respect to the total amount of 100 percent by weight is preferable in a range of from 5 to 40 percent by weight, with a still more preferable range being from 10 to 30 percent by weight, and the most preferable range being from 15 to 25 percent by weight. Here, it is not preferable to use the maleimide compound in an amount less than 5 percent by weight as the moldability of the resulting molding material would be lowered, and the heat-resistance and the gloss and smoothness on the surface of the molded article would be lowered. On the other hand, it is not preferable that the content of the maleimide compound is above 40 percent by weight as a sufficient strength of the resulting molded article cannot be obtained.

(Meth)acryl syrup prepared by the method (i) is hereinafter referred to as (meth)acryl syrup A if needed to be distinguished from other (meth)acryl syrups. The (meth)acryl syrup A is suited for use in a sheet molding compound (hereinafter referred to as SMC), a bulk molding compound (hereinafter referred to as BMC), a premix material, a casting material, etc.

(Meth)acryl syrup prepared by the method (ii) is hereinafter referred to as (meth)acryl syrup B if needed to be distinguished from other (meth)acryl syrups. The (meth)acryl syrup B is suited for use in a casting material, a premix material, etc.

The described (meth)acryl syrup A or B may include an unreacted monomer component. Molding compounds prepared by mixing (meth)acryl syrup obtained by polymerizing the monomer component in a presence of a thiol compound, with the vinyl monomer is suited for use in casting material.

The basic compound of the present invention is not limited to but may be: primary amine such as methyl amine, ethyl amine, etc.; secondary amine such as dimethyl amine, diethyl amine, etc.; tertiary amine such as trimethyl amine, triethyl amine, etc.; a diazo compound; a triazol compound, etc. only one kind of the above-listed basic compounds may be adopted, or two or more kinds thereof may be suitably mixed and adopted. It is preferable that such basic compound be added with respect to the thiol compound in the polymerization reaction is being carried out in a range from 0.01 to 1.5 times mole, with more preferable range being from 0.03 to 1.2 times mole.

It is preferable that maleic anhydride to be used in combination with the basic compound in a range of from 0.5 to 3.0 times mole with respect to the thiol compound to be added in the polymerization reaction, with a preferable range being from 0.7 to 2.8 times mole.

Here, if the basic compound is used in an amount less than 0.01 times mole, or the maleic anhydride is used in an amount above 0.5 times mole with respect to the thiol compound to be added in the polymerization reaction, the thiol compound may not be processed completely. If the thiol compound remains in the (meth)acryl syrup, the storage stability of the (meth)acryl syrup as a molding material is lowered. Moreover, a long time is required in curing the molding material including (meth)acryl syrup, and the average molecular weight of the cured product is not increased.

If the amount of use of the basic compound with respect to the thiol compound to be added in the polymerization exceeds 1.5 mole, it is not preferable as the weathering resistance of the resulting molded article is lowered. When the amount of use of the maleic anhydride with respect to the thiol compound to be added in the polymerization process exceeds 3.0 times mole, it is not preferable as the water-resistance of the molded article is lowered. Here the temperature and the time for processing the thiol compound are not particularly limited. For example, the thiol compound can be processed only by mixing and stirring the maleic anhydride and the basic compound in the reaction mixture.

As described, a (meth)acryl syrup solution may be obtained, for example, by the following methods: a) After polymerizing the monomer component and the vinyl monomer in the presence of the thiol compound, the reaction mixture is processed using the maleic anhydride and the basic compound; or b) After polymerizing the monomer component in the presence of the thiol compound, the reaction mixture is processed using the maleic anhydride and the basic compound, and the vinyl monomer is added to the reaction mixture. In the present invention, (meth)acryl syrup is defined as a mixture of (meth)acryl syrup A and B, etc., prepared by the two or three of the described methods.

The vinyl ether compound in accordance with the present invention is not specifically limited, and any vinyl ether compound having a double bond reactive to a thiol compound may be used. Examples of such vinyl ether compound include:

a) aliphatic vinyl ether such as methyl vinyl ether, ethyl vinyl ether, n-propyl vinyl ether, isopropyl vinyl ether, n-butyl vinyl ether, isobutyl vinyl ether, etc.;

b) cycloalkyl vinyl ether such as cyclohexyl vinyl ether, etc.; and c) cyclic ether such as 2,3-dihydrofuran, 3,4-dihydrofuran, 2,3-dihydro-2H-pyrane, 3,4-dihydro-2H-pyrane, 3,4-dihydro-2-methoxy-2H-pyrane, 3,4-dihydro-2-ethoxy-2H-pyrane, 3,4-dihydro-4,4-dimethyl-2H-pyrane-2-on, etc.

The available vinyl ether compound is not particularly limited, and only one kind of the vinyl ether compound may be adopted, or two or more kinds thereof may be suitably mixed and adopted.

The vinyl thioether compound of the present invention is not particularly limited, and any vinyl thioether compound with a double bond reactive to the thioether compound may be used. For example, above-listed examples of the vinyl ether compound in which an oxygen atom is replaced by the sulfur atom may be used. Specifically, such vinyl thioether compound may be aliphatic vinyl thioether corresponding to aliphatic vinyl ether in the above-listed examples; cycloalkyl vinyl thioether corresponding to cycloalkyl vinyl ether in the above-listed examples; and cyclic thioether corresponding to the cyclic ether in the above-listed examples, etc. Only one kind of the above-listed vinyl thioether compound may be adopted, or two or more kinds thereof may be suitably mixed and adopted.

The amount of use of the vinyl ether compound and/or vinyl thioether compound with respect to the thiol compound used in the polymerization reaction is preferably in a range of from 0.5 to 5 times mole with a still more preferable range being from 0.8 to 3 times mole. It is not preferable to use it less than 0.5 times mole because the thiol compound may not be processed completely. Specifically, if the thiol compound remains in (meth)acryl syrup, the storage stability when adopting the molding material including (meth) acryl syrup is lowered. Additionally, a long time is required for the process of curing the molding material including (meth)acryl syrup, and an average molecular weight of the cured product cannot be increased. On the other hand, it is also not preferable to use it more than 5 times mole because the weathering resistance of the resulting molded article is lowered.

The conditions for processing the thioether compound such as temperature, time, etc., are not particularly limited, and may be suitably adjusted in consideration of the composition of the reaction mixture, etc. The method of adding the vinyl ether compound and/or vinyl thioether compound is not particularly limited. For example, these compounds may be added to the reaction mixture, or the reaction mixture may be added to the compound. The thiol compound may be processed only by mixing with the vinyl ether compound and/or vinyl thioether compound with stirring.

The (meth)acryl syrup obtained by processing it with the vinyl ether compound and/or the vinyl thioether compound, (hereinafter referred to as (meth)acryl syrup C when needed to be distinguished from other (meth)acryl syrups) may be used as a paint, and especially suited for use in molding material such as SMC, BMC, premix material, a casting material, a pultrusion molding material, an injection molding material, an extrusion molding material, etc.

The thiol compound may be processed in a presence of a catalyst such as Lewis acid, amine salt, tertiary amine, quaternary ammonium salt, phosphonium salt, metal salt, etc. This offers an effect of expediting the reaction of the thiol compound with the vinyl ether compound and/or vinyl thio ether compound. When processing, the solvent may be used. For the solvent, water and/or organic solvent is preferable.

When adding the vinyl ether compound and/or vinyl thioether compound to the reaction mixture, if the reaction mixture contains the polymer having a carboxyl group, it is preferable to esterify the carboxyl group in the polymer by adding the glycidyl (meth)acrylate and/or methyl glycidyl (meth)acrylate. As a result, (meth)acryl syrup C' including a polymer having an ester bond is obtained.

The respective amounts of glycidyl (meth)acrylate and/or methylglycidyl (meth)acrylate are not particularly limited and suitably adjusted in accordance with a combination thereof. However, it is preferable that glycidyl (meth) acrylate and/or methyl glycidyl (meth)acrylate are added with respect to the vinyl monomer in an amount of from 0.5 to 2.0 times mole, with a still more preferable range being from 0.8 to 1.5 times mole.

When carrying out an esterification reaction (hereinafter referred to as an esterification reaction A when needed to be distinguished from other esterification reactions), an esterification catalyst may be used if necessary. Such esterification catalyst is not particularly limited as long as it permits a ring-opening reaction between a carboxyl group and an epoxy group to expedite.

Examples of such esterification catalyst include: tertiary amine such as dimethylbenzyl amine, triethyl amine, tetramethyl ethylenediamine, tri-n-octylamine, etc.; quaternary ammonium salt such as tetramethyl ammonium chloride, tetramethyl ammonium bromide, tetrabutyl ammonium bromide, etc., quaternary phosphonium salt such as benzyltriphenyl phosphonium chloride, etc.; metal salts, etc. Only one kind of the above-listed esterification catalyst may be adopted, or two or more kinds thereof may be suitably mixed and adopted.

However, it is preferable that the esterified catalyst is added in an amount ranging from 0.01 parts by weight to 5 parts by weight with respect to 100 parts by weight of the reaction mixture, with a still more preferable range being from 0.1 parts by weight to 3 parts by weight.

The esterification reaction A may be performed with a polymerization inhibitor if necessary. For such polymerization inhibitor, for example, hydroquinone, methyl hydroquinone, methoxyhydroquinone, t-butyl hydroquinone, etc., may be used. It is also permitted to carry out the polymerization reaction using a solvent if necessary. For the solvent, water and/or organic solvent is suitable.

According to the present invention, molding materials may be prepared by an esterification reaction (hereinafter referred to as an esterification reaction B if needed to be distinguished from other esterification reactions) of (meth) acryl syrup (unprocessed) resulting from a polymerization reaction of a monomer component including (meth)acrylic ester and a vinyl monomer having a carboxyl group in a presence of a thiol compound, and an unsaturated epoxy compound in a presence of a metal compound (to be described later).

The unsaturated epoxy compound is not particularly limited, and any unsaturated epoxy compound having both an epoxy group reactive to a carboxyl group and a polymerizable double bond in one molecule may be used. Examples of such unsaturated epoxy compound include: arylglycidyl ether, glycidyl (meth)acrylate, methyl glycidyl (meth)acrylate, mono(meth)acrylate of epoxy resin, etc. Only one kind of the above-listed unsaturated epoxy compound may be adopted, or two or more kinds thereof may be suitably mixed and adopted.

The amount of use of the unsaturated epoxy compound is not particularly limited may be suitably adjusted in consideration of the kind thereof, and a combination with (meth) acryl syrup. However, it is suitable that the unsaturated epoxy compound is used with respect to the vinyl monomer used in the manufacturing process of the (meth)acryl syrup in an amount ranging from 0.5 to 2 times mole, with a still more preferable range being from 0.8 to 1.5 times mole.

The metal compound is an esterifying catalyst including at least one element selected from the group consisting of zinc, tin, zirconium, and has a high catalyst activity. For this characteristic, the metal compound expedites an esterification reaction B of the carboxyl group contained in the (meth)acryl syrup and the epoxy group contained in the unsaturated epoxy group.

Examples of such metal compounds include: inorganic metal compounds, metal salt of oxoacid, metal salt of polyoxoacid, organic metal compounds, metal salt of organic acid, metal complex salt, etc. A molding material prepared using the described metal compounds shows still improved storage stability. By adopting such molding material, a molded article which is hardly colored can be obtained.

Examples of the inorganic metal compound include: a) metal halide such as metal fluoride, metal chloride, metal bromide, metal iodide, etc.; b) metal chalcogenide such as metal oxide, metal sulfide; c) metal nitride; d) metal phosphide; e) metal arsenide; f) metal carbide; g) metal silicide; h) metal boride; i) metal cyanide; j) metal hydroxide; k) metal chloride oxide, etc. Specifically, zinc chloride, zirconium oxide, tin sulfide, etc.

Examples of metal salt of oxoacid include: metal salt of sulfic acid, metal salt of nitric acid, metal salt of phosphoric acid, metal salt of phosphinic acid, metal salt of phosphonic acid, metal salt of metaphosphoric acid, metal salt of boric acid, metal salt of chloric acid, metal salt of bromic acid, metal salt of iodic acid, metal salt of silicic acid, etc. Specifically, tin sulfate, zinc phosphate, zirconium nitrate, etc. In the present invention, metal salt of oxoacid includes hydrogen salt such as zinc hydrogen phosphate, etc.

Examples of metal polyoxoacid include: metal salt of polyphosphoric acid, metal salt of polyboric acid, metal salt of polyniobic acid, metal salt of polytantalic acid, metal salt of polymolybdic acid, metal salt of polyvanadic acid, metal salt of polytungstic acid, etc. Specifically, for example, zinc polyphosphate, etc., may be used.

Such organic metal compound may be a compound of a formula (1)

$$M\text{-}(R)_n \tag{1}$$

wherein M is zinc, tin, or zirconium, R is an alkyl group of a methyl group, an ethyl group, etc., or an alcoxyl group such as methoxy group, an ethoxy group, etc., and n is an integer of 1 to 6. Specifically, diethylzinc, tetraethoxy zirconium, etc., may be used.

Examples of metal salts of organic acid include: metallic soap, metal salts of acetic acid, benzoic acid, salicylic acid, oxalic acid, tartaric acid, lactic acid, citric acid, etc. Examples of the metallic soap include: metal salt of aliphatic acid such as metal salts of lauric acid, myristic acid, palmitic acid, stearic acid, oleic acid, etc.; metal salts of naphthenic acid, octylic acid, sulfonic acid, sulfuric ester, phosphoric ester, etc. Specifically, zinc octylate, tin stearate; zinc acetate, zinc salicylate, etc., may be used.

The metal complex salt may be a compound of a formula (2):

$$M\text{-}(L)_n \tag{2}$$

wherein M is zinc, tin or zirconium, L is a ligand such as acetylacetone, etc., and n is an integer of 1 to 6. Specifically, acetylacetone zinc may be used.

Only one kind of the above-listed metal compound may be adopted, or two or more kinds thereof may be suitably mixed and adopted. The amount of use of the metal compound is not particularly limited, and may be suitably adjusted in consideration of the kind thereof, a combination with (meth)acryl syrup and an unsaturated epoxy compound. However, it is preferable that the metal compound is used in an amount ranging from 0.01 to 5 parts by weight with respect to 100 parts by weight of (meth)acryl syrup with a still more preferable range being from 0.1 to 3 parts by weight.

When carrying out the esterification reaction B, for example, the above listed polymerization inhibitor may be coexisted, and, for example, the above-listed solvent may be used, if necessary. Furthermore, instead of the metal compound in the esterification reaction B, the above-listed esterification catalyst may be used.

In the esterification reaction B, the order and the method of mixing unprocessed (meth)acryl syrup, unsaturated epoxy compound and the metal compound are not particularly limited. Namely, only requirement is that the metal compound is contained in the reaction system in the esterification reaction B of the unprocessed (meth)acryl syrup with the unsaturated epoxy compound.

As a result, an esterification reaction (ring-opening reaction) of the carboxyl group contained in the unprocessed (meth)acryl syrup and an epoxy group contained in the unsaturated epoxy compound is performed, and a polymerizable double bond may be introduced in the (meth)acryl syrup (hereinafter referred to as (meth)acryl syrup E if needed to be distinguished from other esterification reactions).

As a result, a molding material including a polymer of (meth)acrylate in which the side chain having a polymerizable double bond is connected to a main chain via the ester bond can be obtained. The molding material includes the (meth)acryl syrup E in which a polymerizable double bound is introduced via an ester bond, and the metal compound having at least one element selected from the group consisting of zinc, tin, and zirconium.

The molding material including (meth)acryl syrup E is especially suited for use as SMC, BMC, a premix material, a casting material, a pultrusion molding material, an injection molding material, an extrusion molding material, etc. Since (meth)acryl syrup E has a polymerizable double bond, it is thermosetting. Such polymerizable double bond may be introduced by an esterification reaction of (meth)acrylic ester polymer and a vinyl monomer.

The equivalent, i.e., weight-average molecular weight per polymerizable double bond of the (meth)acrylic ester polymer in which the polymerizable double bond is introduced is preferably in a range of from 200 to 10,000, with a more preferable range being from 1,000 to 8,000, with the most preferable range being from 2,000 to 5,000. By adjusting the equivalent of the double bond to fall within the described range, generation of crack in the molded article manufactured by curing the molding material can be suppressed.

If the equivalent of the double bond is less than 200, the molded article manufactured by curing the molding materials may not have a smooth and glossy surface. On the other hand, if the equivalent of the double bond is more than 10,000, the volume shrinkage of the molding material during the hardening process cannot be fully suppressed, and the molded article manufactured by curing the molding material may not have a smooth and glossy surface, or the thermal strength may be lowered.

The weight-average molecular weight of the (meth) acrylic ester polymer in which a polymerizable double bond is introduced is preferably in a range of from 3,000 to 500,000, with a more preferable range being from 5,000 to 100,000, and with the most preferable range being from 10,000 to 400,000. If the weight-average molecular weight is less than 3,000, the properties of the resulting molded article would be lowered. On the other hand, if the weight-average molecular weight exceeds 500,000, the viscosity of the (meth)acryl syrup E would be too high, which results in a lower operability of the molding process.

The molding materials including (meth)acryl syrup E and a metal compound or molding materials including (meth) acryl syrup C' may include at least one thermoplastic polymer selected from the group consisting of thermoplastic elastomer, thermoplastic resin and rubber if necessary.

In this case, it is preferable that the thermoplastic polymer is dispersed in (meth)acryl syrup C' or E. In the state where the thermoplastic polymer is dispersed, the thermoplastic polymer is expanded by heat when curing, thereby effectively suppressing a shrinkage of the molding material, i.e., the cured product. Namely, as the volume shrinkage of the molding material in the curing process is low, by curing the molding material, molded articles having smooth and glossy surface can be achieved.

"Dispersion" of the thermoplastic polymer in (meth)acryl syrup C' or E generally indicates the state where the thermoplastic polymer (dispersed phase) is dispersed in the (meth)acryl syrup C' or E in the particular form, and more specifically indicates the state where the fine particles with a diameter of not more than 1 mm of the thermoplastic polymer (dispersed phase) are dispersed in the (meth)acryl syrup C' or E, and the molding material is not transparent. "Being soluble" indicates the state where the dispersed phase with a particle diameter of around molecules or ions is dispersed to form a transparent molding material. "Thermosetting property" indicates such property that the viscosity is increased with an application of heat, and the product is insoluble in a solvent by a crosslinkable reaction is generated. "Thermoplastic property" indicates such property that the viscosity is lowered with an application of heat, and the product is soluble in at least a solvent of one kind.

The low shrinkage agent (to be described later) can be used together with the described thermoplastic polymer described in order to suppress the shrinkage of the molding material more effectively.

In the present invention, a thermoplastic elastomer is defined as a thermoplastic polymer including a rubber component (soft component) of an elastic structure and a resin component (hard component) of a structure of preventing a plastic deformation in a molecule, which shows a rubber elasticity at room temperature while showing a plastic property at high temperature. The thermoplastic resin is defined as a thermoplastic polymer including only a resin component (hard component) of a structure of preventing a plastic deformation in a molecule, which does not show rubber elasticity at room temperature. The rubber is defined as a polymer which shows a rubber elasticity at temperature ranging from room temperature and high temperature.

The thermoplastic elastomer of the present invention is not particularly limited, but may be:

a) styrene thermoplastic elastomers such as styrene/ethylene/propylene/styrene copolymer (SEPS), styrene/ethylene/butylene/styrene copolymer (SEBS), a maleic anhydride denatured styrene/ethylene/butylene/styrene copolymer (MA denatured SEBS), styrene/isoprene/styrene copolymer (SIS), styrene/butadiene/styrene copolymer (SBS), styrene/ethylene/propylene copolymer (SEP), etc.;

b) polyester thermoplastic elastomer;

c) polybutadiene thermoplastic elastomer, etc. Only one kind of the above-listed thermoplastic elastomer may be adopted, or two or more kinds thereof may be suitably mixed and adopted. The thermoplastic elastomer may be suitably selected for the kind of the (meth)acryl syrup C' or E, etc. However, of all the above-listed thermoplastic elastomer, styrene thermoplastic elastomer is especially preferable. Both straight line and radial styrene thermoplastic elastomers may be adopted.

In the case where the unreacted vinyl monomer contained in (meth)acryl syrup C' or E is methyl methacrylate or unreacted vinyl compound is styrene, the content of styrene in the styrene thermoplastic elastomer is preferably in a range of from 10 to 25 percent by weight, with a more preferable range being from 13 to 20 percent by weight. On the other hand, in the case where the other unreacted compounds than methyl methacrylate and styrene are included in the (meth)acryl syrup C' or E, such as t-butylmethacrylate, etc., the content of styrene is preferably in a range of from 10 to 40 percent by weight, with a more preferable range being from 13 to 30 percent by weight. By setting the content of styrene in the described range, the shrinkage of the molding material, i.e., the cured product can be suppressed still effectively.

Such thermoplastic resin is not limited but may acidic denatured polyvinyl acetate (acidic denatured PVAc), vinyl chloride-vinyl acetate copolymer (VCl-VAc), ethylene-vinyl acetate copolymer (EVA), cellulose acetate butylate (CAB), acrylonitrile-ethylenepropylenediene rubber-styrene copolymer (AES), etc. Only one kind of the above-listed thermoplastic resin may be adopted, or two or more kinds thereof may be suitably mixed and adopted. The thermoplastic resin may be suitably selected for the kind of (meth)acryl syrup C' or E.

The rubber of the present invention is not limited but may be:

a) diene rubber such as styrene-butadiene rubber (SBR), hydrogen added styrene-butadiene rubber (HSBR), nitrile-butadiene rubber (NBR), butadiene rubber (BR), natural rubber, isoprene rubber, etc., b) chloroprene rubber;

c) butyl rubber;

d) ethylene-propylene rubber;

e) acrylic rubber (ACM); and f) urethane rubber, etc. Only one kind of the above-listed rubber may be adopted, or two or more kinds thereof may be suitably mixed and adopted. The rubber may be suitably selected for the kind of (meth)acryl syrup C' or E, etc.

The glass transition temperature (hereinafter referred to as Tg) of the thermoplastic polymer is preferably in a range of from −100° C. to 80° C., with a more preferable range being from −70° C. to 30° C. and the most preferable range being from −60° C. to 0° C. When the Tg is lower than −100° C., the gloss on the surface of the molded article obtained by curing the molding material is lowered. On the other hand, when the Tg exceeds 80° C., it is difficult to achieve the thermal expansion of the thermoplastic polymer, and a sufficient effect of suppressing the shrinkage of the molding material, i.e., the cured product cannot be achieved. In the present invention, Tg of the thermoplastic polymer suggests the Tg of the rubber component, i.e., the Tg on the low temperature side when the thermoplastic polymer is a thermoplastic elastomer.

The amount of the thermoplastic polymer to be added with respect to the total amount of the (meth)acryl syrup C' or E and the polymer (100 percent by weight) is preferably in a range of from 2 to 50 percent by weight, with a more preferably range being from 5 to 30 percent by weight, with the most preferable range being from 10 to 20 percent by weight. If the amount of additive is less than 2 percent by weight, a sufficient effect of suppressing the shrinkage of the molding material, i.e., the cured product cannot be obtained. On the other hand, if the amount of additive exceeds 50 percent by weight, the viscosity of the (meth)acryl syrup C' or E is excessively increased, which makes it difficult to prepare compounds.

The thermoplastic polymer is not particularly limited as long as it is dispersed in (meth)acryl syrup C' or E stably. However, it is preferable that the dispersed phase with a particle diameter of from 5 nm to 800 μm, with more preferable range of the particle diameter being from 50 nm to 500 μm, and the most preferable range of the particle diameter being from 100 nm to 100 μm.

The molding material including the (meth)acryl syrup E and the metal compound or the molding material including (meth)acryl syrup C' may further include a dispersion stabilizer if necessary in order to stabilize the dispersed state of the thermoplastic polymer. As a result, a greater number of suitable combinations of (meth)acryl syrup C' or E and the thermoplastic polymer can be achieved.

For the dispersion stabilizer, any polymer including a portion which shows a high affinity with (meth)acryl syrup C' or E and a portion which shows a high affinity with the thermoplastic polymer. For example, when adopting a styrene thermoplastic elastomer as the thermoplastic polymer, a copolymer of styrene-vinyl acetate, a copolymer of styrene methyl methacrylate are suited.

The thermoplastic polymer can be dispersed in the (meth)acryl syrup C' or E, for example, by the following methods:

① A thermoplastic polymer is added to (meth)acryl syrup C' or E with stirring;

② After adding a thermoplastic polymer to the monomer composition with stirring, the polymerization of the resulting mixture is performed;

③ After adding a thermoplastic polymer to the vinyl monomer with stirring, a (meth)acrylic polymer is added; and ④ After adding a thermoplastic polymer to the vinyl monomer with stirring, the (meth)acryl syrup C' or E is added, etc.

In the described methods, the stirring may be performed at a rate of around 10,000 rpm, for example, using a high speed stirrer. The stirring time may be suitably selected according to the stirring rate. However, the stirring time is preferably not less than 1 minute and still more preferably not less than 10 minutes. Among the above listed methods, the method of adding the thermoplastic polymer to the (meth)acryl syrup C' or E is especially preferable in terms of convenience and efficiency.

A molding material in accordance with the present invention includes (meth)acryl syrup A resulting from a polymerization reaction of a monomer component including (meth)acrylic ester and a vinyl monomer having a carboxyl group in a presence of a thiol compound, and subsequently processing the resulting reaction mixture with maleic anhydride and a basic compound.

Another molding material in accordance with the present invention includes (meth)acryl syrup B prepared by polymerizing a monomer component including (meth)acrylic ester in a presence of a thiol compound and subsequently processing the reaction mixture with maleic anhydride and a basic compound, and a vinyl monomer.

Still another molding material in accordance with the present invention includes (meth)acryl syrup C prepared by adding a vinyl ether compound and/or a vinyl thioether compound to the reaction mixture obtained by polymerizing a monomer component including (meth)acrylic ester in a presence of a thiol compound.

The (meth)acryl syrup C may be obtained by adding a vinyl ether compound and/or vinyl thioether compound to a reaction mixture resulting from a polymerization reaction of a monomer component including (meth)acrylic ester and a vinyl monomer having a carboxyl group in a presence of a thiol compound.

Another molding material in accordance with the present invention includes (meth)acryl syrup C' including a (meth) acrylic ester polymer obtained by polymerizing a monomer component including (meth)acrylic ester and a vinyl monomer having a carboxyl group in a presence of a thiol compound, subsequently adding glycidyl (meth)acrylate and/or methyl glycidyl (meth)acrylate to the reaction mixture before or after adding a vinyl ether compound and/or a vinyl thioether compound to the reaction mixture, and esterifying the carboxyl group in the polymer so that a side chain having a polymerizable double bond is bonded to a main chain.

Still another molding material in accordance with the present invention includes (meth)acryl syrup E including (meth)acrylic ester polymer obtained by polymerizing a monomer component including (meth)acrylic ester and a vinyl monomer having a carboxyl group in a presence of a thiol compound and subsequently esterifying the reaction mixture and an unsaturated epoxy compound in a presence of a metal compound of at least one element selected from the group consisting of zinc, tin, and zirconium so that a side chain having a polymerizable double bond is bonded to a main chain.

Still another molding material in accordance with the present invention includes (meth)acryl syrup D obtained by polymerizing a monomer component including (meth) acrylic ester in a presence of a thiol compound, and adding a vinyl ether compound and/or vinyl thioether compound to the reaction mixture, and adding a vinyl monomer having a carboxyl group to the reaction mixture.

Still another molding material in accordance with the present invention includes (meth)acryl syrup E in which a polymerizable double bond is introduced via an ester bond, and a metal compound of at least one element selected from the group consisting of zinc, tin, and zirconium.

The molding material in accordance with the present invention may further include a thickening agent, derivatives of succinic acid, a reinforcing material, etc. The described molding material of the present invention can be cured in a shorter period of time as compared with the conventional method. Further, by adopting the molding material, molded articles having excellent heat-resistance, solvent-resistance, weathering resistance and water-resistance can be achieved. Hereinafter, the components other than the reinforcing material in the molding material is hereinafter referred to as a compound.

The thickening agent may be adopted, but not limited to alkali earth metal oxide such as magnesium oxide, calcium oxide, etc.; alkali earth metal hydroxide such as magnesium hydroxide, calcium hydroxide, etc. Only one kind of the above-listed thickening agent may be adopted, or two or more kinds thereof may be suitably mixed and adopted.

An amount of use of the thickening agent may be suitably adjusted in consideration of the kind and the combination with (meth)acryl syrup, the usage of the molding material, etc. However, it is generally preferable to add the thickening agent in an amount of not more than 10 parts by weight, and more preferably not more than 5 parts by weight with respect to 100 parts by weight of (meth)acryl syrup. By adopting the thickening agent in the described range, the viscosity of the thickened compound can be adjusted to a desirable value for the molding process. If the thickening agent is used in an amount greater than 10 parts by weight, the viscosity of the thickened compound becomes too high, and the operability of the molding process is lowered, and the weathering resistance and the water-resistance of the resulting molded article would be lowered.

The derivatives of the succinic acid suppresses an excessive thickening behavior, especially the initial thickening behavior by the thickening agent. The derivatives of the succinic acid are not particularly limited, and any compounds having a succinic acid structure or succinic anhydride structure in a molecule and having a substituent such as an alkyl group, an alkenyl group, an alicyclic hydrocarbon group, an aromatic hydrocarbon group, etc., in an ethylene group portion of the structure may be adopted. However, it is preferable that the total number of carbon atoms is in a range of from 8 to 30. Derivatives of succinic acid having not more than 7 carbon atoms in total is not preferable as it is inferior in its solubility with respect to (meth)acryl syrup. On the other hand, the derivatives of the succinic acid having not less than 31 carbon atoms in total is not preferable, and much function and effect cannot be expected by adopting the derivatives of succinic acid. Namely, it is not preferable as it offers a small effect of suppressing the excessive thickening behavior by the thickening agent.

Examples of the derivatives of the succinic acid include:
a) a compound with an alkyl group having at least 4 carbon atoms such as hexylsuccinic acid, heptyl succinic acid, octylsuccinic acid, nonylsuccinic acid, decyl succinic acid, dodecylsuccinic acid, tetradecylsuccinic acid, pentadecylsuccinic acid, hexadecylsuccinic acid heptadecylsuccinic acid, octadecylsuccinic acid, pentadodecylsuccinic acid, eicocylsuccinic acid, etc.,
b) a compound with an alkenyl group such as hexenyl succinic acid, heptenylsuccinic acid, octenyl succinic acid, nonenylsuccinic acid, decenylsuccinic acid, dodecenylsuccinic acid, tetradecenylsuccinic acid, pentadecenylsuccinic acid, hexadecenyl succinic acid, heptadecenylsuccinic acid, octadecenylsuccinic acid, pentadodecenyl succinic acid, eicocenylsuccinic acid, etc.,
c) a compound with an alicyclic hydrocarbon group such as cyclododecylsuccinic acid, cyclododecenylsuccinic acid, etc.;
d) a compound with an aromatic hydrocarbon group such as diphenyl butenylsuccinic acid, etc.; and
e) anhydrides of the above-listed succinic acid. Only one kind of the above-listed derivatives may be adopted, or two or more kinds thereof may be suitably mixed and adopted. The preparation method of the derivatives of succinic acid are not particularly specified.

An amount of the derivatives of succinic acid to be added varies depending on the kind thereof, a combination with (meth)acryl syrup and an thickening agent, the usage of the molding material, etc. However, it is generally preferably to add in an amount of from 0.01 to 10 parts by weight with respect to 100 parts by weight of (meth)acryl syrup. If the derivatives of succinic acid is added in an amount less than 0.01 parts by weight, much function and effect cannot be expected by adopting the derivatives of succinic acid. Namely, an excessive thickening behavior of the thickening agent cannot be suppressed effectively. On the other hand, if the derivatives of succinic acid is used in an amount greater than 10 parts by weight, the viscosity of the thickened compound does not reach a predetermined value suited for the molding process, or a long time is required to have the predetermined value.

The reinforcing material may be, but not limited to: inorganic fiber such as glass fiber, metal fiber, ceramic (boron nitride, silicon carbide); organic fiber such as aramid fiber, polyester, carbon fiber, etc.; natural fiber, etc. The form of such fiber may be, but not limited to roving, cloth, matt, fabric, chopped roving, chopped strand fiber, etc. Only one kind of the above-listed reinforcing material may be adopted, or two or more kinds thereof may be suitably mixed and adopted. The molding material including the reinforcing material is suited for SMC, BMC, etc.

For the chopped strand fiber, it is especially preferable that the length of the reinforcing material is not less than 1 mm and not more than 6 mm, as this offers more desirable molded article in its strength, smoothness and gloss on the surface.

The amount of use of the reinforcing material is not particularly limited and varies depending on the kind thereof, a combination with (meth)acryl syrup, the usage and desired properties of the molding material, but preferably in a range of above 0 and not more than 40 percent by weight with respect to the total amount of the molding material. In the case where the molding material is used as the SMC, it is more preferably that the reinforcing material is used in an amount of from 10 to 40 percent by weight with respect to the total amount. On the other hand, in the case where the molding material is used as BMC, it is more preferable that the reinforcing material is used in an amount of from 2 to 30 percent by weight with respect to the total amount of the molding material. By using the reinforcing material in the described range, the molded article which is excellent in its tensile strength and elasticity, etc., can be achieved.

For the chopped strand fiber, it is preferably to use the reinforcing material in an amount from 1 to 9 percent by weight with respect to the total amount of the molding material. As a result, excellent molding material in its handling, productivity, moldability, etc., can be obtained, while improving the strength of the resulting molded article and the smoothness and gloss of the surface thereof. Moreover, the generation of crack in the molded article can be prevented.

The method of mixing the reinforcing material with the compound is not particularly limited, and a suitable method may be adopted for the reinforcing material. For example, for the matt or cloth reinforcing material, the reinforcing material can be mixed with the compound by impregnating the reinforcing material in the compound. On the other hand, for the roving or chopped strand fiber reinforcing material, the reinforcing material can be mixed with the compound by kneading the reinforcing material with the compound or impregnating the reinforcing material by sandwiching it between the compounds.

It is also preferable that the molding material in accordance with the present invention includes a curing agent (polymerization initiator), and if necessary, a filler, a crosslinkable monomer (crosslinking agent), an additive, etc. The curing agent is not particularly limited but may the above-listed polymerization initiators to be adopted in the manufacturing process of (meth)acryl syrup. An amount of the curing agent is not particularly limited and varies depending on the kind thereof, a combination with (meth)acryl syrup, etc., but preferably in a range of from 0.1 to 5 parts by weight with respect to 100 parts by weight of (meth)acryl syrup.

The filler is not particularly limited but may be an inorganic filler such as aluminium hydroxide, calcium carbonate, barium sulfate, alumina, clay, talc, milled fiber, silica, sand in river, diatomaceous earth, mica powder, gypsum, crystalline limestone, asbest powder, glass powder, glass sphere, etc.; an organic filler such as polymer bead, etc. only one kind of the above-listed filler may be adopted, or two or more kinds thereof may be suitably mixed and adopted. The form of the filler such as an average diameter, etc., is not particularly limited.

The mixing amount of the filler is not particularly limited and varies depending on the kind thereof, a combination with (meth)acryl syrup, the usage and desired properties of the molding material, etc. However, it is preferable that the filler is added in an amount of from 10 to 600 parts by weight with respect to 100 parts by weight of (meth)acryl syrup. In the case of adopting the molding material as SMC, the mixing amount of the filler is preferably in a range of from 30 to 300 parts by weight with respect to 100 parts by weight of (meth)acryl syrup. When adopting the molding material as BMC, the mixing amount of the filler is preferably in a range of from 150 to 600 parts by weight with respect to 100 parts by weight of (meth)acryl syrup. When adopting the molding material as a casting material, the mixing amount of the filler is preferably in a range of from 30 to 350 parts by weight with respect to 100 parts by weight of (meth)acryl syrup. When adopting the molding material as a pultrusion molding material, the mixing amount of the filler is still preferably in a range of from 10 to 200 parts by weight with respect to 100 parts by weight of (meth)acryl syrup.

The crosslinkable monomer has a function of increasing the crosslink density of the cured product. The crosslinkable monomer is not particularly limited and any compound having a plurality of functional groups reactive to the functional group contained in (meth)acryl syrup may be used. Examples of the crosslinkable monomer include: polyfunctional (meth)acrylate such as ethyleneglycol di(meth)acrylate, diethyleneglycol di(meth)acrylate, propyleneglycol di(meth)acrylate, dipropyleneglycol di(meth)acrylate, neopentyl glycol di(meth)acrylate, trimethylol propane tri(meth)acrylate, pentaerythritol tetra(meth)acrylate, etc.; epoxy (meth)acrylate; divinyl benzene, diaryl phthalate, diaryl isophthalate, triaryl cyanulate, triaryl isocyanulate, etc. An amount of the crosslinkable monomer is not particularly limited, and may be suitably adjusted depending on the kind thereof, a combination with (meth)acryl syrup, etc., the usage of the molding material and the desired properties, etc.

The crosslinkable monomer may be added in the polymerization reaction of the monomer composition in a presence of a thiol compound, or in the polymerization reaction of the monomer component in the presence of the thiol compound, if necessary. In this case, the amount of the crosslinking agent is not particularly limited, and may be selected to be a suitable amount in consideration of the kind thereof and a combination with the monomer composition (monomer component) etc., the usage of the molding material, and the desired properties, etc.

The additive is not particularly limited, and generally used additives of various kinds may be adopted. Examples of such additive include: a low shrinkage agent, (internal) mold release agent, a coloring agent, a polymerization inhibitor, etc. The additive may be added according to the usage of the molding material, desired properties, etc. The amount of additive may be adjusted according to the kind of the additive, a combination with (meth)acryl syrup, etc.

The low shrinkage agent is not particularly limited, but may be a thermoplastic polymer having no a carboxyl group, such as polymethyl methacrylate, polyethylene, polypropylene, polystyrene, polyethylene glycol, polypropylene glycol, cellulose butylate, acetate, polyvinyl chloride, polyvinyl acetate, polycaprolactone, saturated polyester, etc. By adding the low shrinkage agent, the curing shrinkage of the molding material can be suppressed, thereby achieving a still improved stability in size of the molded article.

The low shrinkage agent, i.e., the thermoplastic polymer preferably has an average molecular weight in a range of from 1,000 to 200,000. Since this permits the low shrinkage agent to be homogeneously dispersed in the molding material, the linear shrinkage of the molding material can be effectively suppressed. As a result, a still improved moldability of the molding material in its stability in size of the molded article, while still improving the smoothness and gloss of the surface thereof. An amount of the low shrinkage agent to be added is not particularly limited, and may be adjusted in consideration of the kind thereof, a combination with (meth)acryl syrup, the usage of the molding material and the desired properties thereof. However, it is generally preferably that the low shrinkage agent is added in an amount of from 5 to 50 parts by weight with respect to 100 parts by weight of (meth)acryl syrup.

Examples of the mold release agent include: stearic acid, zinc stearate, aluminum stearate, calcium stearate, barium stearate, amide stearate, triphenyl phosphate, alkyl phosphate; generally used wax, silicone oil, etc. For the coloring agent, known inorganic or organic pigment may be used.

The molding material of the described structure is suitable for the SMC, BMC, the casting agent, etc. The SMC can be manufactured with ease using a so-called SMC manufacturing machine. The BMC can be manufactured with ease using a kneader such as a double-arm kneader, etc. The casting material may be manufactured with ease using a mixer. Further, the SMC and BMC can be formed in the molded article by applying there to heat/pressure application process (press molding) at temperature in a range of from 60 to 160° C., with a more preferable range being from 70 to 140° C. and the most preferable range being from 80 to 130° C. The casting material may be formed in a molded article by casting it in a cell at temperature in a range of from room temperature to 70° C.

The method of curing the molding material and the method of manufacturing the molded article are not particularly limited. Various molding methods are applicable to the molding material such as the compression molding method, the injection molding method, the transfer molding method, etc. However, the compression method is especially preferable. The molding pressure is not particularly limited, any be suitably adjusted according to the shape, size of the molded article, etc. However, it is generally preferably that the molding pressure is in a range of from 0.1 to 20 MPa. By carrying out the molding process under the molding pressure of the described range, the molded article of a still improved surface smoothness can be manufactured. The molding time is not particularly limited and may be suitably adjusted according to the molding conditions such as the molding temperature, the molding pressure, etc. and the curing rate of the molding material, etc.

As described, the method of manufacturing (meth)acryl syrup A in accordance with the present invention includes the steps of (a) polymerizing a monomer component with a vinyl monomer having a carboxyl group in a presence of a thiol compound, and (b) processing the reaction mixture with maleic anhydride and a basic compound after the step (a).

A method of manufacturing (meth)acryl syrup B in accordance with the present invention is characterized by polymerizing a monomer component in a presence of a thiol compound, and subsequently processing the reaction mixture with maleic anhydride and a basic compound and adding a vinyl monomer having a carboxyl group to the reaction mixture.

A method of manufacturing (meth)acryl syrup C in accordance with the present invention is characterized by adding a vinyl ether compound and/or a vinyl thioether compound to a reaction mixture obtained by polymerizing a monomer component including (meth)acrylic ester in a presence of a thiol compound.

A method of manufacturing (meth)acryl syrup C in accordance with the present invention is characterized by adding a vinyl ether compound and/or a vinyl thioether compound to a reaction mixture obtained by polymerizing a monomer component including (meth)acrylic ester and a vinyl monomer having a carboxyl group in a presence of a thiol compound.

A method of manufacturing (meth)acryl syrup C' in accordance with the present invention is characterized by polymerizing a monomer component including (meth)acrylic ester and a vinyl monomer having a carboxyl group in a presence of a thiol compound, and subsequently adding glycidyl (meth)acrylate and/or methyl glycidyl (meth)acrylate to the reaction mixture before or after adding a vinyl ether compound and/or a vinyl thioether compound to the reaction mixture, and esterifying the carboxyl group in the polymer so that a side chain having a polymerizable double bond is bonded to a main chain.

A method of manufacturing (meth)acryl syrup D in accordance with the present invention is characterized by polymerizing a monomer component including (meth)acrylic ester in a presence of a thiol compound, and subsequently adding a vinyl ether compound and/or a vinyl thioether compound to the reaction mixture and adding a vinyl monomer having a carboxyl group to the reaction mixture.

A method of manufacturing (meth)acryl syrup E in accordance with the present invention is characterized by reacting a (meth)acryl syrup (unprocessed (meth)acryl syrup) obtained by polymerizing a monomer component including (meth)acrylic ester with a vinyl monomer having a carboxyl group in a presence of a thiol compound with an unsaturated epoxy compound in a presence of a metal compound of at least one element selected from the group consisting of Zn, Sn and Zr.

As a result, the present invention provides a manufacturing method which permits (meth)acryl syrup having an excellent storage stability without odor due to the thiol compound to be manufactured in a short period of time compared with the conventional (meth)acryl syrup and also provides the (meth)acryl syrup thereof.

As a result, the molding material which permits the molded article to be cured in a shorter period of time while exhibiting improved heat-resistance, solvent resistance, weathering resistance, and water-resistance, etc., and having smoothness and glossy surface, while showing a stability in size, etc., can be achieved. A molding material including the (meth)acryl syrup E and the metal compound shows still improved storage stability and permits a molded article to be manufactured which is excellent in its thermal strength, and is not much colored.

The molded articles manufactured from the molding material of the present invention may be used in but not limited to: various outdoor goods such as natural lighting dome, bench, table, tank, advertising board, waterproof board, etc.; members which constitute sewage purifier, automobile, railroad vehicle, ship, etc., sheathing material of the building such as roof, wall, etc.; artificial marble suited for use in bathtub, kitchen counter (kitchen top), various counter top, vanity unit, etc.; electric products, etc. The molded article of the present invention has beautiful appearance and suited for use in various goods which are expected to be presentable. The molded article prepared from the molding material including a filler has a beautiful marble design, and is suited for use in artificial marble.

For fuller understanding of the nature and advantages of the invention, reference should be made to the ensuing detailed description taken in conjunction with the accompanying drawings.

PREFERRED EMBODIMENTS OF THE PRESENT INVENTION

In order that the invention may be more readily understood, the following non-limiting examples and comparative examples are given. Furthermore, in the examples and comparative examples, the unit "percent" and "part(s)" respectively denote "percent by weight" and "part(s) by weight".

EXAMPLE 1

In a reactor provided with a thermometer, a condenser, a nitrogen introducing tube and an agitator, placed were 196 parts of methyl methacrylate ((meth)acrylic ester) and 4 parts of methacrylic acid (vinyl monomer). Then, an inside atmosphere of the reactor was replaced by nitrogen gas. After heating the mixture in the reactor to 80° C. with stirring, 0.1 parts of 2,2'-azobisisobutylonitrile (hereinafter referred to as AIBN) (polymerization initiator) and 1.0 part of n-dodecylmercaptan (thiol compound) were added to initiate a polymerization reaction.

After 420 minutes, the reaction solution showed a viscosity of 30–35 poise (25° C.), and the reaction was stopped (reaction time: 420 minutes). Then, 35 parts of methyl methacrylate were further added to the reaction solution, and was quenched to 40° C.

Then, after adding 0.7 parts of maleic anhydride and 0.04 parts of triethyl amine (basic compound) to the reaction mixture, the reaction mixture was stirred for 15 minutes to process the (residual) n-dodecylmercaptan. The maleic anhydride was added in an amount of 1.4 times mole with respect to the amount of n-dodecylmercaptan added. The triethyl amine was added in an amount of 0.08 time mole with respect to the amount of n-dodecylmercaptan added.

As a result, (meth)acryl syrup A in accordance with the present invention was obtained. The resulting (meth)acryl syrup A had a viscosity of 7 poise (25° C.), and a polymer content, i.e., a concentration of the solid portion in the (meth)acryl syrup A of 23.5 percent. The weight-average molecular weight (Mw) of the (meth)acryl syrup A was measured by the gel permeation chromatography (GPC) and was found to be 61,000.

To 100 parts of (meth)acryl syrup A, 2 parts of benzoyl peroxide (curing agent) were added and dissolved therein. As a result, a casting material (molding material) was obtained. The resulting casting material was deaerated under reduced pressure. The casting material, i.e., the compound showed excellent storage stability.

Next, the casting material was casted using a cell prepared by closing the circumference of two glass plates which are put together with a clearance of 3 mm using a so-called elastic gasket. Namely, after pouring the casting material into the cell, the cell was heated to 60° C. to cure the casting material.

The gel time was measured at 60° C. according to the JIS K 6901 method. Namely, after placing the casting material (test material) in a test tube with a diameter of 18 mm to a depth of 100 mm, the test tube was stored in a thermostatic bath adjusted to 60° C. Then, the time required for heating the casting material from 45° C. to 65° C. was measured to determine a gel time. As a result, the gel time at 60° C. was found to be 45 minutes.

After removing the casting material from the mold, a postcure process was applied to the casting material at 100° C. (a so-called postcure process), thereby obtaining a molded article of a resin plate. The resulting resin plate was placed in tetrahydrofrane (THF) and acetone for 24 hours at 25° C. As a result, the resin plate was insoluble in both THF and acetone, and the solvent-resistance was determined to be desirable. Thus, the molecular weight of the resin plate, i.e., the casting material was assumed to be too high (three-dimensionally networked) to be measured by the GPC. Main reaction conditions and the results are summarized in Table 1.

EXAMPLE 2

(Meth)acryl syrup A was prepared in the same manner as Example 1 except that amounts of use of methyl methacrylate and methacrylic acid were altered respectively from 196 parts to 184 parts and from 4 parts to 16 parts. The reaction time was 300 minutes. The resulting (meth)acryl syrup A showed a viscosity of 8 poise (25° C.), a concentration of the solid portion of 22. 3 percent and a weight-average molecular weight of 64,000.

Then, a casting material was obtained in the same manner as Example 1. The resulting casting material showed excellent storage stability. Next, a resin plate was prepared by repeating the same casting process as Example 1. The gel time was 30 minutes. The resulting resin plate was insoluble in both THF and acetone, and the solvent-resistance was determined to be desirable. The main reaction conditions and the results are summarized in Table 1.

COMPARATIVE EXAMPLE 1

Comparative (meth)acryl syrup was prepared in the same manner as Example 1 except that the maleic anhydride and triethyl amine were not used. Namely, the comparative (meth)acryl syrup was prepared without processing the n-dodecylmercaptan. The resulting comparative (meth)acryl syrup had a viscosity of 7 poise (25° C.), a concentration of the solid portion of 24. 1 percent and a weight-average molecular weight of 62,000.

Then, a comparative casting material was prepared in the same manner as Example 1. From the resulting comparative casting material, a resin plate was prepared by repeating the same casting process as Example 1. The gel time was 58 minutes. The resulting comparative resin plate was insoluble in THF and acetone, and the solvent-resistance was determined to be desirable. However, the comparative casting material was inferior in its storage stability. The main reaction conditions and the results are summarized in Table 1.

COMPARATIVE EXAMPLE 2

Comparative (meth)acryl syrup was prepared in the same manner as Example 1 except that the amount of use of methyl methacrylate was altered from 196 parts to 200 parts, and that the methacrylic acid was not used. The reaction time was 500 minutes. The resulting comparative (meth)acryl syrup showed a viscosity of 6 poise (25° C.), a concentration of the solid portion of 21. 9 percent and a weight-average molecular weight of 61,000.

Then, a comparative casting material was obtained in the same manner as Example 1. The resulting comparative casting material showed excellent storage stability. Next, a resin plate was prepared by repeating the same casting process as Example 1. The gel time was 69 minutes. The resulting comparative resin plate was soluble in both THF and acetone, and the solvent-resistance was determined to be inferior. The main reaction conditions and the results are summarized in Table 1.

TABLE 1

| EXAMPLES | 1 | 2 |
|---|---|---|
| METHYL METHACRYLATE (PARTS) | 196 (+35) | 184 (+35) |
| METHACRYLIC ACID (PARTS) | 4 | 16 |
| REACTION TIME (MINUTES) | 420 | 300 |
| PROCESS OF n-DODECYLMER-CAPTAN | YES | YES |
| WEIGHT-AVERAGE MOLECULAR WEIGHT (Mw) | 61,000 | 64,000 |
| GEL TIME (minutes) | 45 | 30 |
| STORAGE STABILITY | GOOD | GOOD |
| SOLVENT-RESISTANCE | | |
| THF | INSOLUBLE | INSOLUBLE |
| ACETONE | INSOLUBLE | INSOLUBLE |

| COMPARATIVE EXAMPLE | 1 | 2 |
|---|---|---|
| METHYL METHACRYLATE (PARTS) | 196 (+35) | 200 (+35) |
| METACRYLIC ACID (PARTS) | 4 | 0 |
| REACTION TIME (MINUTES) | 420 | 500 |
| PROCESS OF n-DODECYLMER-CAPTAN | NO | YES |
| WEIGHT-AVERAGE MOLECULAR WEIGHT (Mw) | 62,000 | 61,000 |
| GEL TIME (minutes) | 58 | 69 |
| STORAGE STABILITY | INFERIOR | GOOD |
| SOLVENT-RESISTANCE | | |
| THF | INSOLUBLE | SOLUBLE |
| ACETONE | INSOLUBLE | SOLUBLE |

EXAMPLE 3

(Meth)acryl syrup A was prepared in the same manner as Example 1. Then, 100 parts of (meth)acryl syrup A was mixed with 1 part of magnesium oxide (thickening agent), 1 part of pentadodecenylsuccinic acid (derivative of succinic acid), 1 part of t-butylperoxy-2-ethylhexanoate, 4 parts of zinc stearate (mold release agent) and 150 parts of aluminum hydroxide (HIGILITE HS-320 available from SHOWA DENKO K.K.) to obtain a compound.

Then, the compound was applied on the surface of the polyethylene film with a predetermined thickness. Thereafter, a glass fiber (chopped roving fiber with a length of 1 inch) was uniformly applied thereon as a reinforcing material. Then, on the glass fiber, another compound was uniformly applied on the surface of the polyethylene film. Namely, the glass fiber was sandwiched between the compounds. As a result, SMC was obtained as the molding material. The glass fiber content in the SMC was adjusted to be 25 percent. Thereafter, the resulting SMC was wrapped with a cellophane film, and was aged for one day at 40° C. After being aged, the compound, i.e., SMC was not cured and did not have a sticky surface either.

Next, the SMC was molded by the heat-pressure molding method. Namely, using a mold of a predetermined size, the temperature of the mold on the upper side was set to 110° C., while the lower side thereof was set to 100° C. Then, the SMC was cut into a predetermined size and was compressed in the mold at 6 MPa. Then, the piece of the SMC was molded with the application of heat and pressure for 10 minutes to form a molded article with a thickness of 3 mm.

The gel time at 110° C. was measured using Curelastometer type V (available from Orientec Co.). Specifically, the SMC (test material) was heated to 110° C. (heat-application starting time), and the time required for the torque at 110° C. to rise was measured by the measuring unit to determine a gel time. As a result, the gel time at 110° C. was found to be 200 seconds.

The resulting molded article had glossy and smooth surface. The molded article was insoluble in both THF and acetone, and the solvent-resistance was determined to be desirable. Further, an accelerated weathering test was performed according to JIS A 1415 for 1,000 hours using a sun-shine weather meter. As a result, neither significant change in color nor choking was observed in the molded article. Further, a hot water resistance test was performed for 100 hours at 90° C. to evaluate the water-resistance. As a result, the molded article maintain the gloss on its surface after the test, and no significant changes were observed. Furthermore, the molded article was left in an oven heated to 170° C. for 1 hour to evaluate the heat-stability. As a result, no significant changes in appearance were observed. For example, color did not turn into yellowish, and the surface was still glossy. The main reaction conditions and the results are summarized in Table 2.

EXAMPLE 4

(Meth)acryl syrup A was prepared in the same manner as Example 2. Then, from the resulting (meth)acryl syrup A, a molded article was prepared in the same manner as Example 3 except that amounts of magnesium oxide and pentadodecenylsuccinic acid were altered respectively from 1 part to 2 parts and from 1 part to 3 parts. The gel time was 165 seconds. The resulting molded article had a glossy and smooth surface. The main reaction conditions for preparing the molded article and the results are summarized in Table 2.

COMPARATIVE EXAMPLE 3

Comparative (meth)acryl syrup was prepared in the same manner as Comparative Example 1. Then, from the comparative (meth)acryl syrup, a comparative SMC was prepared in the same manner as Example 3. Further, the resulting comparative SMC was aged for one day at 40° C. As a result, the SMC was cured. The main conditions are summarized in Table 3.

COMPARATIVE EXAMPLE 4

Comparative (meth)acryl syrup was prepared in the same manner as comparative Example 2. From the comparative (meth)acryl syrup, a comparative SMC was prepared in the same manner as Example 3. Further, the resulting comparative SMC was aged for one day at 40° C. The SMC was not thickened, and had a sticky surface.

From the comparative SMC, a comparative molded article was prepared in the same manner as Example 3. The gel time was 250 seconds. However, the resulting comparative molded article was soluble in both THF and acetone, and the solvent-resistance was determined to be inferior. Further, the heat-resistance thereof was evaluated. As a result, significant changes in appearance, such as color turned into yellowish, etc., were observed. The comparative molded article no longer had glossy and smooth surface. The main reaction conditions and results are summarized in Table 3.

COMPARATIVE EXAMPLE 5

Comparative (meth)acryl syrup was prepared in the same manner as Example 1 except that the amounts of use of methyl methacrylate and the methacrylic acid were altered respectively from 196 parts to 199.4 parts and from 4 parts to 0.6 parts. The reaction time was 480 minutes. The resulting comparative (meth)acryl syrup showed a viscosity of 6 poise (25° C.), a concentration of the solid portion of 22.8 percent and a weight-average molecular weight of 66,000.

Then, a comparative resin plate was obtained by repeating the same process (including casting process) as Example 1. The gel time was 65 minutes. However, the resulting comparative resin plate was soluble in both THF and acetone, and the solvent-resistance was determined to be inferior.

From the comparative (meth)acryl syrup, a comparative SMC was prepared in the same manner as Example 3. Further, the resulting comparative SMC was aged for one day at 40° C. The SMC had a slightly sticky surface.

Using the comparative SMC, Example 3 was repeated to prepare a comparative molded article. The gel time was 230 seconds. However, the resulting comparative molded article was gradually solved in both THF and acetone, and the solvent-resistance was determined to be inferior. Further, the heat-resistance thereof was evaluated. As a result, a slight change in appearance, such as color tuned into yellowish, etc., was observed. The main reaction conditions and results are summarized in Table 3.

COMPARATIVE EXAMPLE 6

Comparative (meth)acryl syrup was prepared in the same manner as Example 1 except that the amounts of use of methyl methacrylate and the methacrylic acid were altered respectively from 196 parts to 150 parts and from 4 parts to 50 parts. The reaction time was 240 minutes. The resulting comparative (meth)acryl syrup had a viscosity of 8 poise (25° C.), a concentration of the solid portion of 23.9 percent and a weight-average molecular weight of 68,000.

Then, a comparative resin plate was prepared by repeating the same process (including casting process) as Example 1. The gel time was 17 minutes. The resulting comparative resin plate was insoluble in both THF and acetone, and the solvent-resistance was determined to be desirable.

From the comparative (meth)acryl syrup, a comparative molded article was prepared in the same manner (including molding process) as Example 3. The aged compound, i.e., the comparative SMC did not have a sticky surface. The gel time was 120 seconds. The resulting comparative molded article was insoluble in both THF and acetone, and the solvent-resistance was determined to be desirable. The molded article also showed excellent heat-resistance. However, the comparative molded article was inferior in weathering resistance and water-resistance. The main reaction conditions and results are summarized in Table 3.

COMPARATIVE EXAMPLE 7

Comparative (meth)acryl syrup was prepared in the same manner as Example 1 except that the amounts of use of maleic anhydride and triethyl amine were altered respectively from 0.7 parts to 0.2 parts and from 0.04 parts to 0.004 parts.

The maleic anhydride was added in an amount of 0.4 times mole with respect to the amount of n-dodecylmercaptan added. The triethyl amine was added in an amount of 0.008 times mole with respect to n-dodecylmercaptan. The resulting comparative (meth)acryl syrup had a viscosity of 7 poise (25° C.), a concentration of the solid portion of 21.1 percent and a weight-average molecular weight of 63, 000.

From the comparative (meth)acryl syrup, a comparative SMC was prepared in the same manner as Example 3. Further, the resulting comparative SMC was aged for one day at 40° C. As a result, the comparative SMC was cured. The main reaction conditions are summarized in Table 3.

EXAMPLE 5

(Meth)acryl syrup A was prepared in the same manner as Example 2. Then, from the resulting (meth)acryl syrup A, a molded article was prepared in the same manner as Example 3 except that amounts of magnesium oxide and pentadodecenylsuccinic acid were altered respectively from 1 part to 2 parts and from 1 part to 3 parts, and that in replace of 150 parts of aluminum hydroxide, a mixture of 100 parts of aluminum hydroxide and 50 parts of calcium carbonate (Whiton P-70 available from Toyo Fine Chemical Co., Ltd.) (filler) was used. As a result, the aged compound, i.e., SMC did not have a sticky surface. The gel time was 160 seconds.

The resulting molded article had glossy and smooth surface. The main reaction conditions for preparing the molded article and the results are summarized in Table 2. The molded article also had excellent heat-resistance. The weathering resistance and the water-resistance were evaluated and determined to be excellent as compared to the molded article of Example 4 although a slight change in color and a reduction in glossiness were observed.

EXAMPLE 6

(Meth)acryl syrup A was prepared in the same manner as Example 2. Then, from the resulting (meth)acryl syrup A, a molded article was prepared in the same manner as Example 3 except that amounts of magnesium oxide and pentadodecenylsuccinic acid were altered respectively from 1 part to 2 parts and from 1 part to 3 parts, and that in replace of 150 parts of aluminum hydroxide, a mixture of 100 parts of aluminum hydroxide and 50 parts of glass powder (FMB 30W-001 available from NITTO BOSEKI Co., LTD.) as a filler was used. As a result, the aged compound, i.e., SMC did not have a sticky surface. The gel time was 170 seconds. The resulting molded article had glossy and smooth surface. The main reaction conditions for preparing the molded article and the results are summarized in Table 2.

EXAMPLE 7

(Meth)acryl syrup A was prepared in the same manner as Example 1 except that in replace of 35 parts of methyl methacrylate added after the polymerization reaction was completed, 25 parts of methyl methacrylate and 10 parts of trimethylol propane trimethacrylate (crosslinkable monomer) were added. The resulting (meth)acryl syrup A had a viscosity of 8 poise (25° C.), a concentration of the solid portion of 21.7 percent and a weight-average molecular weight of 62,000.

Next, using (meth)acryl syrup A, a molded article was prepared in the same manner as Example 3. The gel time was 180 seconds. The resulting molded article had a glossy and smooth surface. The reaction conditions and the results of the molded article are summarized in Table 2.

TABLE 2

| EXAMPLE | 3 | 4 | 5 | 6 | 7 |
|---|---|---|---|---|---|
| MAGNESIUM OXIDE (PART) | 1 | 2 | 2 | 2 | 1 |
| PENTADODECENYL-SUCCINIC ACID (PART) | 1 | 3 | 3 | 3 | 1 |
| ALUMINUM HYDROXIDE (PART) | 150 | 150 | 100 | 100 | 150 |
| CALCIUM CARBONATE (PART) | — | — | 50 | — | — |
| GLASS POWDER (PART) | — | — | — | 50 | — |
| AGED MOLDING MATERIAL | GOOD | GOOD | GOOD | GOOD | GOOD |
| GEL TIME (SECOND) | 200 | 165 | 160 | 170 | 180 |
| SOLVENT RESISTANCE | | | | | |
| THF | INSOLUBLE | INSOLUBLE | INSOLUBLE | INSOLUBLE | INSOLUBLE |
| ACETONE | INSOLUBLE | INSOLUBLE | INSOLUBLE | INSOLUBLE | INSOLUBLE |
| HEAT-RESISTANCE | GOOD | GOOD | GOOD | GOOD | GOOD |
| WEATHERING RESISTANCE | GOOD | GOOD | GOOD | GOOD | GOOD |
| WATER-RESISTANCE | GOOD | GOOD | GOOD | GOOD | GOOD | was aged for one day at 40° C. As a result, the aged compound, i.e., the BMC was not cured and did not have a sticky surface either.

The BMC was molded by a predetermined method with the application of heat and pressure to prepare a molded article. The gel time was 190 seconds. The resulting molded article had a glossy and smooth surface. The main reaction conditions and the results of the molded article are summarized in Table 4.

COMPARATIVE EXAMPLE 8

Comparative (meth)acryl syrup was prepared in the same manner as Comparative Example 2. From the comparative (meth)acryl syrup, a comparative BMC was prepared in the same manner as Example 8. Further, the resulting comparative BMC was aged for one day at 40° C. As a result, the BMC was not thickened, and had a sticky surface.

Using the comparative BMC, Example 8 was repeated to prepare a comparative molded article. The gel time was 260 seconds. However, the resulting comparative molded article was soluble in both THF and acetone, and the solvent-resistance was determined to be inferior. Further, the heat-resistance thereof was evaluated. As a result, changes in appearance, such as color turned into yellowish, etc., of the comparative molded article was observed. The main reaction conditions and results are summarized in Table 5.

EXAMPLE 9

(Meth)acryl syrup A was prepared in the same manner as Example 2. Then, 100 parts of (meth)acryl syrup A was mixed with 1 part of bis(4-t-butylcyclohexyl)peroxy dicarbonate (curing agent) and 200 parts of aluminium hydroxide (HIGILITE H-320ST available from SHOWA DENKO K.K.). Then, the mixture was kneaded and deaerated. As a result, a casting material (molding material) was obtained.

The resulting casting material was casted using a glass cell. Specifically, after pouring the casting material into the

TABLE 3

| COMPARATIVE EXAMPLE | 3 | 4 | 5 | 6 | 7 |
|---|---|---|---|---|---|
| MAGNESIUM OXIDE (PART) | 1 | 1 | 1 | 1 | 1 |
| PENTADODECENYLSUCCINIC ACID (PART) | 1 | 1 | 1 | 1 | 1 |
| ALUMINUM HYDROXIDE (PART) | 150 | 150 | 150 | 150 | 150 |
| AGED MOLDING MATERIAL | CURED | NOT THICKENED | STICKY | GOOD | CURED |
| GEL TIME (SECOND) | — | 250 | 230 | 120 | — |
| SOLVENT RESISTANCE THF | — | SOLUBLE | SOLUBLE | INSOLUBLE | — |
| ACETONE | — | SOLUBLE | SOLUBLE | INSOLUBLE | — |
| HEAT-RESISTANCE | — | INFERIOR | INFERIOR | GOOD | — |
| WEATHERING RESISTANCE | — | — | — | INFERIOR | — |
| WATER-RESISTANCE | — | — | — | INFERIOR | — |

EXAMPLE 8

(Meth)acryl syrup A was prepared in the same manner as Example 1. Then, 100 parts of (meth)acryl syrup A was mixed with 1 part of magnesium oxide, 2 parts of pentadodecenylsuccinic acid, 1 part of t-butylperoxy-2-ethylhexanoate, 4 parts of zinc stearate, 350 parts of aluminum hydroxide (HIGILITE H-320 available from SHOWA DENKO K.K.) and glass fiber (chopped strand fiber with ¼ inch length), and the mixture was kneaded using a double-arm kneader to obtain a compound. As a result, BMC was obtained as a molding material. The glass fiber content in the BMC was adjusted to be 5 percent. Then, the resulting BMC was wrapped with a Vinylon film (kuraray Co., Ltd.), and cell, the cell was heated for 1 hour at 60° C. to cure the casting material. After removing the casting material from the mold, a postcure process was applied for 2 hours at 100° C., thereby obtaining an artificial marble plate as a molded article.

The resulting artificial marble plate had a glossy and smooth surface and appeared to be high-grade in quality and in the feel of a material. The main reaction conditions and the results of the artificial marble plate are summarized in Table 4.

COMPARATIVE EXAMPLE 9

Comparative (meth)acryl syrup was prepared in the same manner as Comparative Example 2. From the comparative (meth)acryl syrup, a comparative artificial marble plate was prepared in the same manner as Example 9.

However, the resulting comparative artificial marble plate was soluble in both THF and acetone, and the solvent-resistance was determined to be inferior. Further, the heat-resistance thereof was evaluated. As a result, changes in appearance, such as color turned into yellowish, etc., of the comparative molded article was observed. The artificial marble plate had a rough surface which was no longer glossy. The main reaction conditions and results are summarized in Table 5.

EXAMPLE 10

In the reactor used in Example 1, placed were 200 parts of methyl methacrylate. Then, an inside atmosphere of the reactor was replaced by nitrogen gas. After heating the methyl methacrylate in the reactor to 80° C. with stirring, 0.1 parts of AIBN and 1.0 part of n-dodecylmercaptan were added to initiate a polymerization reaction.

When the reaction solution showed a viscosity of from 30 to 35 poise (25° C.), the polymerization reaction was stopped. Then, 35 parts of methyl methacrylate was added to the reaction solution, and was quenched to 40° C.

Then, after adding 0.7 parts of maleic anhydride and 0.04 parts of triethyl amine to the resulting reaction mixture, the reaction mixture was stirred for 15 minutes to process the (residual) n-dodecylmercaptan. The maleic anhydride and the triethyl amine were added respectively in amounts of 1.4 times mole and 0.08 times mole with respect to the amount of n-dodecylmercaptan added. To 95 parts of the resulting reaction mixture, 5 parts of methacrylic acid was added, thereby obtaining (meth)acryl syrup B.

In 100 parts of the (meth)acryl syrup B, 1 part of bis(4-t-butylcyclohexyl)peroxydicarbonate and 200 parts of aluminum hydroxide (HIGILITE H-320ST available from SHOWA DENKO K.K.) were added. Then, the mixture was kneaded and deaerated. As a result, a casting material (molding material) was obtained. The casting material, i.e., the compound had excellent storage stability.

Next, the casting material was casted using the glass cell. Specifically, after pouring the casting material into the cell, the cell was heated for 1 hour at 60° C. to cure the casting material. After demolding the casting material, a postcure process was applied at 100° C. for 2 hours. Thus, an artificial marble plate (molded article) was obtained.

The resulting artificial marble plate had a glossy and smooth surface, and was appeared to be high-grade in quality and in the feel of a material. The main reaction conditions of the artistic marble plate and the results are summarized in Table 4.

EXAMPLE 11

In the reactor used in Example 1, placed were 200 parts of methyl methacrylate. Then, an inside atmosphere of the reactor was replaced by nitrogen gas. After heating the methyl methacrylate in the reactor to 80° C. with stirring, 0.1 parts of AIBN and 1.0 part of n-dodecylmercaptan were added to initiate a polymerization reaction.

When the reaction solution showed the viscosity of 30–35 poise (25° C.), the polymerization reaction was stopped. Then, 25 parts of methyl methacrylate and 10 parts of methacrylic acid were added to the reaction solution, and was quenched to 40° C.

Then, after adding 0.7 parts of maleic anhydride and 0.04 parts of triethyl amine to the resulting reaction mixture, the reaction mixture was stirred for 15 minutes to process the n-dodecylmercaptan. The maleic anhydride and the triethyl amine were added respectively in amounts of 1.4 times mole and 0.08 times mole with respect to the amount of n-dodecylmercaptan added. Thus, (meth)acryl syrup B was obtained.

From the resulting (meth)acryl syrup B, an artificial marble plate was prepared in the same process as Example 10. The casting material, i.e., the compound had excellent storage stability.

The resulting artificial marble plate had a glossy and smooth surface and appeared to be high-grade in quality and in the feel of a material. The main reaction conditions and the results of the artificial marble plate are summarized in Table 4.

EXAMPLE 12

In the reactor used in Example 1, placed were 200 parts of methyl methacrylate. Then, an inside atmosphere of the reactor was replaced by nitrogen gas. After heating the methyl methacrylate in the reactor to 80° C. with stirring, 0.1 parts of AIBN and 1.0 part of n-dodecylmercaptan were added to initiate a polymerization reaction.

When the reaction solution showed the viscosity of 30–35 poise (25° C.), the polymerization reaction was stopped. Then, 35 parts of methyl methacrylate were added to the reaction solution, and was quenched to 40° C.

Then, after adding 0.7 parts of maleic anhydride and 0.04 parts of triethyl amine to the resulting reaction mixture, the reaction mixture was stirred for 15 minutes to process the n-dodecylmercaptan. The maleic anhydride and the triethyl amine were added respectively in amounts of 1.4 times mole and 0.08 times mole with respect to the amount of n-dodecylmercaptan added. Thus, (meth)acryl syrup was obtained.

Then, after 5 parts of methacrylic acid was added to 95 parts of (meth)acryl syrup, the molding process of Example 10 was repeated to prepare an artificial marble plate. The casting material, i.e., the compound had excellent storage stability.

The resulting artificial marble plate had a glossy and smooth surface and appeared to be high-grade in quality and in the feel of a material. The main reaction conditions and the results of the artificial marble plate are summarized in Table 5.

TABLE 4

| EXAMPLE | 8 | 9 | 10 | 11 |
|---|---|---|---|---|
| MAGNESIUM OXIDE (PART) | 1 | — | — | — |
| PENTADODECENYLSUCCINIC ACID (PART) | 2 | — | — | — |
| ALUMINUM OXIDE (PART) | 350 | 200 | 200 | 200 |
| AGED MOLDING MATERIAL | GOOD | — | — | — |
| GEL TIME (SECOND) | 190 | — | — | — |
| SOLVENT RESISTANCE | | | | |
| THF | INSOLUBLE | INSOLUBLE | INSOLUBLE | INSOLUBLE |
| ACETONE | INSOLUBLE | INSOLUBLE | INSOLUBLE | INSOLUBLE |
| HEAT-RESISTANCE | GOOD | GOOD | GOOD | GOOD |
| WEATHERING RESISTANCE | GOOD | GOOD | GOOD | GOOD |
| WATER-RESISTANCE | GOOD | GOOD | GOOD | GOOD |

TABLE 5

|  | EXAMPLE | COMPARATIVE EXAMPLE | |
| --- | --- | --- | --- |
|  | 12 | 8 | 9 |
| MAGNESIUM OXIDE (PART) | — | 1 | — |
| PENTADODECENYLSUCCINIC ACID (PART) | — | 2 | — |
| ALUMINUM HYDROXIDE (PART) | 200 | 350 | 200 |
| AGED MOLDING MATERIAL | — | NOT THICKENED | — |
| GEL TIME (SECOND) | — | 260 | — |
| SOLVENT RESISTANCE |  |  |  |
| THF | INSOLUBLE | SOLUBLE | SOLUBLE |
| ACETONE | INSOLUBLE | SOLUBLE | SOLUBLE |
| HEAT-RESISTANCE | GOOD | INFERIOR | INFERIOR |
| WEATHERING RESISTANCE | GOOD | — | — |
| WATER-RESISTANCE | GOOD | — | — |

As is evident from Tables 1–5, the methods shown in the examples of the present invention permit (meth)acryl syrup A and B which show excellent storage stability to be manufactured in a shorter period of time as compared to Comparative Examples. The molding material in accordance with the present embodiment is suited for the heat-pressure molding, and can be cured in a short period of time.

Furthermore, the resulting molded articles from the molding materials show excellent properties in their heat-resistance, solvent-resistance, weathering resistance and water-resistance.

EXAMPLE 13

In a reactor provided with a thermometer, a condenser, a nitrogen introducing tube and an agitator, placed were 194 parts of methyl methacrylate and 6 parts of methacrylic acid. Then, an inside atmosphere of the reactor was replaced by nitrogen gas. After heating the mixture in the reactor to 80° C. with stirring, 0.1 parts of AIBN and 2 parts of n-dodecylmercaptan were added. Then, a copolymerization reaction was carried out for 6 hours. The resulting reaction mixture had an acid value of 19.

Then, after adding isobutyl vinyl ether (vinyl ether compound) to the reaction mixture, the reaction mixture was stirred at 100° C. for 30 minutes to process the (residual) n-dodecylmercaptan. The isobutyl vinyl ether was added in an amount of 2.0 times mole with respect to the amount of n-dodecylmercaptan added in the polymerization reaction.

Next, glycidyl methacrylate, 0.4 parts of triphenylphosphine (esterification catalyst), and 0.01 parts of hydroquinone (polymerization inhibitor) were added to the reaction mixture. Then, an esterification reaction of the reaction mixture was performed with stirring at 100° C. for 10 hours. The glycidyl methacrylate was added in an amount of 0.5 times mole with respect to methacrylic acid, thereby obtaining (meth)acryl syrup C'. The resulting (meth)acryl syrup C' had a concentration of the solid portion of 42 percent, viscosity of 28 poise, an acid value of 11 and a weight-average molecular weight of 42,000.

Further, with respect to the (meth)acryl syrup C', a number of double bonds per molecule of a (meth)acryl polymer was measured in the following manner. Specifically, the difference in acid value of the (meth)acryl polymer before and after reacted with glycidyl methacrylate was measured. Then, a number of moles of the lost carboxyl groups in 1 g of (meth)acryl polymer was computed to determined the number of moles of the polymerizable double bounds in 1 g of (meth)acryl polymer. On the other hand, based on the weight-average molecular weight of the (meth)acryl polymer, a number of moles of 1 g of (meth)acryl polymer was computed. Then, from the resulting number of moles of the polymerizable double bond in 1 g of (meth)acryl polymer and a number of moles of 1 g of (meth)acryl polymer, a number of double bonds per (meth)acryl polymer was obtained, which was found to be 5.3.

Thereafter, to 100 parts of (meth)acryl syrup C', 2 parts of benzoyl peroxide were added and dissolved therein, thereby obtaining a casting material (molding material). The resulting casting material was deaerated under reduced pressure. The casting material, i.e., the compound showed excellent storage stability.

After pouring the casting material into the cell used in Example 1, the cell was heated to 60° C. to cure the casting material. The gel time was measured in the same manner as Example 1 and was found to be 30 minutes at 60° C.

After demolding the casting material, a postcure process (so-called after-curing) was applied at 100° C., thereby obtaining a resin plate (molded article). The resulting resin plate was insoluble in THF and acetone, and the solvent-resistance was determined to be desirable. The main reaction conditions and the results are summarized respectively in Table 6 and Table 7.

EXAMPLE 14

(Meth)acryl syrup C' was prepared in the same manner as Example 13 except that as a vinyl ether compound, 3,4-dihydro-2H-pyrane was used. The resulting (meth)acryl syrup C' showed a concentration of the solid portion of 43 percent, viscosity of 31 poise, an acid value of 11, and a weight-average molecular weight of 39,000.

Thereafter, a casting material was obtained in the same manner as Example 13. The resulting casting material showed excellent storage stability. Then, using the same mold as Example 13, a resin plate was prepared. The gel time at 60° C. was 30 minutes. The resulting resin plate showed desirable solvent-resistance. The main reaction conditions and results are summarized respectively in Table 6 and Table 7.

COMPARATIVE EXAMPLE 10

(Meth)acryl syrup was prepared in the same manner as Example 13 except that isobutyl vinyl ether was not used. During the esterification process, the viscosity of the resulting (meth)acryl syrup was gradually build-up. As a result, (meth)acryl syrup A of increased the solid portion, viscosity and molecular weight, can be achieved.

Thereafter, a comparative casting material was obtained in the same manner as Example 13. Then, from the resulting comparative casting material, a comparative resin plate was prepared in the same manner as Example 13. The gel time at 60° C. was 60 minutes. The resulting casting material was inferior in storage stability. The resulting comparative resin plate was swelled in THF and acetone. The main reaction conditions and results are summarized respectively in Table 6 and Table 7.

EXAMPLE 15

Example 13 was repeated except that the order of carrying out the thiol process and esterification process were switched to obtain (meth)acryl syrup C'. The resulting (meth)acryl syrup C' had a concentration of solid portion of 50 percent, viscosity of 150 poise, an acid value of 11 and a weight-average molecular weight of 58,000.

Thereafter, a casting material was obtained in the same manner as Example 13. The resulting casting material showed excellent storage stability. Then, using the same mold as Example 13, a resin plate was prepared. The gel time at 60° C. was 30 minutes. The resulting resin plate showed desirable solvent-resistance. The main reaction conditions and results are summarized respectively in Table 6 and Table 7.

TABLE 6

| | EXAMPLE | | | COMPARATIVE EXAMPLE |
|---|---|---|---|---|
| | 13 | 14 | 15 | 10 |
| POLYMERIZATION | | | | |
| METHYL METHACRYLATE (PARTS) | 194 | 194 | 194 | 194 |
| METHACRYLIC ACID (PARTS) | 6 | 6 | 6 | 6 |
| N-DODECYLMERCAPTAN (PARTS) | 2 | 2 | 2 | 2 |
| AIBN (PARTS) | 0.1 | 0.1 | 0.1 | 0.1 |
| REACTION TEMPERATURE (° C.) | 80 | 80 | 80 | 80 |
| REACTION TIME (hr) | 6 | 6 | 6 | 6 |
| ACID VALUE | 15 | 20 | 19 | 19 |
| PROCESS CONDITION | | | | |
| ISOBUTYL VINYL ETHER (TIMES MOLE) | 2.0 | — | 2.0 | — |
| 3,4-DIHYDRO-2H-PYRANE (TIMES MOLE) | — | 2.0 | — | — |
| REACTION TEMPERATURE (° C.) | 100 | 100 | 100 | — |
| REACTION TIME (hr) | 0.5 | 0.5 | 0.5 | — |
| ESTERIFICATION | | | | |
| GLYCIDYL METHACRYLATE (TIMES MOLE) | 0.5 | 0.5 | 0.5 | 0.5 |
| TRIPHENYL PHOSPHINE (PARTS) | 0.4 | 0.4 | 0.4 | 0.4 |
| HYDROQUINONE (PARTS) | 0.01 | 0.01 | 0.01 | 0.01 |
| REACTION TEMPERATURE (° C.) | 100 | 100 | 100 | 100 |
| REACTION TIME (hr) | 10 | 10 | 10 | 10 |

TABLE 7

| | EXAMPLE | | | COMPARATIVE EXAMPLE |
|---|---|---|---|---|
| | 13 | 14 | 15 | 10 |
| VISCOSITY (POISE) | 28 | 31 | 150 | 170 |
| CONCENTRATION OF SOLID PORTION (PERCENT) | 42 | 43 | 50 | 51 |
| ACID VALUE | 11 | 11 | 11 | 13 |
| WEIGHT-AVERAGE MOLECULAR WEIGHT (Mw) | 42,000 | 39,000 | 58,000 | 60,000 |
| NUMBER OF DOUBLE BONDS PER MOLECULE | 5.3 | 5.0 | 7.2 | 7.4 |
| GEL TIME (MINUTES) | 30 | 30 | 30 | 60 |
| STORAGE STABILITY | GOOD | GOOD | GOOD | INFERIOR |

TABLE 7-continued

| | EXAMPLE | | | COMPARATIVE EXAMPLE |
|---|---|---|---|---|
| | 13 | 14 | 15 | 10 |
| SOLVENT-RESISTANCE | INSOLUBLE | INSOLUBLE | INSOLUBLE | SWELL |

EXAMPLE 16

In the reactor used in Example 13, placed were 180 parts of methyl methacrylate and 20 parts of methacrylic acid. Then, an inside atmosphere of the reactor was replaced by nitrogen gas. After heating the mixture in the reactor to 80° C. with stirring, 0.1 parts of AIBN and 10 parts of pentaerythritol tetrakis thioglycolate were added. Then, a copolymerization reaction was carried out for 4 hours, thereby obtaining a reaction mixture.

Then, after adding isobutyl vinyl ether to the reaction mixture, the reaction mixture heated to 100° C. was stirred for 30 minutes to process the (residual) n-dodecylmercaptan. The isobutyl vinyl ether was added in an amount of 2.0 times mole with respect to the amount of n-dodecylmercaptan added.

Next, glycidyl methacrylate, 0.1 parts of triphenylphosphine, and 0.01 parts of hydroquinone were added to the reaction mixture. Then, an esterification reaction of the reaction mixture was performed with stirring for 8 hours at 100° C. The glycidyl methacrylate was added in an amount of 1.0 times mole with respect to methacrylic acid, thereby obtaining (meth)acryl syrup C'. The resulting (meth)acryl syrup C' had a concentration of the solid portion of 52 percent, viscosity of 39 poise and acid value of 27 and a weight-average molecular weight of 14,000.

Then, a casting material was obtained in the same manner as Example 13. The resulting casting material had excellent storage stability. From the casting material, a resin plate was prepared using the same mold as Example 13. The gel time at 60° C. was 15 minutes. The resulting resin plate had a desirable solvent-resistance. The main reaction conditions and the results are summarized respectively in Table 8 and Table 9.

EXAMPLE 17

(Meth)acryl syrup C' was prepared in the same manner as Example 16 except that amounts of use of the methyl methacrylate and the methacrylic acid were altered from 180 parts to 196 parts and from 20 parts to 4 parts respectively.

Thereafter, a casting material was obtained in the same manner as Example 13. The resulting casting material had excellent storage stability. Then, using the same mold as Example 13, a resin plate was prepared. The gel time at 60° C. was 40 minutes. The resulting resin plate showed desirable solvent-resistance. The main reaction conditions and results are summarized respectively in Table 8 and Table 9.

EXAMPLE 18

In a reactor provided with a thermometer, a condenser, a nitrogen introducing tube and an agitator, placed were 196 parts of methyl methacrylate and 4 parts of methacrylic acid. Then, an inside atmosphere of the reactor was replaced by nitrogen gas. After heating the mixture in the reactor to 80° C. with stirring, 0.1 parts of AIBN and 1.0 part of n-dodecylmercaptan were added. Then, a copolymerization reaction was carried out for 6 hours, thereby obtaining a reaction mixture.

Then, after adding isobutyl vinyl ether to the reaction mixture, the reaction mixture heated to 100° C. was stirred for one hour to process the (residual) n-dodecylmercaptan. The isobutyl vinyl ether was added in an amount of 2.0 times mole with respect to the amount of n-dodecylmercaptan added, thereby obtaining (meth)acryl syrup C. The resulting (meth)acryl syrup C had a concentration of the solid portion of 24 percent, viscosity of 7 poise, an acid value of 12 and a weight-average molecular weight of 61,000.

Thereafter, a casting material was prepared in the same manner as Example 13. The resulting casting material showed excellent storage stability. Then, using the same mold as Example 13, a resin plate was prepared. The gel time at 60° C. was 40 minutes. The resulting resin plate showed desirable solvent-resistance. The main reaction conditions and results are summarized respectively in Table 8 and Table 9.

COMPARATIVE EXAMPLE 11

(Meth)acryl syrup was prepared in the same manner as Example 18 except that isobutyl vinyl ether was not used.

From the (meth)acryl syrup, a comparative casting material was prepared in the same manner as Example 13. Then, using the same mold as Example 13, a resin plate was prepared. The gel time at 60° C. was 60 minutes. The resulting resin plate was inferior in storage stability. The main reaction conditions and results are summarized respectively in Table 8 and Table 9.

TABLE 8

|  | EXAMPLE | | | COMPARATIVE EXAMPLE |
|---|---|---|---|---|
|  | 16 | 17 | 18 | 11 |
| POLYMERIZATION | | | | |
| METHYL METHACRYLATE (PARTS) | 180 | 196 | 196 | 196 |
| METHACRYLIC ACID (PARTS) | 20 | 4 | 4 | 4 |
| N-DODECYLMERCAPTAN (PARTS) | — | — | 1 | 1 |
| PENTAERYTERITOL TETRAKIS THIOGLYCOLATE (PARTS) | 10 | 10 | — | — |
| AIBN (PARTS) | 0.1 | 0.1 | 0.1 | 0.1 |
| REACTION TEMPERATURE (° C.) | 80 | 80 | 80 | 80 |
| REACTION TIME (hr) | 4 | 4 | 6 | 6 |
| ACID VALUE | 58 | 11 | 12 | 12 |
| PROCESS CONDITION | | | | |
| ISOBUTYL VINYL ETHER (TIMES MOLE) | 2.0 | 2.0 | 2.0 | — |
| REACTION TEMPERATURE (° C.) | 100 | 100 | 100 | — |
| REACTION TIME (hr) ESTERIFICATION | 0.5 | 0.5 | 1.0 | — |
| GLYCIDYL METHACRYLATE (TIMES MOLE) | 1.0 | 1.0 | — | — |
| TRIPHENYL PHOSPHINE (PARTS) | 0.1 | 0.1 | — | — |
| HYDROQUINONE (PARTS) | 0.01 | 0.01 | — | — |
| REACTION TEMPERATURE (° C.) | 160 | 100 | — | — |
| REACTION TIME (hr) | 8 | 8 | — | — |

TABLE 9

|  | EXAMPLE | | | COMPARATIVE EXAMPLE |
|---|---|---|---|---|
|  | 16 | 17 | 18 | 11 |
| VISCOSITY (POISE) | 39 | 40 | 7 | 8 |
| CONCENTRATION OF SOLID PORTION (PERCENT) | 52 | 51 | 24 | 24 |
| ACID VALUE | 27 | 5 | 12 | 12 |
| WEIGHT-AVERAGE MOLECULAR WEIGHT (Mw) | 14,000 | 13,000 | 61,000 | 60,000 |
| NUMBER OF DOUBLE BONDS PER MOLECULE | 7.6 | 1.8 | — | — |
| GEL TIME (MINUTES) | 15 | 40 | 40 | 60 |
| STORAGE STABILITY | GOOD | GOOD | GOOD | INFERIOR |
| SOLVENT-RESISTANCE | INSOLUBLE | INSOLUBLE | INSOLUBLE | SWELLED |

EXAMPLE 19

In a reactor provided with a thermometer, a condenser, a nitrogen introducing tube and an agitator, placed were a solution obtained by dissolving 0.2 parts of polyvinyl alcohol (PVA-205 KURARAY Co., LTD.) (dispersion stabilizer) in 180 parts of deionized water (dispersion medium) (solvent). On the other hand, 8 parts of methyl methacrylate, 8 parts of styrene as a vinyl compound, 4 parts of trimetylolpropanetrimethacrylate, 0.5 parts of n-dodecylmercaptan and 0.2 parts of AIBN were mixed in another reactor to obtain a mixture. Then, the mixture was added in the reactor, and was stirred at 500 rpm to form a homogeneous suspension. Thereafter, the suspension was heated to 75° C. while introducing therein nitrogen gas. Then, the suspension polymerization reaction was carried out for 5 hours with stirring while maintaining the temperature thereof at 75° C.

After the polymerization, isobutyl vinyl ether was added to the suspension (reaction mixture), and the suspension was heated to 90° C. (one hour) to process the (residual) n-dodecylmercaptan in the bead polymer. The isobutyl vinyl ether was added in an amount of 3.0 times mole with respect to the amount of n-dodecylmercaptan added.

Then, a polymer was filtered off from the suspension ((meth)acryl syrup), and was washed and dried, thereby obtaining a bead polymer. Then, by using an extruder with barrel diameter of 30 mm (available from Research Laboratory Plastic Technology), the polymer beads were extruded as strands with a diameter of 5 mm under the conditions of the barrel temperature at 240° C. and the barrel pressure at 20 mmHg. Then, the obtained strands were chopped into pellets by using a pelletizer. In the described process, no carbide adhering to the screw was observed. Further, during the preparation process of the pellet, no odor was generated due to the thiol compound. The main reaction conditions and the results are summarized in Table 10.

EXAMPLE 20

A bead polymer was prepared in the same manner as Example 19 except that isobutyl vinyl ether was not used.

Then, the resulting bead polymer was heated to 240° C., and isobutyl vinyl ether was added to process the (residual) n-dodecylmercaptan which was in the bead polymer. The isobutyl vinyl ether was added in an amount of 3.0 times mole with respect to the amount of n-dodecylmercaptan added.

Then, a pellet was prepared in the same manner as Example 19. In the described process, no carbide adhering to the screw was observed. Further, during the preparation process of the pellet, no odor was generated due to the thiol compound. The main reaction conditions and the results are summarized in Table 10.

COMPARATIVE EXAMPLE 12

A bead polymer was prepared in the same manner as Example 20. Then, a pellet was prepared in the same manner as Example 20 except that isobutyl vinyl ether was not used. In the described process, no carbide adhering to the screw was observed. Further, during the preparation process of the pellet, no odor was generated due to the thiol compound. The main reaction conditions and the results are summarized in Table 10.

TABLE 10

| | EXAMPLE | | COMPARATIVE EXAMPLE |
|---|---|---|---|
| | 19 | 20 | 12 |
| POLYMERIZATION | | | |
| METHYL METHACRYLATE (PARTS) | 8 | 8 | 8 |
| STYRENE (PARTS) | 8 | 8 | 8 |
| TRIMETHYLOL PROPANE TRIMETHACRYLATE (PARTS) | 4 | 4 | 4 |
| n-DODECYLMERCAPTAN | 0.5 | 0.5 | 0.5 |
| POLYVINYL ALCOHOL (PARTS) | 0.2 | 0.2 | 0.2 |
| DEIONIZED WATER (PARTS) | 180 | 180 | 180 |
| AIBN (PARTS) | 0.2 | 0.2 | 0.2 |
| REACTION TEMPERATURE (° C.) | 75 | 75 | 75 |
| REACTION TIME (hr) | 5 | 5 | 5 |
| PROCESS CONDITION | | | |
| ISOBUTYL VINYL ETHER (TIMES MOLE) | 3.0 | 3.0 | — |
| REACTION TEMPERATURE (° C.) | 90 | 240 | — |
| REACTION TIME (hr) | 1.0 | — | — |
| CARBIDE ADHERING TO SCREW | NO | NO | YES |
| COLOR GENERATED BY THIOL | NO | NO | YES |

EXAMPLE 21

(Meth)acryl syrup C' was prepared in the same manner as Example 13. Then, 100 parts of (meth)acryl syrup C' was mixed with 1 part of magnesium oxide, 1 part of pentadodecenylsuccinic acid, 1 part of t-butylperoxy-2-ethylhexanoate, 4 parts of zinc stearate and 150 parts of aluminum hydroxide (HIGILITE H-320 available from SHOWA DENKO K.K.) to obtain compounds.

Then, the resulting compounds were coated onto the surface of a polyethylene film to have a uniform thickness. Then, a glass fiber (chopped roving fiber with a length of 1 inch) was uniformly spread thereon as a reinforcing material. Then, the resulting compounds were further coated onto the surface of the polyethylene film to have a uniform thickness. Namely, the glass fiber was sandwiched between the compounds, thereby obtaining SMC (molding material). The glass fiber content in the SMC was adjusted to be 25 percent. The resulting SMC was wrapped with a cellophane film, and was aged for one day at 40° C.

Next, the SMC was molded with the application of heat and pressure. Specifically, a 200 mm×200 mm mold was used in which the temperature of the mold on the upper side was set to 110° C., while the lower side thereof was set to 100° C. Then, the SMC cut into a predetermined size was compressed in the mold at 6 MPa. Then, heat-pressure molding was performed for 5 minutes to prepare a molded plate (molded article) with a thickness of 3 mm.

The gel time at 110° C. was measured using a Curelastometer (available from Orientec Co.). Specifically, the SMC (test material) was heated to 110° C. (heat-application starting time), and the time required for the torque at 110° C. to rise was measured by the measuring unit to determine a gel time. As a result, the gel time at 110° C. was found to be 100 seconds.

The resulting molded plate had glossy and smooth surface. The molded plate was insoluble in both THF and acetone, and the solvent-resistance was determined to be desirable. Further, according to the JIS A 1415 method, an accelerated weathering resistance test was performed for 1,000 hours using a sun-shine weather meter. As a result, neither significant change in color nor choking was observed. Further, a boiling test was performed for 100 hours at 90° C. to evaluate the water-resistance. As a result, the molded plate still had a glossy surface, and no significant changes were observed. Furthermore, the molded plate was kept in the oven heated to 170° C. for 1 hour to evaluate the heat-stability. As a result, no significant changes in appearance were observed such as a color turned into yellowish, and the molded plate still had a glossy surface. The main reaction conditions and the results are summarized in Table 11.

EXAMPLE 22

(Meth)acryl syrup C' was prepared in the same manner as Example 14. From the resulting (meth)acryl syrup C', a molding plate was prepared in the same manner as Example 21 except that respective amounts of use of magnesium oxide and pentadodecenylsuccinic acid were altered respectively from 1 part to 2 parts and from 1 part to 3 parts. The gel time at 110° C. was 100 seconds. The resulting molding plate had glossy and smooth surface. The main conditions and the results are summarized in Table 11.

COMPARATIVE EXAMPLE 13

Comparative (meth)acryl syrup was prepared in the same manner as Comparative Example 10. Then, from the resulting comparative (meth)acryl syrup, a comparative SMC was prepared in the same manner as Example 21. Thereafter, the resulting SMC was aged for one day at 40° C. The comparative SMC was found to be cured after being aged. The main reaction conditions are summarized in Table 11.

COMPARATIVE EXAMPLE 14

Comparative (meth)acryl syrup was prepared in the same manner as Example 13 except that the amount of use of isobutyl vinyl ether with respect to n-dodecylmercaptan was altered from 2.0 times mole to 0.05 times mole. As a result, comparative (meth)acryl syrup whose viscosity, percentage of solid portion and molecular weight were increased during the esterification process was obtained.

Next, using the comparative (meth)acryl syrup, a comparative SMC was prepared in the same manner as Example 21. Thereafter, a comparative SMC was aged for one day at 40° C. As a result, the comparative SMC was cured. The main reaction conditions are summarized in Table 11.

COMPARATIVE EXAMPLE 15

Comparative (meth)acryl syrup was prepared in the same manner as Example 15 except that the amount of use of isobutyl vinyl ether with respect to n-dodecylmercaptan was altered from 2.0 times moles to 0.05 times mole. As a result, comparative (meth)acryl syrup whose viscosity, percentage of solid portion and molecular weight were increased during the esterification process was obtained.

Next, using the comparative (meth)acryl syrup, a comparative SMC was prepared in the same manner as Example 21. Thereafter, a comparative SMC was aged for one day at 40° C. As a result, the comparative SMC was found to be cured. The main reaction conditions are summarized in Table 11.

EXAMPLE 23

(Meth)acryl syrup C' was prepared in the same manner as Example 15. From the (meth)acryl syrup C', a molding plate was prepared in the same manner as Example 21 except that the amounts of use of magnesium oxide and pentadocenylsuccinic acid were altered respectively from 1 part to 2 parts, and from 1 part to 3 parts respectively, and that in replace of 150 parts of aluminum hydroxide, 100 parts of aluminum hydroxide and 50 parts of calcium carbonate (filler) (Whiton P-70 available from Toyo Fine Chemical Co., LTD.) were mixed. The gel time at 110° C. was 80 seconds.

The resulting molding plate had glossy and smooth surface and excellent heat-resistance. Furthermore, the weathering resistance and the water-resistance were evaluated. As a result, the molding plate was found to have superior properties to that of Example 21 although a slight change in color and a reduction in glossiness on the surface thereof were observed. The main reaction conditions and the results are summarized in Table 11.

EXAMPLE 24

(Meth)acryl syrup C' was prepared in the same manner as Example 16. From the (meth)acryl syrup C', a molding plate was prepared in the same manner as Example 21 except that the amounts of use of magnesium oxide and pentadocenylsuccinic acid were altered from 1 part to 2 parts, and from 1 part to 3 parts respectively, and that in replace of 150 parts of aluminum hydroxide, a mixture of 100 part of aluminum hydroxide and 50 parts of glass powder (filler) (FMB 30W-001 available from NITTO BOSEKI Co. LTD.) was used. The gel time at 110° C. was 120 seconds.

The resulting molding plate had glossy and smooth surface and excellent heat-resistance, weathering resistance and water-resistance. The main reaction conditions and the results are summarized in Table 11.

EXAMPLE 25

(Meth)acryl syrup C' was prepared in the same manner as Example 17. From the (meth)acryl syrup C', a molding plate was prepared in the same manner as Example 21 except that the amount of use of (meth)acryl syrup C' was altered from 100 parts to 85 parts and that 15 parts of trimethylolpropanetrimethacrylate was added. The gel time at 110° C. was 75 seconds.

The resulting molding plate had glossy and smooth surface and excellent heat-resistance weathering resistance, and water-resistance. The main reaction conditions and the results are summarized in Table 11.

TABLE 11

| EXAMPLE | 21 | 22 | 23 | 24 | 25 |
|---|---|---|---|---|---|
| MAGNESIUM OXIDE (PARTS) | 1 | 2 | 2 | 2 | 1 |
| PENTADODECENYL SUCCINIC ACID (PARTS) | 1 | 3 | 3 | 3 | 1 |
| ALUMINIUM HYDROXIDE (PARTS) | 150 | 150 | 100 | 100 | 150 |
| CALCIUM CARBONATE (PARTS) | — | — | 50 | — | — |
| GLASS POWDER (PARTS) | — | — | — | 50 | — |
| GEL TIME (SECONDS) | 100 | 100 | 80 | 120 | 75 |
| AGED MOLDING MATERIAL | GOOD | GOOD | GOOD | GOOD | GOOD |
| HEAT-RESISTANCE | GOOD | GOOD | GOOD | GOOD | GOOD |
| WEATHERING RESISTANCE | GOOD | GOOD | GOOD | GOOD | GOOD |
| WATER-RESISTANCE | GOOD | GOOD | GOOD | GOOD | GOOD |

| COMPARATIVE EXAMPLE | 13 | 14 | 15 |
|---|---|---|---|
| MAGNESIUM OXIDE (PARTS) | 1 | 1 | 1 |
| PENTADODECENYL SUCCINIC ACID (PARTS) | 1 | 1 | 1 |
| ALUMINUM HYDROXIDE (PARTS) | 150 | 150 | 150 |
| AGED MOLDING MATERIAL | CURED | CURED | CURED |

EXAMPLE 26

(Meth)acryl syrup C' was prepared in the same manner as Example 13. Then, 100 parts of (meth)acryl syrup C' was mixed with 1 part of magnesium oxide, 2 parts of pentadodecenylsuccinic acid, 1 part of t-butylperoxy-2-ethylhexanoate, 4 parts of zinc stearate, 350 parts of aluminum hydroxide (HIGILITE H-320 available from SHOWA DENKO K.K.) and a glass fiber (chopped strand fiber with a length of ¼ inch) as a reinforcing material. Then, the mixture was kneaded using a double-arm kneader. As a result, BMC (molding material) was obtained. The glass fiber content was adjusted to be 5 percent. Thereafter, the resulting BMC was wrapped with Vinylon film (Kuraray, Co., Ltd.) and was aged for one day at 40° C.

Next, a molding plate (molded article) was prepared by molding the BMC with the application of heat and pressure. The gel time at 110° C. was 110 seconds. The resulting molding plate had glossy and smooth surface and excellent heat-resistance, weathering resistance and water-resistance. The main reaction conditions and results are summarized in Table 12.

COMPARATIVE EXAMPLE 16

Comparative (meth)acryl syrup was prepared in the same manner as comparative example 10. Then, using the resulting comparative (meth)acryl syrup, a comparative BMC was prepared in the same manner as Example 26. Thereafter, the resulting BMC was aged for one day at 40° C. As a result, ages comparative BMC was cured. The main reaction conditions are summarized in Table 12.

EXAMPLE 27

(Meth)acryl syrup C' was prepared in the same manner as Example 14. Then, 100 parts of (meth)acryl syrup C' was mixed with 1 part of bis(4-t-butylcyclohexyl) peroxydicarbonate (curing agent) and 200 parts of aluminum hydroxide (HIGILITE H-320 ST available from SHOWA DENKO K.K.). Then the mixture was kneaded and deaerated. As a result, a casting material (molding material) was obtained.

However, the resulting casting material was casted using a glass cell. Specifically, after pouring the casting material into the cell, the cell was heated for 1 hour at 60° C. to cure the casting material. After demolding the casting material, a postcure process was performed for 2 hours at 100° C., thereby obtaining an artificial marble plate (molded article).

The resulting artificial marble plate had a glossy and smooth surface and appeared to be high-grade in quality and in the feel of a material. The artificial marble plate had excellent heat-resistance, weathering resistance and water-resistance. The main reaction conditions and results of the artificial marble plate are summarized in Table 12.

COMPARATIVE EXAMPLE 17

Comparative (meth)acryl syrup was prepared in the same manner as comparative example 10. Then, from the comparative (meth)acryl syrup, a comparative artificial marble plate was prepared in the same manner as Example 27.

However, the resulting comparative artificial marble plate was soluble in both THF and acetone, and the solvent-resistance was determined to be inferior. Further, the heat-resistance, weathering resistance and water-resistance thereof were evaluated. As a result, changes in appearance, such as color turned into yellowish, etc., were observed. The comparative artificial marble plate had a rough surface which was no longer glossy. The main reaction conditions and results are summarized in Table 12.

EXAMPLE 28

(Meth)acryl syrup C' was prepared in the same manner as Example 15. Then, 100 parts of (meth)acryl syrup C' was mixed with 1 part of bis(4-t-butylcyclohexyl) peroxydicarbonate and 1 part of t-butylperoxy benzoate (perbutyl Z available from NOF Corporation), 200 parts of aluminum hydroxide (HIGILITE H-31 available from SHOWA DENKO K.K.) and 7 parts of ZELEC-UN (available from E.I. DuPont de Nemours & Co.) as a mold release agent, thereby obtaining a pultrusing material.

The molding material was pultruded with 75 bundles of glass roving using a die with length of 800 mm and a hole size of 113 mm×3.1 mm under the conditions with the die temperature at 90° C. and the pultrusion speed of 0.8 m/minute. As a result, the molded plate (molded article) was obtained.

The resulting molded plate had glossy and smooth surface, and excellent heat-resistance, weathering resistance and water-resistance. The main reaction conditions and results are summarized in Table 12.

COMPARATIVE EXAMPLE 18

Comparative (meth)acryl syrup was prepared in the same manner as Comparative Example 10. Then, from the comparative (meth)acryl syrup, a comparative molding plate (molded article) was prepared in the same manner as Example 28.

The heat-resistance, weathering resistance and water-resistance thereof were evaluated. As a result, changes in appearance, such as color turned into yellowish, etc., were observed. The comparative artificial marble plate had a rough surf ace which was no longer glossy. The main reaction conditions and results are summarized in Table 12.

TABLE 12

| EXAMPLES | 26 | 27 | 28 |
|---|---|---|---|
| MAGNESIUM OXIDE (PARTS) | 1 | — | — |
| PENTADODECENYLSUCCINIC ACID (PARTS) | 2 | — | — |
| ALUMINIUM HYDROXIDE (PARTS) | 350 | 200 | 200 |
| GEL TIME (SECONDS) | 110 | — | — |
| AGED MOLDING MATERIAL | GOOD | — | — |
| HEAT-RESISTANCE | GOOD | GOOD | GOOD |
| WEATHERING RESISTANCE | GOOD | GOOD | GOOD |
| WATER-RESISTANCE | GOOD | GOOD | GOOD |
| COMPARATIVE EXAMPLE | 16 | 17 | 18 |
| MAGNESIUM OXIDE (PARTS) | 1 | — | — |
| PENTADODECENYLSUCCINIC ACID (PARTS) | 2 | — | — |
| ALUMINUM HYDROXIDE (PARTS) | 350 | 200 | 200 |
| AGED MOLDING MATERIAL | CURED | — | — |
| HEAT-RESISTANCE | — | INFERIOR | INFERIOR |
| WEATHERING RESISTANCE | — | INFERIOR | INFERIOR |
| WATER-RESISTANCE | — | INFERIOR | INFERIOR |

As is evident from Tables 6–12, the manufacturing methods shown in the examples of the present invention provide desirable molding materials. Specifically, the molding materials prepared in Example s 19 or 20 do not generate odor due to the thiol compounds without having carbide adhering to the mold when molding. Moreover, the molding material prepares in Examples 13–18 and 21–28 can be cured in relatively short period of time. Furthermore, the molded articles produced from the molding materials of the above-mentioned examples offered excellent heat-resistance, weathering resistance and water-resistance.

EXAMPLE 29

In a separable flask (reactor) provided with a thermometer, a condenser, a nitrogen introducing tube and an agitator, placed were 130 parts of methyl methacrylate, 40 parts of N-cyclohexyl maleimide (vinyl compound) and 30 parts of styrene. Then, an inside atmosphere of the reactor was replaced by nitrogen gas. After heating the mixture in the reactor to 85° C. with stirring, 0.006 parts of AIBN as a polymerization initiator and 0.3 parts of n-dodecylmercaptan were added to initiate a polymerization reaction.

After 5 hours, the reaction solution showed a viscosity of 30–35 poise (25° C.), ant the reaction was stopped (reaction time: 5 hours). Then, 35 parts of methyl methacrylate was further added to the reaction solution, and the reaction solution was cooled off to 40° C. (cooling process).

After adding isobutyl vinyl ether, the reaction mixture was stirred for 30 minutes at 100° C. to process the residual n-dodecylmercaptan in the reaction mixture. The isobutyl vinyl ether was added in an amount of 2.0 times mole with respect to n-dodecylmercaptan.

As a result, (meth)acryl syrup C was obtained. The (meth)acryl syrup C had a concentration of a solid portion of 29 percent, viscosity of 8. poise and a weight-average molecular weight of 103,000.

Next, 100 parts of (meth)acryl syrup C was mixed with 1 part of t-butylperoxy-2-ethylhexanoate, 4 parts of zinc stearate and 400 parts of aluminum hydroxide (HIGILITE HS-320 available from SHOWA DENKO K.K.), thereby obtaining compounds.

Then, a glass fiber (chopped strand fiber with a length of ¼ inch) was applied to the compound, and was kneaded using a double-arm kneader. As a result, BMC (molding material) was obtained. The glass fiber content was adjusted to be 5 percent. Then, the resulting BMC was placed in a metal container and was aged for one day at 40° C. As a result, the compound, i.e., BMC, was not cured and did not have a sticky surface either.

The BMC was molded with the application of heat and pressure at the upper mold temperature of 120° C. and the lower mold temperature of 110° C. Then, the BMC cut into a predetermined size was placed in the mold and was compressed at 6 MPa. Then, the BMC was molded with the application of heat and pressure for 7 minutes, thereby forming a molded article with a thickness of 3 mm. The gel time at 120° C. was 70 seconds.

The resulting molded article showed desirable glossiness of 85 (60° gloss), and low coloring with the yellowness index (YI) of 2.31. Furthermore, the molded article showed a smooth surface without a meshed relief due to the glass fiber applied on the surface.

An accelerated weathering test of the molded article was performed for 1,000 hours. As a result, neither a significant change in color nor choking was observed. Further, the molded article was left in an oven heated to 150° C. for 1 hour to evaluate the heat-resistance. As a result, changes in appearance such as color turned into yellowish, etc., were not observed, and the molded plate still had a glossy surface. Even after two month storage a 40° C., the BMC was not cured, and the storage stability of the BMC was determined to be excellent.

EXAMPLE 30

A polymerization reaction was performed in the same manner as Example 29 except that in replace of 130 parts of methyl methacrylate respectively, and that 118 parts of methyl methacrylate and 12 parts of methacrylic acid were used.

After 4.5 hours, the reaction solution showed a viscosity of 30–35 poise (25° C.), and he reaction was stopped. Then, 35 parts of methyl methacrylate was further added to the reaction solution, and the reaction solution was cooled off to 40° C. (cooling process).

The reaction mixture was processed in the same manner as Example 29 to prepare a (meth)acryl syrup C. The (meth)acryl syrup C had a concentration of a solid portion of 28 percent, a viscosity of 9.5 poise and a weight-average molecular weight of 107,000.

Next, 100 parts of (meth)acryl syrup C was mixed with 1 part of t-butylperoxy-2-ethylhexanoate, 4 parts of zinc stearate and 400 parts of aluminum hydroxide (HIGILITE HS-320 available from SHOWA DENKO K.K.), thereby obtaining compounds.

Then, a glass fiber (chopped strand fiber with a length of ¼ inch) was applied to the compound, and was kneaded using a double-arm kneader. As a result, BMC (molding material) was obtained. The glass fiber content was adjusted to be 5 percent. Then, the resulting BMC was placed in a metal vessel and was aged for one day at 40° C. As a result, the compounds were not cured and did not have a sticky surface either.

The BMC was molded with the application of heat and pressure at the upper mold temperature of 120° C. and the lower mold temperature of 110° C. Then, the BMC cut into a predetermined size was placed in the mold and was compressed at 6 MPa. Then, the BMC was molded for 7 minutes with the application of heat and pressure, thereby forming a molded article with a thickness of 3 mm. The gel time at 120° C. was 60 seconds.

The resulting molded article showed desirable glossiness of 85 (60° gloss), and low coloring with the yellowness index (YI) of 2.10. Furthermore, the molded article showed a smooth surface without a meshed relief due to the glass fiber on the surface.

An accelerated weathering test of the molded article was performed for 1,000 hours. As a result, neither significant change in color nor choking was observed. Further, the molded article was left in an oven heated to 150° C. for 1 hour to evaluate the heat-resistance. As a result, no significant changes in appearance such as color turned into yellowish, etc., were observed, and the molded plate still had a glossy surface. Even after two month storage at 40° C., the BMC was not cured, and the storage stability of the BMC was determined to be excellent.

EXAMPLE 31

100 parts of (meth)acryl syrup C prepared in Example 30 was mixed with 8.4 parts of glycidyl methacrylate, 0.2 parts of triphenylphosphine and 0.05 parts of hydroquinone. Then, an esterification of the mixture was performed with stirring at 100° C. for 10 hours to perform an esterification reaction. The (meth)acryl syrup C' had a concentration of a solid portion of 33 percent, a viscosity of 20 poise and a weight-average molecular weight of 130,000.

With respect to the (meth)acryl syrup C', a number of double bonds in one molecule of the (meth)acryl polymer was measured in the same manner as Example 13, which was found to be 13.

The kneading and aging processes were performed in the same manner as Example 30 except that in replace of (meth)acryl syrup C, (meth)acryl syrup C' was used to obtain BMC. Then, the molding process was performed in the same manner as Example 30 to obtain a molded article with a thickness of 3 mm. The gel time at 120° C. was 55 seconds.

The resulting molded article show ed desirable glossiness of 85 (60° gloss), and low coloring with the yellowness index (YI) of 2.43. Furthermore, the molded article showed a smooth surface without a meshed relief due to the glass fiber on the surface.

An accelerated weathering test of the molded article was performed for 1,000 hours. As a result, neither significant change in color nor choking was observed. Further, the molded article was left in an oven heated to 150° C. for 1 hour to evaluate the heat-resistance. As a result, no significant changes in appearance such as color turned into yellowish, etc., were observed, and the molded plate still had a glossy surface. Even after two month storage t 40° C., the BMC was not cured, and the storage stability of the BMC was determined to be excellent.

EXAMPLE 32

In a separable flask (reactor) provided with a thermometer, a condenser, a nitrogen introducing tube and an agitator, placed were 200 parts of methyl methacrylate. Then, an inside atmosphere of the reactor was replaced by nitrogen gas. After heating the mixture in the reactor to 85° C. with stirring, 0.006 parts of AIBN and 0.3 parts of n-dodecylmercaptan were added to initiate a polymerization reaction.

After 5.5 hours, the reaction solution showed a viscosity of 30–35 poise (25° C.), and the reaction was stopped (reaction time: 5 hours). Then, 35 parts of methyl methacrylate was further added to the reaction solution, and the reaction solution was cooled off to 40° C. (cooling process).

Then, the reaction mixture was processed in the same manner as Example 29, thereby obtaining (meth)acryl syrup C. The (meth)acryl syrup C had a concentration of a solid portion of 29 percent, viscosity of 7.5 poise and a weight-average molecular weight of 105,000.

Next, 2 parts of benzoyl peroxide were added and dissolved in 100 parts of (meth)acryl syrup C. As a result, a casting material (molding material) was obtained. The casting material was deaerated under reduced pressure. The casting material, i.e., the compound showed storage stability.

Then, after pouring the casting material into the cell used in Example 1, the cell was heated for 1 hour at 60° C. to cure the casting material. The gel time at 60° C. was 45 minutes as a result of measurement by Example 1.

After demolding the casting material, the postcure process (after-curing) was applied at 100° C., thereby obtaining a resin plate (molded article). The resulting resin plate was insoluble in THF and acetone, and the solvent-resistance was determined to be desirable.

EXAMPLE 33

In a separable flask (reactor) provided with a thermometer, a condenser, a nitrogen introducing tube and an agitator, placed were 93 parts of methyl methacrylate, and 7 parts of methacrylic acid. Then, an inside atmosphere of the reactor was replaced by nitrogen gas. After heating the mixture in the reactor to 80° C. with stirring, 1 part of AIBN and 4 parts of n-dodecylmercaptan (chain transfer agent) were added. Then, a copolymerization reaction was performed for 4 hours. As a result, a reaction mixture (unprocessed acryl syrup) was obtained.

To the reaction mixture, 10 parts of glycidyl methacrylate (unsaturated epoxy compound), 0.03 parts of zinc octylate (esterification catalyst) and 0.01 parts of hydroquinone were added. Then, an esterification of the mixture was performed for 5 hours at 100° C. in an atmosphere of air, thereby obtaining (meth)acryl syrup E. The resulting (meth)acryl syrup E was transparent and colorless, and had a concentration of a solid portion of 52 percent, a viscosity of 36 poise and a weight-average molecular weight of 17,000.

Next, 2 parts of benzoyl peroxide were added and dissolved in 100 parts of (meth)acryl syrup E. As a result, a casting material (molding material) was obtained. The casting material was deaerated under reduced pressure. The casting material was not gelled over 3 hours at room temperature. Namely, the casting material, i.e., the compound showed storage stability.

The storage stability was evaluated based on the following: When the casting material was not gelled after an elapsed time of 3 hours at room temperature, the storage stability was determined to be "good", while when the casting material was gelled within 3 hours, the storage stability was determined to be "inferior".

Then, the casting material was poured into a cell prepared by laminating two glasses placed so as to face each other with a clearance of 7 mm by an elastic gasket. Specifically, after pouring the casting material into the cell, the cell was heated for 1 hour at 60° C. to cure the casting material.

Further, the cured molding material was demolded, and the postcure process was applied for 2 hours at 120° C. (a so-called after-curing), thereby obtaining a molded plate. Then, the deflection temperature under load (HDT; heat-distortion temperature) of the molded plate was measured according to the JIS 6911 method. As a result, the deflection temperature under load was found to be 120° C. The main reaction conditions and the results are summarized respectively in Table 13 and Table 15.

EXAMPLE 34

(Meth)acryl syrup E was prepared in the same manner as Example 33 except that in replace of zinc octylate, tin octylate was used. The resulting (meth)acryl syrup E was colorless and transparent, and had a concentration of a solid portion of 52 percent, viscosity of 35 poise and a weight-average molecular weight of 16,000.

Then, a casting material was prepared in the same manner as Example 33. The resulting casting material showed excellent storage stability. Further, a molding plate was prepared in the same manner as Example 33. The deflection temperature under load of the molding plate was 118° C. The main reaction conditions and the results are summarized respectively in Table 13 and Table 15.

EXAMPLE 35

(Meth)acryl syrup E was prepared in the same manner as Example 33 except that in replace of zinc octylate, zirconium octylate was used. The resulting (meth)acryl syrup E was colorless and transparent, and had a concentration of a solid portion of 52 percent, viscosity of 35 poise and a weight-average molecular weight of 16,000.

Then, a casting material was prepared in the same manner as Example 33. The resulting casting material showed excellent storage stability. Further, a molding plate was prepared in the same manner as Example 33. The deflection temperature under load of the molding plate was 118° C. The main reaction conditions and the results are summarized respectively in Table 13 and Table 15.

EXAMPLE 36

(Meth)acryl syrup E was prepared in the same manner as Example 33 except that in replace of zinc octylate, zinc stearate was used. The resulting (meth)acryl syrup E was colorless and transparent, and had a concentration of a solid portion of 52 percent, viscosity of 36 poise and a weight-average molecular weight of 17,000.

Then, a casting material was prepared in the same manner as Example 33. The resulting casting material showed excellent storage stability. Further, a molding plate was prepared in the same manner as Example 33. The deflection temperature under load of the molding plate was 120° C. The main reaction conditions and the results are summarized respectively in Table 13 and Table 15.

EXAMPLE 37

(Meth)acryl syrup E was prepared in the same manner as Example 33 except that in replace of zinc octylate, zinc benzoate was used. The resulting (meth)acryl syrup E was colorless and transparent, and had a concentration of a solid portion of 52 percent, viscosity of 37 poise and a weight-average molecular weight of 17,000.

Then, a casting material was prepared in the same manner as Example 33. The resulting casting material showed excellent storage stability. Further, a molding plate was prepared in the same manner as Example 33. The deflection temperature under load of the molding plate was 120° C. The main reaction conditions and the results are summarized respectively in Table 13 and Table 15.

EXAMPLE 38

(Meth)acryl syrup E was prepared in the same manner as Example 33 except that in replace of zinc octylate, zinc chloride ($ZnCl_2$) was used. The resulting (meth)acryl syrup E was colorless and transparent, and had a concentration of a solid portion of 51 percent, viscosity of 37 poise and a weight-average molecular weight of 18,000.

Then, a casting material was prepared in the same manner as Example 33. The resulting casting material showed excellent storage stability. Further, a molding plate was prepared in the same manner as Example 33. The deflection temperature under load of the molding plate was 120° C. The main reaction conditions and the results are summarized respectively in Table 14 and Table 15.

EXAMPLE 39

(Meth)acryl syrup E was prepared in the same manner as Example 33 except that in replace of zinc octylate, zinc hydrogen phosphoate ($ZnHPO_4$) was used. The resulting (meth)acryl syrup E was colorless and transparent, and had a concentration of a solid portion of 51 percent, viscosity of 36 poise and a weight-average molecular weight of 17,000.

Then, a casting material was prepared in the same manner as Example 33. The resulting casting material showed excellent storage stability. Further, a molding plate was prepared in the same manner as Example 33. The deflection temperature under load of the molding plate was 120° C. The main reaction conditions and the results are summarized respectively in Table 14 and Table 15.

EXAMPLE 40

(Meth)acryl syrup E was prepared in the same manner as Example 33 except that in replace of zinc octylate, zinc acetyl acetone ($Zn(acac)_2$) was used. The resulting (meth) acryl syrup E was colerless and transparent, and had a concentration of a solid portion of 52 percent, viscosity of 45 poise and a weight-average molecular weight of 21,000.

Then, a casting material was prepared in the same manner as Example 33. The resulting casting material showed excellent storage stability. Further, a molding plate was prepared in the same manner as Example 33. The deflection temperature under load of the molding plate was 121° C. The main reaction conditions and the results are summarized respectively in Table 14 and Table 15.

EXAMPLE 41

(Meth)acryl syrup E was prepared in the same manner as Example 33 except that in replace of n-dodecylmercaptan, 3-mercaptopropionic acid (thiol compound) was used. The resulting (meth)acryl syrup E was colorless and transparent, and had a concentration of a solid portion of 51 percent, viscosity of 37 poise and a weight-average molecular weight of 18,000.

Then, a casting material was prepare in the same manner as Example 33. The resulting casting material showed excellent storage stability. Further, a molding plate was prepared in the same manner as Example 33. The deflection temperature under load of the molding plate was 125° C. The main reaction conditions and the results are summarized respectively in Table 14 and Table 15.

TABLE 13

| EXAMPLE | 33 | 34 | 35 | 36 | 37 |
| --- | --- | --- | --- | --- | --- |
| METHYL METH-ACRYLATE (PARTS) | 93 | 93 | 93 | 93 | 93 |
| METHACRYLIC ACID (PARTS) | 7 | 7 | 7 | 7 | 7 |
| n-DODECYLMER-CAPTAN (PARTS) | 4 | 4 | 4 | 4 | 4 |
| AIBN (PARTS) | 1 | 1 | 1 | 1 | 1 |
| REACTION TEMPERA-TURE (° C.) | 80 | 80 | 80 | 80 | 80 |
| REACTION TIME (hr) | 4 | 4 | 4 | 4 | 4 |
| GLYCIDYL METH-ACRYLATE (PARTS) | 10 | 10 | 10 | 10 | 10 |
| ZINC OCTYLATE (PARTS) | 0.03 | — | — | — | — |
| TIN OCTYLATE (PARTS) | — | 0.03 | — | — | — |
| ZIRCONIUM OCTY-LATE (PARTS) | — | — | 0.03 | — | — |
| ZINC STEARATE (PARTS) | — | — | — | 0.03 | — |
| ZINC BENZOATE (PARTS) | — | — | — | — | 0.03 |
| REACTION TEMPERA-TURE (° C.) | 100 | 100 | 100 | 100 | 100 |
| REACTION TIME (hr) | 5 | 5 | 5 | 5 | 5 |

TABLE 14

| EXAMPLE | 38 | 39 | 40 | 41 |
| --- | --- | --- | --- | --- |
| METHYL METHACRYLATE (PARTS) | 93 | 93 | 93 | 93 |
| METHEACRYLIC ACID (PARTS) | 7 | 7 | 7 | 7 |
| n-DODECYLMERCAPTAN (PARTS) | 4 | 4 | 4 | — |
| 3-MERCAPTOPROPIONIC ACID (PARTS) | — | — | — | 4 |
| AIBN (PARTS) | 1 | 1 | 1 | 1 |
| REACTION TEMPERATURE (° C.) | 80 | 80 | 80 | 80 |
| REACTION TIME (hr) | 4 | 4 | 4 | 4 |
| GLYCIDYL METH-ACRYLATE (PARTS) | 10 | 10 | 10 | 10 |
| ZINC OCTYLATE (PARTS) | — | — | — | 0.03 |
| ZIRCONIUM CHLORIDE (PARTS) | 0.03 | — | — | — |
| ZINC HYDROGEN PHOSPHATE (PARTS) | — | 0.03 | — | — |
| ZINC ACETYL ACETONE (PARTS) | — | — | 0.03 | — |
| REACTION TEMPERATURE (° C.) | 100 | 100 | 100 | 100 |
| REACTION TIME (hr) | 5 | 5 | 5 | 5 |

TABLE 15

| EXAMPLES | 33 | 34 | 35 | 36 | 37 | 38 | 39 | 40 | 41 |
|---|---|---|---|---|---|---|---|---|---|
| WEIGHT-AVERAGE MOLECULAR WEIGHT (×10⁴) | 1.7 | 1.6 | 1.6 | 1.7 | 1.7 | 1.8 | 1.7 | 2.1 | 1.8 |
| VISCOSITY (POISE) | 36 | 35 | 35 | 36 | 37 | 37 | 36 | 45 | 37 |
| CONCENTRATION OF SOLID PORTION (PERCENT) | 52 | 52 | 52 | 52 | 52 | 51 | 51 | 52 | 51 |
| COLOR OF (METH) ACRYL SYRUP | COLORLESS | COLORLESS | COLORLESS | COLORLESS | COLORLESS | COLORLESS | COLORLESS | COLORLESS | COLORLESS |
| DEFLECTION TEMPERATURE UNDER LOAD (° C.) | 120 | 118 | 118 | 120 | 120 | 120 | 120 | 121 | 125 |
| STORAGE STABILITY | GOOD | GOOD | GOOD | GOOD | GOOD | GOOD | GOOD | GOOD | GOOD |

COMPARATIVE EXAMPLE 19

(Meth)acryl syrup was prepared in the same manner as Example 33 except that in replace of zinc octylate, cobalt octylate was used. The resulting (meth)acryl syrup E was in dark blue color, and had a concentration of a solid portion of 54 percent, viscosity of 40 poise and a weight-average molecular weight of 19,000.

Then, a comparative casting material was prepared in the same manner as Example 33. The resulting comparative casting material showed inferior storage stability. Further, a molding plate was prepared in the same manner as Example 33. The deflection temperature under load of the molding plate was 115° C. The main reaction conditions and the results are summarized respectively in Table 16 and Table 18.

COMPARATIVE EXAMPLE 20

(Meth)acryl syrup was prepared in the same manner as Example 33 except that in replace of zinc octylate, iron octylate was used. The resulting (meth)acryl syrup was in liver brown color, and had a concentration of a solid portion of 51 percent, viscosity of 35 poise and a weight-average molecular weight of 15,000.

Then, a comparative casting material was prepared in the same manner as Example 33. The resulting comparative casting material showed inferior storage stability. Further, a molding plate was prepared in the same manner as Example 33. The deflection temperature under load of the molding plate was 105° C. The main reaction conditions and the results are summarized respectively in Table 16 and Table 18.

COMPARATIVE EXAMPLE 21

(Meth)acryl syrup was prepared in the same manner as Example 33 except that in replace of zinc octylate, triethyl amine was used. The resulting (meth)acryl syrup was in liver brown color, and had a concentration of a solid portion of 52 percent, viscosity of 36 poise and a weight-average molecular weight of 17,000.

Then, a comparative casting material was prepared in the same manner as Example 33. The resulting comparative casting material showed inferior storage stability. Further, a molding plate was prepared in the same manner as Example 33. The deflection temperature under load of the molding plate was 120° C. The main reaction conditions and the results are summarized respectively in Table 16 and Table 18.

COMPARATIVE EXAMPLE 22

(Meth)acryl syrup was prepared in the same manner as Example 33 except that in replace of zinc octylate, triethylbenzylammonium chloride was used. The resulting (meth)acryl syrup was in liver brown color, and had a concentration of a solid portion of 53 percent, viscosity of 36 poise and a weight-average molecular weight of 16,000.

Then, a comparative casting material was prepared in the same manner as Example 33. The resulting comparative casting material showed inferior storage stability. Further, a molding plate was prepared in the same manner as Example 33. The deflection temperature under load of the molding plate was 110° C. The main reaction conditions and the results are summarized respectively in Table 16 and Table 18.

COMPARATIVE EXAMPLE 23

A comparative (meth)acryl syrup was prepared in the same manner as Example 33 except that glycidyl methacrylate was not added. The resulting comparative (meth)acryl syrup was transparent and colorless, and had a concentration of a solid portion of 50 percent, viscosity of 30 poise and a weight-average molecular weight of 14,000.

Then, a comparative casting material was prepared in the same manner as Example 33. The resulting comparative casting material showed inferior storage stability. Further, a molding plate was prepared in the same manner as Example 33. The deflection temperature under load of the molding plate was low (90° C.), and the thermal strength thereof was determined to be inferior. The main reaction conditions and the results are summarized respectively in Table 16 and Table 18.

COMPARATIVE EXAMPLE 24

Comparative (meth)acryl syrup was prepared in the same manner as Example 33 except that zinc octylate was not used. The resulting (meth)acryl syrup was transparent and colorless, and had a concentration of a solid portion of 46 percent, a viscosity of 27 poise and a weight-average molecular weight of 14,000.

Then, a comparative casting material was prepared in the same manner as Example 33. The resulting comparative casting material showed inferior storage stability. Further, a molding plate was prepared in the same manner as Example 33. The deflection temperature under load of the molding plate was low (90° C.), and the thermal strength thereof was determined to be inferior. The main reaction conditions and the results are summarized respectively in Table 17 and Table 18.

COMPARATIVE EXAMPLE 25

Comparative (meth)acryl syrup was prepared in the same manner as Example 33 except that in replace of 93 parts of methyl methacrylate and 7 parts of methacrylic acid, 100 parts of methyl methacrylate were used, and that an amount of n-dodecylmercaptan was altered from 4 parts to 3 parts. The resulting comparative (meth)acryl syrup was transparent and colorless, and had a concentration of a solid portion of 46 percent, a viscosity of 27 poise and a weight-average molecular weight of 14,000.

Then, a comparative casting material was prepared in the same manner as Example 33. The resulting comparative casting material showed excellent storage stability. Further, a molding plate was prepared in the same manner as Example 33. The deflection temperature under load of the molding plate was low (90° C.), and the thermal strength thereof was determined to be inferior. The main reaction conditions and the results are summarized respectively in Table 17 and Table 18.

TABLE 16

| COMPARATIVE EXAMPLE | 19 | 20 | 21 | 22 | 23 |
|---|---|---|---|---|---|
| METHYL METHACRYLATE (PARTS) | 93 | 93 | 93 | 93 | 93 |
| METHACRYLIC ACID (PARTS) | 7 | 7 | 7 | 7 | 7 |
| n-DODECYLMERCAPTAN (PARTS) | 4 | 4 | 4 | 4 | 4 |
| AIBN (PARTS) | 1 | 1 | 1 | 1 | 1 |
| REACTION TEMPERATURE (° C.) | 80 | 80 | 80 | 80 | 80 |
| REACTION TIME (hr) | 4 | 4 | 4 | 4 | 4 |
| GLYCIDYL METHACRYLATE (PARTS) | 10 | 10 | 10 | 10 | — |
| COBALT OCTYLATE (PARTS) | 0.03 | — | — | — | — |
| IRON OCTYLATE (PARTS) | — | 0.03 | — | — | — |
| TRIETHYL AMINE (PARTS) | — | — | 0.03 | — | — |
| TRIETHYLBENZIL AMMONIUM CHLORIDE (PARTS) | — | — | — | 0.03 | — |
| ZINC OCTATE (PARTS) | — | — | — | — | 0.03 |
| REACTION TEMPERATURE (° C.) | 100 | 100 | 100 | 100 | 100 |
| REACTION TIME (hr) | 5 | 5 | 5 | 5 | 5 |

TABLE 17

| COMPARATIVE EXAMPLE | 24 | 25 |
|---|---|---|
| METHYL METHACRYLATE (PARTS) | 93 | 100 |
| METHACRYLIC ACID (PARTS) | 7 | — |
| n-DODECYLMERCAPTAN (PARTS) | 4 | 3 |
| AIBN (PARTS) | 1 | 1 |
| REACTION TEMPERATURE (° C.) | 80 | 80 |
| REACTION TIME (hr) | 4 | 4 |
| GLYCIDYL METHACRYLATE (PARTS) | 10 | 10 |
| ZINC OCTYLATE (PARTS) | — | 0.03 |
| REACTION TEMPERATURE (° C.) | 100 | 100 |
| REACTION TIME (hr) | 5 | 5 |

TABLE 18

| COMPARATIVE EXAMPLE | 19 | 20 | 21 | 22 | 23 | 24 | 25 |
|---|---|---|---|---|---|---|---|
| WEIGHT-AVERAGE MOLECULAR WEIGHT ($\times 10^4$) | 1.9 | 1.5 | 1.7 | 1.6 | 1.4 | 1.4 | 1.4 |
| VISCOSITY (POISE) | 40 | 35 | 36 | 36 | 30 | 27 | 27 |
| CONCENTRATION OF SOLID PORTION (PERCENT) | 54 | 51 | 52 | 53 | 50 | 46 | 46 |
| COLOR OF (METH)ACRYL SYRUP | DARK BLUE | LIVER BROWN | LIVER BROWN | LIGHT BROWN | COLORLESS | COLORLESS | COLORLESS |
| DEFLECTION TEMPERATURE UNDER LOAD (° C.) | 115 | 105 | 120 | 110 | 90 | 90 | 90 |
| STORAGE STABILITY | INFERIOR | INFERIOR | INFERIOR | INFERIOR | INFERIOR | INFERIOR | GOOD |

As is evident from Tables 13–18, the molding materials prepared in Examples 33–41 are hardly colored and show excellent storage stability. The molded articles (cured product) obtained by molding the molding materials show excellent thermal strength.

EXAMPLE 42

In a reactor provided with a thermometer, a condenser, a nitrogen introducing tube and an agitator, placed were 118 parts of methyl methacrylate, 12 parts of methacrylic acid, 40 parts of N-cyclohexyl maleimide and 30 parts of styrene. Then, an inside atmosphere of the reactor was replaced by nitrogen gas. After heating the mixture in the reactor to 85° C. with stirring, 0.006 parts of AIBN and 0. 3 parts of n-dodecylmercaptan were added to initiate a polymerization reaction.

After 4.5 hours, the reaction solution showed a viscosity of 30–35 poise (25° C.), and the reaction was stopped. Then, 35 parts of methyl methacrylate was further added to the reaction solution, and the reaction solution was quenched to 40° C. (cooling process).

Further, 8.4 parts of glycidyl methacrylate, 0.2 parts of zinc octylate and 0.05 parts of hydroquinone were added to 100 parts of reaction mixture. Then, an esterification reaction of the reaction mixture was performed with stirring at 100° C. for 10 hours.

As a result, (meth)acryl syrup E was obtained. The resulting (meth)acryl syrup E had a concentration of a solid portion of 32 percent, a viscosity of 15 poise and a weight-average molecular weight of 140,000.

With respect to the (meth)acryl syrup E, a number of double bonds in one molecule of the (meth)acryl polymer was measured in the same manner as Example 13, which was found to be 14.

Next, 100 parts of (meth)acryl syrup E was mixed with 1 part of t-butylperoxy-2-ethylhexanoate, 4 parts of zinc stearate and 400 parts of aluminum hydroxide (HIGILITE HS-320 available from SHOWA DENKO K.K.), thereby obtaining compounds.

Then, a glass fiber (chopped strand fiber with a length of ¼ inch) was applied to the compound, and was kneaded using a double-arm kneader. As a result, BMC (molding material) was obtained. The glass fiber content was adjusted to be 5 percent. Thereafter, the resulting BMC was placed in a metal container and was aged for one day at 40° C. As a result, the compound was not cured and did not have a sticky surface either.

The BMC was molded with the application of heat and pressure at the upper mold temperature of 120° C. and the lower mold temperature of 110° C. Then, the BMC cut into a predetermined size was placed in the mold and was compressed at 6 MPa. Then, the BMC was molded for 7 minutes with the application of heat and pressure, thereby forming a plate (molded article) with a thickness of 3 mm. The gel time at 120° C. was 55 seconds.

The resulting molded article showed desirable glossiness of 87 (60° gloss), and low coloring with the yellowness index (YI) of 2.00. Furthermore, the molded article had a smooth surface without a meshed relief due to the glass fiber applied on the surface.

An accelerated weathering test of the molded article was performed for 1,000 hours. As a result, neither significant change in color nor choking was observed. Further, the molded article was left in the oven heated to 150° C. for 1 hour to evaluate the heat-resistance. As a result, no significant changes in appearance such as color turned into yellowish, etc., were observed, and the molded plate still had a glossy surface. Further, even after two-month storage at 40° C., the BMC was not cured, and the storage stability of the BMC was determined to be excellent.

EXAMPLE 43

In a reactor provided with a thermometer, a condenser, a nitrogen introducing tube and an agitator, placed was an aqueous solution obtained by dissolving 0.2 parts of polyvinyl alcohol (PVA-205, available from KURARAY Co., LTD) as a dispersion stabilizer in 180 parts of deionized water. On the other hand, 19 parts of methyl methacrylate, 1 part of methacrylic acid, 0.5 parts of n-dodecylmercaptan and 0.2 parts of AIBN were mixed in a another container. The mixture was added in the reactor, and was stirred at 500 rpm, thereby obtaining a homogeneous suspension. The suspension was heated to 75° C. while introducing therein nitrogen gas, and a suspension polymerization reaction was performed with stirring for 5 hours.

After the polymerization reaction, water was removed from the suspension (reaction mixture) to extract the polymer. Then, 30 parts of polymer was dissolved in 70 parts of methyl methacrylate.

Then, after 2.5 parts of glycidyl methacrylate, 0.1 parts of zinc octylate, and 0.05 parts of hydroquinone were added to 100 parts of polymer solution, an esterification reaction of the polymer solution was performed for 10 hours with stirring at 100° C., thereby obtaining (meth)acryl syrup E. The resulting (meth)acryl syrup E was transparent and colorless, and had a concentration of a solid portion of 31 percent, a viscosity of 5.5 poise and a weight-average molecular weight of 60,000.

Next, 2 parts of benzoyl peroxide were added to and dissolved in 100 parts of (meth)acryl syrup E to prepare a casting material (molding material). The casting material was deaerated under reduced pressure. The casting material was not gelled over 3 hours at room temperature, and the storage stability of the casting material was determined to be excellent. The storage stability was evaluated based on the following: When the casting material was not gelled after an elapsed of 3 hours at room temperature, the storage stability was determined to be "good", while when the casting material was gelled within 3 hours, the storage stability was determined to be "inferior".

Then, the casting material was poured into a cell prepared by laminating two glasses placed so as to face each other with a clearance of 7 mm by an elastic gasket. Specifically, after pouring the casting material into the cell, the cell was heated at 60° C. to cure the casting material.

Further, the cured molding material was demolded, and the postcure process was applied for 2 hours at 120° C. (a so-called after-curing), thereby obtaining a molding plate. Then, the deflection temperature under load (HDT; heat-distortion temperature) of the molding plate was measured according to the JIS 6911 method. As a result, the deflection temperature under load was found to be 118° C.

EXAMPLE 44

In a reactor provided with a thermometer, a condenser, a nitrogen introducing tube and an agitator, placed were 55 parts of methyl methacrylate, 3 parts of methacrylic acid, 20 parts of styrene, and 22 parts of N-cyclohexyl maleimide.

Then, an inside atmosphere of the reactor was replaced by nitrogen gas. After heating the mixture in the reactor to 90° C. with stirring, 0.1 parts of AIBN and 1.0 part of n-dodecylmercaptan were added to initiate a polymerization reaction.

After 420 minutes, the reaction solution showed a viscosity of 30–35 poise (25° C.), and the reaction was stopped. Then, 35 parts of methyl methacrylate was further added to the reaction solution, and the reaction solution was quenched. The resulting mixture had a viscosity of 7 poise (25° C.), a concentration of solid portion of 23.5 percent and a weight-average molecular weight of 91,000.

After 0.35 parts of maleic anhydride, and 0.02 parts of triethyl amine were added to 100 parts of resulting reaction mixture, the reaction mixture was stirred for 15 minutes to process the n-dodecylmercaptan added in the reaction mixture. The maleic anhydride and the triethyl amine were added respectively in amounts of 1.4 times mole and 0.08 times mole with respect to the amount of n-dodecylmercaptan added. As a result, (meth)acryl syrup A was obtained.

Then, 100 parts of (meth)acryl syrup A was mixed with 1 part of magnesium oxide, 1 part of pentadodecenylsuccinic acid, 1 part of t-butylperoxy-2-ethylhexanoate, 4 parts of zinc stearate, and 150 parts of aluminum hydroxide (HIGILITE HS-320 available from SHOWA DENKO K.K.) to obtain compounds. Then, after applying the compound on the polyethylene film surface with a uniform thickness, a glass fiber (chopped roving fiber with a length of 1 inch) was uniformly spread on the surface of the polyethylene film.

Further, the coating material prepared by spreading the compounds on the polyethylene film surface with a predetermined thickness was laminated on the polyethylene film so as to sandwich the glass fiber between the compounds. As a result, SMC (molding material) was obtained. The glass fiber content in the SMC was adjusted to be 25 percent. Thereafter, the resulting SMC was wrapped with a cellophane film, and was aged for one day at 40° C.

Next, the SMC was molded with the application of heat and pressure. Namely, using a mold of a predetermined size, the temperature of the mold on the upper side was set to 120° C., while the lower side thereof was set to 110° C. Then, the SMC was cut into a predetermined size and was compressed in the mold at 6 MPa. Then, heat-pressure molding was performed for 7 minutes to prepare a molded article with a thickness of 3 mm. The gel time at 120° C. was 90 seconds.

The glossiness of the resulting molded article was measured according to the JIS K 7105 method, and was found to be 80 (60° gloss). The yellowness index (YI) was measured according to the JIS K 7103 method, and was found to be low (4.08). Furthermore, the molded article showed a smooth surface without a meshed relief due to the glass fiber on the surface.

An accelerated weathering test of the molded article was performed for 1,000 hours using a sun shine weather meter according to the JIS A 1415 method. As a result, neither significant change in color nor choking was observed. Further, the molded article was left in the oven heated to 150° C. for 1 hour to evaluate the heat-resistance. As a result, no significant changes in appearance such as color turned into yellowish, etc., were observed, and the molded plate still had a glossy surface. Further, even after two month storage at 40° C., the SMC was not cured, and the storage stability of the SMC was determined to be excellent. The main results are summarized in Table 19.

EXAMPLE 45

(Meth)acryl syrup A was prepared in the same manner as Example 44. From (meth)acryl syrup A, SMC was prepared in the same manner as Example 44 except that in replace of 150 parts of aluminum hydroxide, a mixture 100 parts of aluminum hydroxide and 50 parts of glass powder (FMB 30W-001 available from NITTO BOSEKI Co., LTD) was used. Then, the aging and molding processes were performed in the same manner as Example 44, thereby obtaining a plate with a thickness of 3 mm (molded plate). The gel time at 120° C. was 90 seconds.

The resulting molded article showed desirable glossiness of 83 (60° gloss), and low coloring with the yellowness index (YI) of 3.92. Furthermore, the molded article had a smooth surface without a meshed relief due to the glass fiber on the surface.

An accelerated weathering test of the molded article was performed for 1,000 hours. As a result, neither significant change in color nor choking was observed. Further, the molded article was kept in the oven heated to 150° C. for 1 hour to evaluate the heat-resistance. As a result, no significant changes in appearance such as color turned into yellowish, etc., were observed, and the molded plate still had a glossy surface. Further, even after two month storage at 40° C., the SMC was not cured, and the storage stability of the SMC was determined to be excellent. The main results are summarized in Table 19.

EXAMPLE 46

(Meth)acryl syrup A was prepared in the same manner as Example 44. Then, 100 parts of (meth)acryl syrup A was mixed with 1 part of magnesium oxide, 2 parts of pentadodecenylsuccinic acid, 1 part of t-butylperoxy-2-ethylhexanoate, 4 parts of zinc stearate, and 350 parts of aluminum hydroxide (HIGILITE HS-320 available from SHOWA DENKO K.K.) to obtain compounds.

Then, a glass fiber (chopped strand fiber with a length of ¼ inch) was applied to the compounds, and was kneaded using a double-arm kneader. As a result, BMC (molding material) was obtained. The glass fiber content was adjusted to be 5 percent. Then, the resulting BMC was placed in a metal container and was aged for one day at 40° C. As a result, the compound was not cured and did not have a sticky surface either. Then, the BMC was molded in the same manner as Example 44 to obtain a 3 mm-thick molded article. The gel time at 120° C. was 60 seconds.

The resulting molded article showed desirable glossiness of 85 (60° gloss), and low coloring with the yellowness index (YI) of 2.02. Furthermore, the molded article showed a smooth surface without a meshed relief due to the glass fiber on the surface.

An accelerated weathering test of the molded article was performed for 1,000 hours. As a result, no significant change in color nor choking was observed. Further, the molded article was left in the oven heated to 150° C. for 1 hour to evaluate the heat-resistance. As a result, no significant changes in appearance such as color turned into yellowish, etc., were observed, and the molded plate still had a glossy surface. Even after two month storage at 40° C., the BMC was not cured, and the storage stability was determined to be excellent. The main results are summarized in Table 19.

EXAMPLE 47

(Meth)acryl syrup A was prepared in the same manner as Example 44. Then, 90 parts of (meth)acryl syrup A was mixed with 10 parts of trimethylol propane trimethacrylate, 1 part of magnesium oxide, 2 parts of pentadodecenylsuccinic acid, 1 part of t-butylperoxy-2-ethylhexanoate, 4 parts of zinc stearate, and 350 parts of aluminum hydroxide (HIGILITE HS-320 available from SHOWA DENKO K.K.) to obtain compounds.

Using the resulting compounds, BMC was prepared in the same manner as Example 46. Further, a 3 mm thick plate (molded article) was obtained in the same manner as Example 44. The gel time at 120° C. was 50 seconds.

The resulting molded article showed desirable glossiness of 85 (60° gloss), and low coloring with the yellowness index (YI) of 2.12. Furthermore, the molded article had a smooth surface without a meshed relief due to the glass fiber on the surface.

An accelerated weathering test of the molded article was performed for 1,000 hours. As a result, neither significant change in color nor choking was observed. Further, the molded article was kept in the oven heated to 150° C. for 1 hour to evaluate the heat-resistance. As a result, no significant changes in appearance such as color turned into yellowish, etc., were observed, and the molded plate still had a glossy surface. Further, even after two month storage at 40° C., the BMC was not cured, and the storage stability of the BMC was determined to be excellent. The main results are summarized in Table 19.

EXAMPLE 48

(Meth)acryl syrup was prepared in the same manner as Example 44 except that methacrylic acid was not used, and the amount of use of methyl methacrylate was altered from 55 parts to 58 parts. The resulting (meth)acryl syrup had a viscosity of 7 poise (25° C.), a concentration of the solid portion of 22.7 percent and a weight-average molecular weight of 90,000.

Then, 100 parts of (meth)acryl syrup was mixed with 1 part of t-butylperoxy-2-ethylhexanoate, 4 parts of zinc stearate, and 400 parts of aluminum hydroxide (HIGILITE HS-320 available from SHOWA DENKO K.K.) to obtain compounds.

Using the resulting compounds, BMC was prepared in the same manner as Example 46. Further, a 3 mm thick plate (molded article) was prepared in the same manner as Example 44 by repeating the same molding process as Example 44. The gel time at 120° C. was 70 seconds.

The resulting molded article showed desirable glossiness of 85 (60° gloss), and low coloring with the yellowness index (YI) of 2.12. Furthermore, the molded article had a smooth surface without a meshed relief due to the glass fiber on the surface.

An accelerated weathering test of the molded article was performed for 1,000 hours. As a result, neither significant change in color nor choking was observed. Further, the molded article was left in the oven heated to 150° C. for 1 hour to evaluate the heat-resistance. As a result, no significant changes in appearance such as color turned into yellowish, etc., were observed, and the molded plate still had a glossy surface. Further, even after two month storage at 40° C., the BMC was not cured, and the storage stability of the BMC was determined to be excellent. The main results are summarized in Table 19.

EXAMPLE 49

(Meth)acryl syrup A was prepared in the same manner as Example 44 except that in replace of N-cyclohexyl maleimide, N-phenyl maleimide (vinyl compound) was used. The resulting (meth)acryl syrup A had a viscosity of 6 poise (25° C.), a concentration of the solid portion of 22.8 percent and a weight-average molecular weight of 96,000.

From the resulting (meth)acryl syrup A, SMC was prepared in the same manner as Example 44. Further, a 3 mm thick plate (molded article) was prepared by repeating the same aging and molding processes as Example 44. The gel time at 120° C. was 98 seconds.

The resulting molded article showed desirable glossiness of 79 (60° gloss), although the coloring was high (the yellowness index (YI)=21.3). Furthermore, the molded article showed a smooth surface without a meshed relief due to the glass fiber on the surface.

An accelerated weathering test of the molded article was performed for 1,000 hours. As a result, neither significant change in color nor choking was observed. Further, the molded article was left in the oven heated to 150° C. for 1 hour to evaluate the heat-resistance. As a result, no significant changes in appearance such as color turned into yellowish, etc., were observed, and the molded plate still had a glossy surface. The main results are summarized in Table 19.

EXAMPLE 50

(Meth)acryl syrup A was prepared in the same manner as Example 44 except that in replace of N-cyclohexyl maleimide, N-isopropyl maleimide (vinyl compound) was used. The resulting (meth)acryl syrup had a viscosity of 7 poise (25° C.), a concentration of a solid portion of 23.8 percent and a weight-average molecular weight of 110,000.

From the resulting (meth)acryl syrup A, SMC was prepared in the same manner as Example 44. Further, a 3 mm thick plate (molded article) was prepared by repeating the same aging and molding processes as Example 44. The gel time at 120° C. was 100 seconds.

The resulting molded article showed desirable glossiness of 80 (60° gloss), and low coloring with yellowness index (YI) of 5.31. Furthermore, the molded article had a smooth surface without a meshed relief due to the glass fiber applied on the surface.

An accelerated weathering test of the molded article was performed for 1,000 hours. As a result, neither significant change in color nor choking was observed. Further, the molded article was left in the oven heated to 150° C. for 1 hour to evaluate the heat-resistance. As a result, no changes in appearance such as change in color, etc., were observed. The main results are summarized in Table 19.

COMPARATIVE EXAMPLE 26

A comparative (meth)acryl syrup A was prepared in the same manner as Example 44 except that N-cyclohexyl maleimide was not used, and an amount of use of methyl methacrylate was altered from 55 parts to 77 parts. The resulting comparative (meth)acryl syrup had a viscosity of 7 poise (25° C.), a concentration of the solid portion of 23.9 percent and a weight-average molecular weight of 98,000.

From the resulting (meth)acryl syrup, SMC was prepared in the same manner as Example 44. Further, a 3 mm thick plate (molded article) was prepared by repeating the same aging and molding processes as Example 44. The gel time at 120° C. was 130 seconds.

The resulting comparative molded article showed inferior glossiness of 18 (60° gloss). Furthermore, the molded article had a rough surface with a meshed relief due to the glass fiber on the surface.

Further, the molded article was kept in an oven heated to 150° C. for 1 hour to evaluate the heat-resistance. As a result, changes in appearance such as color turned into yellowish, etc., were observed, and the surface thereof was no longer glossy. The main results are summarized in Table 19.

TABLE 19

| EXAMPLE | 44 | 45 | 46 | 47 | 48 |
|---|---|---|---|---|---|
| WEIGHT-AVERAGE MOLECULAR WEIGHT ($\times 10^4$) | — | — | — | — | 9.0 |
| GEL TIME (SECONDS) | 90 | 90 | 60 | 50 | 70 |
| GLOSSINESS (60° GLOSS) | 80 | 83 | 85 | 85 | 85 |
| YELLOWNESS INDEX (YI) | 4.08 | 3.92 | 2.02 | 2.12 | 2.12 |
| SURFACE SMOOTHNESS | GOOD | GOOD | GOOD | GOOD | GOOD |
| HEAT-RESISTANCE | GOOD | GOOD | GOOD | GOOD | GOOD |
| STORAGE STABILITY | GOOD | GOOD | GOOD | GOOD | GOOD |

| | EXAMPLES | | COMPARATIVE EXAMPLE |
|---|---|---|---|
| | 49 | 50 | 26 |
| WEIGHT-AVERAGE MOLECULAR WEIGHT ($\times 10^4$) | 9.6 | 11.0 | 9.8 |
| GEL TIME SECONDS | 98 | 100 | 130 |
| GLOSSINESS (60° GLOSS) | 79 | 80 | 18 |
| YELLOWNESS INDEX (YI) | 21.3 | 5.31 | 4.95 |
| SURFACE SMOOTHNESS | GOOD | GOOD | INFERIOR |
| HEAT-RESISTANCE | GOOD | GOOD | INFERIOR |

As is evident from Table 19, the molding materials prepared in Examples 44–50 are suited for press-molding and can be cured relatively in a short period of time. The molded article prepared by molding the molding materials with the application of heat and pressure show excellent properties in heat-resistance, glossiness, surface smoothness, storage stability, etc.

EXAMPLE 51

In a reactor provided with a thermometer, a condenser, a nitrogen introducing tube and an agitator, placed were 98 parts of methyl methacrylate, and 2 parts of methacrylic acid. Then, an inside atmosphere of the reactor was replaced by nitrogen gas. After heating the mixture in the reactor to 80° C. with stirring, 0.01 parts of AIBN and 0.3 parts of n-dodecylmercaptan were added to initiate a polymerization reaction.

After 5 hours, the reaction solution showed a viscosity of 100–110 poise (25° C.), and the reaction was stopped. Then, hydroquinone was added to the reaction solution, and the reaction solution was cooled off. Here, hydroquinone was added in an amount of 50 ppm with respect to the reaction solution.

Then, after adding 0.1 parts of maleic anhydride and 0.005 parts of triethyl amine to 100 parts of the resulting reaction mixture, the reaction mixture was stirred for 15 minutes to process the residual n-dodecylmercaptan in the reaction mixture. As a result, (meth)acryl syrup A was obtained. The (meth)acryl syrup A had a concentration of a solid portion of 40.5 percent and a weight-average molecular weight of 101,000.

Next, 90 parts of (meth)acryl syrup A was mixed with 10 parts of trimethylol propane trimethacrylate, 0.5 part of magnesium oxide, 1 part of pentadodecenylsuccinic acid, 1 part of t-butylperoxy-2-ethylhexanoate, 4 parts of zinc stearate, and 350 parts of aluminum hydroxide (HIGILITE, HS-310 available from SHOWA DENKO K.K.) to obtain compounds.

Then, a glass fiber (chopped strand fiber with 6 mm length) was applied to the compounds, and was kneaded using a double-arm kneader for 30 minutes. As a result, bulk molding materials were obtained. The glass fiber content was adjusted to be 9 percent. Then, the resulting molding materials were placed in a metal container and was aged for one day at 40° C. The resulting aged compounds offered easy handling without having a sticky surface.

Then, the molding materials were subjected to compression molding. Specifically, a box-shaped mold with an outer size of 38 cm (width)×28 cm (depth)×9 cm (height) was used wherein the upper mold temperature and the lower mold temperature were respectively adjusted to 125° C. and 110° C. Then, 2,200 g of molding materials were placed in and was compressed in the mold at 6 MPa. Then, the molding materials were subjected to the compression molding for 7 minutes, thereby forming a box-shaped molded article with a thickness of 7 mm.

The resulting molded article had a coefficient of linear shrinkage of 0.25 percent, and could be removed from the mold smoothly, thereby obtaining a desirable moldability without generating flaw, crack, warp, deformation, etc. The molded article showed desirable glossiness of 80 (60° gloss) on the bottom surface, and 75 (60° gloss) on the side surface. Further, the molded article had smooth surface without having protrusions and recessions. The strength of the molded article was measured according to the JIS K 6911 method. As a result, the molded article was found to have a flexural strength of 88 MPa and a flexural modulus of 12.5 GPa.

EXAMPLE 52

(Meth)acryl syrup A was prepared in the same manner as Example 51 except that amounts of use of AIBN and n-dodecylmercaptan were altered respectively from 0.01 parts to 0.02 parts and from 0.3 parts to 0.2 parts. The (meth)acryl syrup A had a concentration of a solid portion of 41.5 percent, and a weight-average molecular weight of 108,000.

Then, bulk molding materials was prepared in the same manner as Example 51. Thereafter, the molding materials were sealed in a container and was aged for one day at 40° C. The resulting aged compounds offered easy handling without having sticky surface.

Then, the molding materials were subjected to compression molding in the same manner as Example 51 to prepare a box-shaped molded article.

The resulting molded article had a coefficient of linear shrinkage of 0.27 percent, and could be removed from the mold smoothly, thereby obtaining a desirable moldability without generating flaw, crack, warp, deformation, etc. The glossiness of the molded article was measured in the same manner as Example 51. As a result, the molded article showed desirable glossiness of 79 (60° gloss) on the bottom surface, and 73 (60° gloss) on the side surface. Further, the molded article had smooth surface without having protrusions and recessions. The strength of the molded article was measured according to the JIS K 6911 method. As a result, the molded article was found to have a flexural strength of 70 MPa and a flexural modulus of 11.9 GPa.

COMPARATIVE EXAMPLE 27

In a reactor provided with a thermometer, a condenser, a nitrogen introducing tube and an agitator, placed were 98 parts of methyl methacrylate, and 2 parts of methacrylic acid. Then, an inside atmosphere of the reactor was replaced by nitrogen gas. After heating the mixture in the reactor to 80° C. with stirring, 0.02 parts of AIBN and 0.2 parts of n-dodecylmercaptan were added to initiate a polymerization reaction.

After 5 hours, the reaction solution showed a viscosity of 100–110 poise (25° C.), and the reaction was stopped. Then, hydroquinone was added to the reaction solution, and the reaction solution was cooled off. Here, hydroquinone was added in an amount of 50 ppm with respect to the reaction solution.

Then, using the resulting reaction mixture, compounds were prepared in the same manner as Example 51. Then, glass fiber (chopped strand fiber with a length of 6 mm) was added to the compounds, and was kneaded for 30 minutes by a double-arm kneader, thereby obtaining comparative molding materials. The glass fiber content was adjusted to be 20 percent. Then, a box-shaped molded article was formed by repeating the same aging and compression molding processes as Example 51.

The resulting comparative molded article showed inferior glossiness of 65 (60° gloss) on the bottom surface, and 63 (60° gloss) on the side surface. The comparative molded article had smooth surface without having protrusions and recessions. The strength of the molded article was measured and was found to have a flexural strength 101 MPa and a flexural modulus of 14.5 GPa.

EXAMPLE 53

Molding compounds were prepared in the same manner as Example 51 except that in replace of the glass fiber with a length of 6 mm, glass fiber with a length of 3 mm was added with the content in the molding materials of 9 percent. Then, a box-shaped molding article was prepared by repeating the same aging and compression molding processes as Example 51.

The resulting molded article had a coefficient of linear shrinkage of 0.27 percent, and could be removed from the mold smoothly, thereby obtaining a desirable moldability without generating flaw, crack, warp, deformation, etc. The molded article showed desirable glossiness of 83 (60° gloss) on the bottom surface thereof, and 78 (60° gloss) on the side surface thereof. Further, the molded article had smooth surface without protrusions and recessions. The strength of the molded article was measured and was found to have a flexural strength of 89 MPa and a flexural modulus of 12.9 GPa.

EXAMPLE 54

Compounds were prepared in the same manner as Example 51. Then, to the compounds, glass fiber (chopped strand fiber with a length of 6 mm) and 15 parts of commercially available methyl polymethacrylate (with a weight-average molecular weight of 90,000) as a low shrinkage agent were added. Then, the compounds were kneaded by a double-arm kneader for 30 minutes, thereby obtaining comparative bulk molding materials. The glass fiber content in the comparative molding materials was adjusted to be 9 percent. Thereafter, a comparative box-shaped molded article was prepared by repeating the same aging and compression molding processes as Example 51.

The resulting molded article had a coefficient of linear shrinkage of 0.17 percent, and could be removed from the mold smoothly, thereby obtaining a desirable moldability without generating flaw, crack, warp, deformation, etc. The molded article showed desirable glossiness of 84 (60° gloss) on the bottom surface, and 83 (60° gloss) on the side surface. Further, the molded article had smooth surface without having protrusions and recessions. The strength of the molded article was measured, and was found to have a flexural strength of 83 MPa and a flexural modulus of 12.5 GPa.

EXAMPLE 55

A molded article was prepared in the same manner as Example 54, except that in replace of methyl polymethacrylate, 15 parts of commercially available polystyrene (weight-average molecular weight of 180,000) was used as a low shrinkage agent. Then, a box-shaped molded article was prepared by repeating the same aging and compression molding as Example 51.

The resulting molded article had a coefficient of linear shrinkage of 0.18 percent, and could be removed from the mold smoothly, thereby obtaining a desirable moldability without generating flaw, crack, warp, deformation, etc. The molded article showed desirable glossiness of 85 (60° gloss) on the bottom surface, and 84 (60° gloss) on the side surface. Further, the molded article had smooth surface without having protrusions and recessions. The strength of the molded article was measured, and was found to have a flexural strength of 86 MPa and a flexural modulus of 12.7 GPa.

As is evident from Examples 51–55 and comparative example 27, the molding materials in accordance with the embodiment of the present invention have low coefficient of linear shrinkage and a desirable moldability. Further, the molded articles prepared from the molding materials had smooth and glossy surface. Furthermore, the molding materials in accordance with the present invention have sufficient strength for practical applications although they are slightly lower than those of the molding materials of the comparative examples.

EXAMPLE 56

In a reactor provided with a thermometer, a condenser, a nitrogen introducing tube and an agitator, placed were 188 parts of methyl methacrylate, and 12 parts of methacrylic acid. Then, an inside atmosphere of the reactor was replaced by nitrogen gas. After heating the mixture in the reactor to 85° C. with stirring, 0.006 parts of AIBN and 0.3 parts of n-dodecylmercaptan were added to initiate a polymerization reaction.

After 5.5 hours, the reaction solution showed a viscosity of 30–35 poise (25° C.), and the reaction was stopped. Then, 35 parts of methyl methacrylate were added to the reaction solution, and the reaction solution was quenched to 40° C.

After adding isobutyl vinyl ether, the reaction mixture was stirred for 30 minutes at 100° C. to process the residual n-dodecylmercaptan in the reaction mixture. The isobutyl vinyl ether was added in an amount of 2.0 times mole with respect to n-dodecylmercaptan added in the polymerization reaction.

100 parts of the resulting reaction mixture ((meth)acryl syrup C) was mixed with 8.4 parts of glycidyl methacrylate, 0.2 parts of triphenylphosphine and 0.05 parts of hydroquinone. Then, an esterification reaction of the mixture was performed with stirring at 100° C. for 10 hours. The resulting (meth)acryl syrup C' had a concentration of a solid portion of 31 percent, a viscosity of 11.0 poise and a weight-average molecular weight of 115,000.

With respect to the (meth)acryl syrup C', a number of double bonds in one molecule of the (meth)acryl polymer was measured in the same manner as Example 13, and was found to be 12.

Next, to 80 parts of (meth)acryl syrup C', 20 parts of styrene/ethylene/propylene copolymer (SEPTON with a styrene content of 20 percent (available from KURARAY Co., LTD.) (thermoplastic polymer) was added, and was stirred at 10,000 rpm for 10 minutes using a high speed stirrer (homomixer available from Tokushu Kika Kogyo. Co. Ltd.). The resulting mixture of dispersion medium and dispersed material was not transparent. Further, the particle diameter distribution of the dispersed phase was measured by a particle diameter measuring device (NICOMP 370, available from Pacific Scientific Co.) and was found to be in a range of 50 nm–100 $\mu$m.

The obtained mixture was mixed with 1 part of 1,1-bis (t-hexylperoxy)-3,3,5-trimethylcyclohexane (Perhexa TMH, with 10-hour half-life period temperature of 86.7° C., available from NOF Corporation) as a curing agent, 1.67 parts of magnesium oxide, and 100 parts of aluminum hydroxide (HIGILITE HS-320 available from SHOWA DENKO K.K.) to obtain compounds. Thereafter, the compounds were aged for one day at 40° C.

The resulting thickened compounds were placed in a cylinder with a diameter of 11.3 mm that was heated to 120° C. The bottom part of the cylinder was sealed with a cap in advance so as to prevent the compounds from leaking. Then, a piston was placed in the top part of the cylinder to apply a pressure of 20 kgf/cm$^2$. Thus, the compound was cured under the application of heat and pressure.

The resulting cured product had a coefficient of volume shrinkage of 3.0 percent. The cured product had a smooth surface without a pin hole nor irregularities in glossiness. The cured product was cut into two pieces, and the cross-section thereof was observed using a scanning electron microscope. Many voids of ca. 30 microns were observed at the center of the cured product.

Then, before being cured, the compounds were applied on the surface of the polyethylene film with a predetermined thickness. Thereafter, a glass fiber (chopped roving fiber with a length of 1 inch) as a reinforcing material was uniformly applied thereon.

Then, on the compounds, another material was uniformly applied on the surface of the polyethylene film. Namely, the glass fiber was sandwiched between the compounds. As a result, SMC was obtained as the molding material. The glass fiber content in the SMC was adjusted to be 25 percent. Thereafter, the resulting SMC was wrapped with a cellophane film, and was aged for one day at 40° C.

Next, the SMC was molded with the application of heat and pressure using a mold with a size of 300 mm×300 mm at the upper mold temperature of 110° C. and the lower mold temperature of 100° C. Then, the SMC cut in a size of 150 mm×150 mm was placed in the mold to be clamped, and was molded at 6 MPa for 10 minutes with the application of heat and pressure, thereby forming a molded plate (molded article) with a thickness of 3 mm. The resulting molded plate had desirable front and back surfaces without pin hole nor irregularities in glossiness.

EXAMPLE 57

In a reactor provided with a thermometer, a condenser, a nitrogen introducing tube and an agitator, placed were 188 parts of methyl methacrylate, and 12 parts of methacrylic acid. Then, an inside atmosphere of the reactor was replaced by nitrogen gas. After heating the mixture in the reactor to 85° C. with stirring, 0.006 parts of AIBN and 0.3 parts of n-dodecylmercaptan were added to initiate a polymerization reaction.

After 5.5 hours, the reaction solution showed a viscosity of 30–35 poise (25° C.), and the reaction was stopped. Then, 35 parts of methyl methacrylate was further added to the reaction solution, and the reaction solution was quenched to 40° C.

After adding 8.4 parts of glycidyl methacrylate, 0.2 parts of zinc octylate, and 0.05 parts of hydroquinone, the reaction mixture was stirred at 100° C. for 10 hours to perform an esterification reaction. The resulting (meth)acryl syrup E had a concentration of a solid portion of 30 percent, a viscosity of 10.5 poise and a weight-average molecular weight of 110,000.

With respect to the (meth)acryl syrup E, a number of double bonds in one molecule of the (meth)acryl polymer was measured in the same manner as Example 13, and was found to be 12.

Then, using the (meth)acryl syrup E, a dispersed mixture was prepared in the same manner as Example56. The resulting dispersed mixture was not transparent. The particle diameter distribution of the dispersed phase was measured by a particle diameter measuring device (NICOMP 370) and was found to be in a range of 50 nm–100 μm. Further, from the dispersed mixture, compounds were prepared in the same manner as Example 56. Thereafter, the resulting compounds were aged for one day at 40° C.

The thickened compounds were cured in the same manner as Example 56. The resulting cured product had a coefficient of volume shrinkage of 3.0 percent. The cured product had a smooth surface without a pin hole nor irregularities in glossiness. The cured product was cut into two pieces, and the cross-section thereof was observed using a scanning-type electro-microscope. Many voids of 30 microns were observed inside the cured product.

Then, before the curing process, the compounds were applied on the surface of the polyethylene film so as to have a predetermined thickness. Thereafter, a glass fiber (chopped roving fiber with a length of 1 inch) as a reinforcing material was uniformly spread thereon.

Further, compounds were uniformly applied on the surface of the polyethylene film. Namely, the glass fiber was sandwiched between the compounds. As a result, SMC (molding materials) was obtained. The glass fiber content in the SMC was adjusted to be 25 percent. Thereafter, the resulting SMC was wrapped with a cellophane film, and was aged for one day at 40° C.

Next, the SMC was molded with the application of heat and pressure using a mold with a size of 300 mm×300 mm in which the upper mold temperature and the lower molding temperature were respectively set to 110° C. and 100° C. Then, the SMC cut in a size of 150 mm×150 mm was placed in the mold to be clamped and was molded at 6 MPa for 10 minutes with the application of heat and pressure, thereby obtaining a molding plate (molded article) with a thickness of 3 mm. The resulting molded plate had desirable front and back surfaces without pin hole nor irregularities in glossiness.

EXAMPLE 58

In the reactor used in Example 1, placed were 200 parts of methyl methacrylate. Then, an inside atmosphere of the reactor was replaced by nitrogen gas. After heating the methyl methacrylate in the reactor to 80° C. with stirring, 0.1 parts of AIBN and 1.0 part of n-dodecylmercaptan were added to initiate a polymerization reaction.

When the reaction solution showed a viscosity of from 30 to 35 poise (25° C.), the polymerization reaction was completed. Then, 35 parts of methyl methacrylate was added to the reaction solution, and was quenched to 40° C.

Then, after adding isobutyl vinyl ether, the reaction mixture was stirred at 100° C. for 30 minutes to process the n-dodecylmercaptan added to the mixture. The isobutyl vinyl ether was added in an amount of 2.0 times mole with respect to n-dodecylmercaptan. Then, 5 parts of methacrylic acid was added to 95 parts of the resulting reaction mixture, thereby obtaining (meth)acryl syrup D of the present invention.

Then, 100 parts of (meth)acryl syrup D was mixed with 1 part of bis(4-t-butylcyclohexyl)peroxy dicarbonate as a curing agent and 200 parts of aluminium hydroxide (HIGILITE H-320ST available from SHOWA DENKO K.K.). Then, the mixture was kneaded and deaerated. As a result, a casting material (molding material) was obtained. The casting material, i.e., the compound showed excellent storage stability.

The resulting casting material was casted using a glass cell. Specifically, after pouring the casting material into the cell, the cell was heated for 1 hour at 60° C. to cure the casting material. After the deaeration, a postcure process was applied for 2 hours at 100° C., thereby obtaining an artificial marble plate as a molded article.

The resulting artificial marble plate had a glossy and smooth surface and appeared to be high-grade and quality. The artificial marble plate had excellent heat-resistance, weathering resistance and water-resistance. The main reaction conditions and the results of the artificial marble plate are summarized in Table 20.

EXAMPLE 59

In the reactor used in Example 1, placed were 200 parts of methyl methacrylate. Then, an inside atmosphere of the reactor was replaced by nitrogen gas. After heating the methyl methacrylate in the reactor to 80° C. with stirring, 0.1 parts of AIBN and 1.0 part of n-dodecylmercaptan were added to initiate a polymerization reaction.

When the reaction solution showed a viscosity of from 30 to 35 poise (25° C.), the polymerization reaction was stopped. Then, 25 parts of methyl methacrylate and 10 parts of methacrylic acid were added to the reaction solution, and was quenched to 40° C.

Then, after adding isobutyl vinyl ether, the reaction mixture was stirred for 30 minutes at 100° C. to process the n-dodecylmercaptan added to the mixture. The isobutyl vinyl ether was added in an amount of 2.0 times mole with respect to n-dodecylmercaptan added in the polymerization reaction, thereby obtaining (meth)acryl syrup D of the present invention.

Then, from the resulting (meth)acryl syrup D, an artificial marble plate was prepared in the same manner as Example 10. The resulting casting material, i.e., the compound showed excellent storage stability.

The resulting artificial marble plate had a glossy and smooth surface and appeared to be high-grade in quality and in the feel of a materail. The artificial marble plate had excellent heat-resistance, weathering resistance and water-resistance. The main reaction conditions and the results of the artificial marble plate are summarized in Table 20.

EXAMPLE 60

In the reactor used in Example 1, placed were 200 parts of methyl methacrylate. Then, an inside atmosphere of the reactor was replaced by nitrogen gas. After heating the methyl methacrylate in the reactor to 80° C. with stirring, 0.1 parts of AIBN and 1.0 part of n-dodecylmercaptan were added to initiate a polymerization reaction.

When the reaction solution showed a viscosity of from 30 to 35 poise (25° C.), the polymerization reaction was completed. Then, 35 parts of methyl methacrylate was added to the reaction solution, and was quenched to 40° C.

Then, after adding isobutyl vinyl ether, the reaction mixture was stirred at 100° C. for 30 minutes to process the n-dodecylmercaptan added to the mixture. The isobutyl vinyl ether was added in an amount of 2.0 times mole with respect to n-dodecylmercaptan added in the polymerization reaction, thereby obtaining (meth)acryl syrup C.

Then, after 5 parts of methacrylic acid was added to 95 parts (meth)acryl syrup C, an artificial marble plate was prepared in the same manner as Example 10. The casting compounds adopting the (meth)acryl syrup C, i.e., the compounds showed excellent storage stability.

The resulting artificial marble plate had a glossy and smooth surface and appeared to be high-grade in quality and in the feel of a material. The resulting resin plate was insoluble in both THF and acetone, and the solvent-resistance of the artificial marble plate was determined to be excellent. The artificial marble plate had excellent heat-resistance, weathering resistance and water-resistance. The main reaction conditions and results of the artificial marble plate are summarized in Table 20.

TABLE 20

| | EXAMPLE | | |
|---|---|---|---|
| | 58 | 59 | 60 |
| ALUMINUM HYDROXIDE (PARTS) | 200 | 200 | 200 |
| AGED MOLDING MATERIALS | GOOD | GOOD | GOOD |
| SOLVENT-RESISTANCE | | | |
| THF | INSOLBLE | INSOLBLE | INSOLBLE |

TABLE 20-continued

| | EXAMPLE | | |
|---|---|---|---|
| | 58 | 59 | 60 |
| ACETONE | INSOLBLE | INSOLBLE | INSOLBLE |
| HEAT-RESISTANCE | GOOD | GOOD | GOOD |
| WEATHERING RESISTANCE | GOOD | GOOD | GOOD |
| WATER-RESISTANCE | GOOD | GOOD | GOOD |

As is evident from Table 20, by the methods in accordance with Examples 58–60, (meth)acryl syrup C and (meth)acryl syrup D which have excellent storage stability as molding materials can be manufactured with ease. Further, the molded compounds prepared in Examples 58–60 are suited for heat-pressure molding. The molded articles resulting from the molding materials show excellent heat-resistance, weathering resistance and water-resistance.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

POSSIBLE INDUSTRIAL APPLICATIONS OF THE PRESENT INVENTION

The manufacturing method of the present invention permits (meth)acryl syrup which shows excellent storage stability as molding materials to be manufactured relatively in short period of time compared with the conventional method. Furthermore, the method of the present invention provides a molding material that can be cured relatively in short period of time compared with the conventional method while having excellent heat-resistance, weathering resistance and water-resistance.

The molded articles manufactured from the molding material of the present invention may be used in but not limited to: various outdoor goods such as natural lighting dome, bench, table, tank, advertising board, waterproof board, etc.; members which constitute sewage purifier, automobile, railroad vehicle, ship, etc., sheathing material of the building such as roof, wall, etc.; artificial marble suited for use in bathtub, kitchen counter (kitchen top), various counter top, vanity unit, etc.; electric products, etc. The molded article of the present invention has beautiful appearance and suited for use in various goods which are expected to be presentable. The molded article prepared from the molding material including a filler has a beautiful marble design, and is suited for use in artificial marble.

What is claimed is:

1. A method of manufacturing (meth)acryl syrup comprising the step of:
    reacting a reaction mixture resulting from a polymerization reaction of a monomer component including (meth)acrylic ester and a vinyl monomer having a carboxyl group in the presence of 0.01 percent by weight to 15 percent by weight, based on the weight of the monomer component and vinyl monomer having a carboxyl group, of a thiol compound, an amount of the vinyl monomer having a carboxyl group being 0.5 to 20% by weight of a total amount of said monomer component and said vinyl monomer having a carboxyl group, with an unsaturated epoxy compound in the presence of a metal compound of at least one element selected from the group consisting of zinc, tin, and zirconium.

2. The method as set forth in claim 1, wherein:
said reaction mixture results from a partial polymerization reaction of the monomer component including (meth)acrylic ester and the vinyl compound having a carboxyl group.

3. The method as set forth in claim 1, wherein:
said monomer component further includes N-substituted maleimide.

4. The method as set forth in claim 3, wherein:
said N-substituted maleimide is N-cyclohexyl maleimide.

5. A method of manufacturing a molding material which comprises (meth)acryl syrup comprising reacting a reaction mixture resulting from a polymerization reaction of a monomer component including (meth)acrylic ester with a vinyl monomer having a carboxyl group in the presence of a thiol compound, an amount of the vinyl monomer having a carboxyl group being 0.5 to 20% by weight of a total amount of said monomer component and said vinyl monomer having a carboxyl group, with an unsaturated epoxy compound in the presence of a metal compound including at least one element selected from the group consisting of zinc, tin, and zirconium, and a thermoplastic polymer of at least one kind selected from the group consisting of thermoplastic elastomer, thermoplastic resin and rubber, wherein said thermoplastic polymer is dispersed in said (meth)acryl syrup.

6. The method as set forth in claim 5,
wherein the thermoplastic polymer is a styrene based thermoplastic elastomer.

7. A (meth)acryl obtained from the method of claim 1.

8. A molding material including the meth(acryl) syrup of claim 7.

9. The molding material of claim 8 which further includes a thickening agent and a compound having a succinic acid structure or succinic anhydride structure in a molecule and having an alkenyl group as a substituent.

10. The molding material of claim 8 which further includes a reinforcing material.

11. The method as set forth in claim 6,
wherein said styrene based thermoplastic elastomer is selected from the group consisting of styrene/ethylene/propylene/styrene copolymer (SEPS), styrene/ethylene/butylene/styrene copolymer (SEBS), a maleic anhydride modified styrene/ethylene/butylene/styrene copolymer (MA denatured SEBS), styrene/isoprene/styrene copolymer (SIS), styrene/butadiene/styrene copolymer (SBS) and styrene/ethylene/propylene copolymer (SEP).

* * * * *